US012366645B2

(12) United States Patent
Kishigami

(10) Patent No.: US 12,366,645 B2
(45) Date of Patent: *Jul. 22, 2025

(54) RADAR APPARATUS

(71) Applicant: Panasonic Automotive Systems Co., Ltd., Kanagawa (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,438

(22) Filed: May 6, 2024

(65) Prior Publication Data
US 2024/0288568 A1    Aug. 29, 2024

Related U.S. Application Data

(63) Continuation of application No. 17/544,345, filed on Dec. 7, 2021, now Pat. No. 12,019,145.

(30) Foreign Application Priority Data

Dec. 10, 2020 (JP) .................... 2020-204938

(51) Int. Cl.
  *G01S 13/58*  (2006.01)
  *G01S 7/282*  (2006.01)
  *G01S 13/28*  (2006.01)

(52) U.S. Cl.
  CPC .......... *G01S 13/582* (2013.01); *G01S 7/282* (2013.01); *G01S 13/288* (2013.01)

(58) Field of Classification Search
  CPC ...... G01S 7/282; G01S 13/288; G01S 13/582; G01S 2013/93271; G01S 13/584;
  (Continued)

(56) References Cited

U.S. PATENT DOCUMENTS 9,541,638 B2    1/2017   Jansen et al.
11,099,267 B2   8/2021   Wu et al.
(Continued)

FOREIGN PATENT DOCUMENTS

GB    2 247 356 A    2/1992
JP    2008304417 A   12/2008
(Continued)

OTHER PUBLICATIONS

English Translation of Japanese Notice of Reasons for Refusal, dated Apr. 9, 2024, for Japanese Patent Application No. 2020-204938. (6 pages).
(Continued)

*Primary Examiner* — Olumide Ajibade Akonai
(74) *Attorney, Agent, or Firm* — Seed IP Law Group LLP

(57) ABSTRACT

A radar transmitter includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas. Each of the plurality of transmission antennas is associated with each of a plurality of combinations of the Doppler shift amount and the code sequence. Each of the plurality of combination is different at least one of the Doppler shift amount and the code sequence, and the Doppler shift amounts of those of the plurality of combinations which are associated respectively with at least two transmission antennas of the plurality of transmission antennas are the same Doppler shift amount, the at least two transmission antennas being a first sub-array antenna.

18 Claims, 30 Drawing Sheets

(58) Field of Classification Search
CPC ...... G01S 13/931; G01S 13/343; G01S 7/352; G01S 7/292; G01S 7/354; G01S 13/34; G01S 2013/0245; H04B 7/0413
See application file for complete search history.

(56) References Cited

U.S. PATENT DOCUMENTS

| | | | |
|---|---|---|---|
| 11,555,882 | B2 | 1/2023 | Bai et al. |
| 11,808,880 | B2 | 11/2023 | Bai et al. |
| 12,019,145 | B2 * | 6/2024 | Kishigami ............ G01S 13/582 |
| 2008/0303711 | A1 | 12/2008 | Matsuoka |
| 2011/0074620 | A1 | 3/2011 | Wintermantel |
| 2011/0074621 | A1 | 3/2011 | Wintermantel |
| 2011/0080313 | A1 | 4/2011 | Wintermantel |
| 2011/0080314 | A1 | 4/2011 | Wintermantel |
| 2017/0115384 | A1 | 4/2017 | Loesch et al. |
| 2017/0131392 | A1 | 5/2017 | Schoor et al. |
| 2017/0131393 | A1 | 5/2017 | Schoor et al. |
| 2017/0131399 | A1 | 5/2017 | Ioannidis et al. |
| 2018/0088224 | A1 | 3/2018 | Kishigami |
| 2019/0379137 | A1 | 12/2019 | Ohguchi |
| 2020/0182991 | A1 | 6/2020 | Hakobyan et al. |
| 2021/0080537 | A1 | 3/2021 | Melzer et al. |
| 2022/0107402 | A1 | 4/2022 | Kishigami |
| 2022/0171049 | A1 | 6/2022 | Wu et al. |
| 2023/0092131 | A1 | 3/2023 | Lao et al. |

FOREIGN PATENT DOCUMENTS

| | | |
|---|---|---|
| JP | 2011-526371 A | 10/2011 |
| JP | 2014-119344 A | 6/2014 |
| JP | 2016-090431 A | 5/2016 |
| JP | 2016-090432 A | 5/2016 |
| JP | 2017522549 A | 8/2017 |
| JP | 2017522575 A | 8/2017 |
| JP | 2017522576 A | 8/2017 |
| JP | 2018-054327 A | 4/2018 |
| JP | 2019-211388 A | 12/2019 |
| JP | 2020-148754 A | 9/2020 |

OTHER PUBLICATIONS

Li et al., "MIMO Radar with Colocated Antennas," *IEEE Signal Processing Magazine*, pp. 106-114, Sep. 2007, 9 pages.

Kronauge et al., "Fast Two-Dimensional CFAR Procedure," *IEEE Transactions on Aerospace and Electronic Systems*, 49(3):1817-1823, Jul. 2013, 7 pages.

Cadzow, "Direction-of-Arrival Estimation Using Signal Subspace Modeling," *IEEE Transactions on Aerospace and Electronic Systems*, 28(1):64-79, Jan. 1992, 16 pages.

Japanese Notice of Reasons for Refusal dated Jan. 30, 2024, for the corresponding Japanese Patent Application No. 2020-197085, 5 pages. (With English Machine Translation).

* cited by examiner (a) Case where $N_{DOP\_CODE}(1) = 2$ and $N_{DOP\_CODE}(2) = 1$ (b) Case where $N_{DOP\_CODE}(1) = 1$ and $N_{DOP\_CODE}(2) = 2$ (a) Case where $N_{DOP\_CODE}(1) = 2$ and $N_{DOP\_CODE}(2) = 1$ (b) Case where $N_{DOP\_CODE}(1) = 1$ and $N_{DOP\_CODE}(2) = 2$ (a) Case where $N_{DOP\_CODE}(1) = 2$, $N_{DOP\_CODE}(2) = 1$, and $N_{DOP\_CODE}(3) = 1$ (b) Case where $N_{DOP\_CODE}(1) = 1$, $N_{DOP\_CODE}(2) = 2$, and $N_{DOP\_CODE}(3) = 1$ (c) Case where $N_{DOP\_CODE}(1) = 1$, $N_{DOP\_CODE}(2) = 1$, and $N_{DOP\_CODE}(3) = 2$ (a) Case where $N_{DOP\_CODE}(1) = 2$, $N_{DOP\_CODE}(2) = 1$, and $N_{DOP\_CODE}(3) = 1$ (b) Case where $N_{DOP\_CODE}(1) = 2$, $N_{DOP\_CODE}(2) = 1$, and $N_{DOP\_CODE}(3) = 1$ (c) Case where $N_{DOP\_CODE}(1) = 2$, $N_{DOP\_CODE}(2) = 1$, and $N_{DOP\_CODE}(3) = 1$ (a) Case where $N_{DOP\_CODE}(1) = 3$ and $N_{DOP\_CODE}(2) = 1$ (b) Case where $N_{DOP\_CODE}(1) = 1$ and $N_{DOP\_CODE}(2) = 3$ (a) Using Code₂ in case where $N_{DOP\_CODE}(2) = 1$ (b) Using Code₃ in case where $N_{DOP\_CODE}(2) = 1$ (a) Case where $N_{DOP\_CODE}(1) = N_{DOP\_CODE}(2) = 2$ and $N_{DOP\_CODE}(3) = N_{DOP\_CODE}(4) = 1$ (b) Case where $N_{DOP\_CODE}(1) = N_{DOP\_CODE}(3) = 2$ and $N_{DOP\_CODE}(2) = N_{DOP\_CODE}(4) = 1$ (a) Case where the same code is used (b) Case where different codes are used (a) Case where the same code is used (b) Case where different codes are used (a) Case where fs_comp_cfar < 0

(b) Case where fs_comp_cfar > 0

RADAR APPARATUS

TECHNICAL FIELD

The present disclosure relates to a radar apparatus.

BACKGROUND ART

Recently, studies have been developed on radar apparatuses that use a radar transmission signal of a short wavelength including a microwave or a millimeter wave that can achieve high resolution. Further, it has been demanded to develop a radar apparatus which senses small objects such as pedestrians in addition to vehicles in a wide-angle range (e.g., referred to as "wide-angle radar apparatus") in order to improve the outdoor safety.

Examples of the configuration of the radar apparatus having a wide-angle sensing range include a configuration using a technique of receiving a reflected wave from a target by an array antenna composed of a plurality of antennas (or also referred to as antenna elements), and estimating the direction of arrival of the reflected wave (or referred to as the angle of arrival) using a signal processing algorithm based on received phase differences with respect to element spacings (antenna spacings) (Direction of Arrival (DOA) estimation). Examples of the DOA estimation include a Fourier method, and, a Capon method, Multiple Signal Classification (MUSIC), and Estimation of Signal Parameters via Rotational Invariance Techniques (ESPRIT) that are methods achieving higher resolution.

In addition, a radar apparatus has been proposed which, for example, includes a plurality of antennas (array antenna) at a transmitter side in addition to at a receiver side, and is configured to perform beam scanning through signal processing using the transmission and reception array antennas (also referred to as Multiple Input Multiple Output (MIMO) radar) (e.g., see Non-Patent Literature (hereinafter referred to as "NPL") 1).

CITATION LIST

Patent Literature

PTL 1
Japanese Unexamined Patent Application Publication (Translation of PCT Application) No. 2011-526371
PTL 2
Japanese Patent Application Laid-Open No. 2014-119344
PTL 3
U.S. Pat. No. 9,541,638

Non Patent Literature

NPL 1
J. Li, and P. Stoica, "MIMO Radar with Colocated Antennas," Signal Processing Magazine, IEEE Vol. 24, Issue: 5, pp. 106-114, 2007
NPL 2
M. Kronauge, H. Rohling, "Fast two-dimensional CFAR procedure," IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, methods for a radar apparatus (e.g., MIMO radar) to sense a target object (or a target) have not been comprehensively studied.

One non-limiting and exemplary embodiment of the present disclosure facilitates providing a radar apparatus with an enhanced sensing accuracy for sensing a target object.

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which each of the plurality of transmission antennas is associated with a combination of the Doppler shift amount and the code sequence such that at least one of the Doppler shift amount and the code sequence is different between a plurality of the combinations, and the Doppler shift amounts of those of the plurality of combinations which are associated respectively with at least two adjacent transmission antennas of the plurality of transmission antennas are the same Doppler shift amount, the at least two adjacent transmission antennas being a first sub-array antenna.

Note that these generic or specific exemplary embodiments may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, the target-object sensing accuracy of a radar apparatus can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
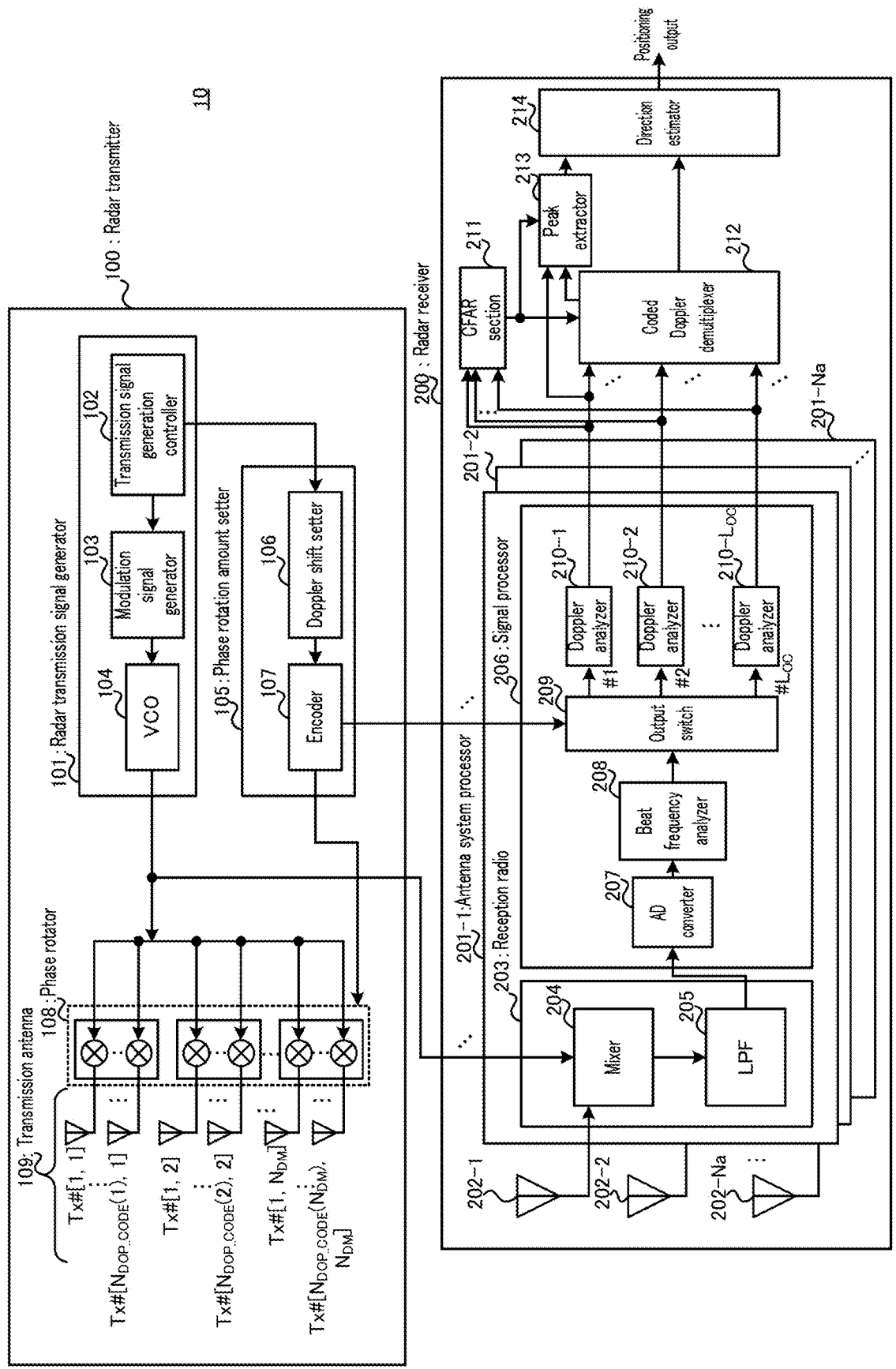
FIG. 1 is a block diagram illustrating an example configuration of a radar apparatus according to Embodiment 1.

A MIMO radar transmits, from a plurality of transmission antennas (also referred to as "transmission array antenna"), signals (radar transmission waves) that are time-division, frequency-division, or code-division multiplexed, for example. The MIMO radar then receives signals (radar reflected waves) reflected, for example, by an object around the radar using a plurality of reception antennas (also referred to as "reception array antenna") to separate and receive multiplexed transmission signals from reception signals. Through such processing, the MIMO radar performs array signal processing using these reception signals as a virtual reception array.

Further, in the MIMO radar, it is possible to enlarge the antenna aperture of the virtual reception array so as to enhance the angular resolution by appropriately arranging element spacings in transmission and reception array antennas. Alternatively, the MIMO radar allows reduction of sidelobes or grating lobes by more dense arrangement of the antenna spacings of the virtual reception array.

For example, Patent Literature (hereinafter, referred to as "PTL") 1 discloses a MIMO radar (hereinafter referred to as a "time-division multiplexing MIMO radar") that uses, as a multiplexing transmission method for the MIMO radar, time-division multiplexing transmission by which signals are transmitted at transmission times shifted per transmission antenna. The time-division multiplexing MIMO radar outputs transmission pulses, which are an example of transmission signals, while sequentially switching the transmission antennas in a defined period. The time-division multiplexing MIMO radar receives, at a plurality of reception antennas, signals that are the transmission pulses reflected by an object, performs processing of correlating the reception signals with the transmission pulses, and then performs, for example, spatial fast Fourier transform (FFT) processing (processing for estimation of the directions of arrival of the reflected waves).

The time-division multiplexing MIMO radar sequentially switches the transmission antennas, from which the transmission signals (for example, the transmission pulses or radar transmission waves) are to be transmitted, in a defined period. The time-division multiplexing MIMO radar can thus extract propagation path responses indicated by the product (=Nt×Na) of number Nt of transmission antennas and number Na of reception antennas, so as to perform the array signal processing using these Nt×Na reception signals as a virtual reception array. In other words, it is difficult to utilize the transmission antennas such that the number thereof is made greater than the number of transmission antennas obtained by the transmission signals time-division multiplexed by switching of the transmission antennas (e.g., the number of time-division multiplexing). For example, when the radar apparatus transmits a transmission signal using Nt transmission antennas by number Nt of time-division multiplexing, it is difficult to extract propagation path responses that exceed (Nt×Na). Accordingly, when the number of antennas is limited due to constraints such as the cost or installation location of the radar apparatus, the angular resolution or a sidelobe reducing effect can be limited and it may be impossible to enhance the angular measurement performance.

Next, by way of example, attention will be paid to a method of multiplexing and transmitting transmission signals simultaneously from a plurality of transmission antennas.

Examples of the method for simultaneously multiplexing and transmitting transmission signals from a plurality of transmission antennas include a method (hereinafter referred to as Doppler multiplexing transmission) for transmitting signals such that a plurality of transmission signals can be separated in the Doppler frequency domain on the receiver side (see, for example, NPL 2).

In the Doppler multiplexing transmission, transmission signals transmitted from transmission antennas different from a reference transmission antenna are, at a transmitter side, given respective Doppler shift amounts different from that given to a transmission signal transmitted from the reference transmission antenna, and are simultaneously transmitted from a plurality of transmission antennas (e.g., Nt transmission antennas). In the Doppler multiplexing transmission, the signals received using a plurality of reception antennas (e.g., Na reception antennas) are each filtered in the Doppler frequency domain, so that the transmission signals transmitted from the transmission antennas are separated and received. Thus, the MIMO radar using the Doppler multiplexing transmission (hereinafter, referred to as "Doppler multiplexing MIMO radar") can extract propagation path responses indicated by the product (=Nt×Na) of number Nt of transmission antennas and number Na of reception antennas, and performs array signal processing using these (Nt×Na) reception signals as a virtual reception array. In other words, it is difficult to utilize the transmission antennas such that the number thereof is made greater than the number of transmission antennas performing Doppler multiplexing transmission (e.g., the number of Doppler multiplexing). For example, when the radar apparatus transmits transmission signals using Nt transmission antennas with number Nt of Doppler multiplexing, it is difficult to extract propagation path responses that exceed (Nt×Na) in number.

Further, another method of multiplexing and transmitting transmission signals simultaneously from a plurality of transmission antennas is code multiplexing transmission (see, for example, PTL 3). For example, a MIMO radar using the code multiplexing transmission (hereinafter, referred to as "code multiplexing MIMO radar") performs code multiplexing transmission from a plurality transmission antennas (e.g., Nt transmission antennas) by repeating, for each repeated transmission of the transmission signals (e.g., chirp signals), application of phase modulation based on a code string (hereinafter, also referred to as a code or a code sequence) different for each transmission antenna. Further, the code multiplexing MIMO radar extracts range information of code-multiplexed reception signals by performing wave detection processing on signals received using, for example, a plurality of reception antennas (e.g., Na reception antennas). Further, the code multiplexing MIMO radar performs, for example, on the range information obtained for each repeated transmission of the transmission signals, Fourier transform processing in a velocity direction by dividing the range information into M pieces (for example, the code length of the code string is used as M). The code multiplexing MIMO radar separates the code-multiplexed reception signals by applying phase correction based on detected velocity components to M results of the Fourier transform processing in the velocity direction, and multiplying the M results by inverse code strings for separating code strings applied for each transmission antenna.

Such a configuration of the code multiplexing MIMO radar allows the code multiplexing MIMO radar to reduce mutual interference between the code-multiplexed reception signals and separate the code-multiplexed reception signals, for example, even when the relative velocity between a target and the code multiplexing MIMO radar is not zero. Thus, the code multiplexing MIMO radar can extract propagation path responses indicated by the product (=Nt×Na) of number Nt of transmission antennas and number Na of reception antennas, and performs array signal processing using these (Nt×Na) reception signals as a virtual reception array. In other words, it is difficult to utilize the transmission antennas such that the number thereof is made greater than the number of transmission antennas performing code multiplexing transmission (e.g., the number of code multiplexing). For example, when the radar apparatus transmits transmission signals using Nt transmission antennas with number Nt of code multiplexing, it is difficult to extract propagation path responses that exceed (Nt×Na) in number.

In view of the above, one exemplary embodiment according to the present disclosure will be described in relation to a method of utilizing the transmission antennas such that the number thereof is made greater than the number of transmission antennas used for multiplexing transmission. In other words, the exemplary embodiment according to the present disclosure will be described in relation to, for example, a method of extracting more than Nt×Na propagation path responses when a radar apparatus transmits a transmission signal using Nt transmission antennas with number Nt of multiplexing. With this configuration, the radar apparatus of one exemplary embodiment according to the present disclosure can utilize more virtual reception antennas, and it is thus possible to improve the angular measurement performance of the radar apparatus and improve the sensing accuracy for sensing a target object.

Embodiments of the present disclosure will be described in detail with reference to the drawings. In the embodiments, the same constituent elements are identified with the same numerals, and a description thereof is omitted to avoid redundancy.

The following describes a configuration of a radar apparatus (in other words, MIMO radar configuration) having a transmitting branch in which multiplexed different transmission signals are simultaneously sent from a plurality of transmission antennas, and a receiving branch in which the transmission signals are separated and subjected to reception processing.

Further, by way of example, a description will be given below of a configuration of a radar system using a frequency-modulated pulse wave such as a chirp pulse (e.g., also referred to as chirp pulse transmission (fast chirp modulation)). However, the modulation scheme is not limited to frequency modulation. For example, an exemplary embodiment of the present disclosure is also applicable to a radar system that uses a pulse compression radar configured to transmit a pulse train after performing phase modulation or amplitude modulation on the pulse train.

Further, the radar apparatus performs Doppler multiplexing transmission, for example. In addition, in the Doppler multiplexing transmission, the radar apparatus multiplexes and transmits signals by encoding (for example, performing code division multiplexing (CDM) on) the signals to which different phase rotations (in other words, phase shifts), the number of which corresponds to the number of Doppler multiplexing, are applied, (hereinafter, such signals are referred to as "Doppler-multiplexed transmission signals") (hereinafter, such multiplexing is referred to as "Coded Doppler Multiplexing").

[Configuration of Radar Apparatus]

Radar apparatus 10 in FIG. 1 includes radar transmitter (transmitting branch) 100 and radar receiver (receiving branch) 200.

Radar transmitter 100 generates radar signals (radar transmission signals) and transmits the radar transmission signals in a defined transmission period (hereinafter, referred to as "radar transmission period") using a transmission array antenna composed of a plurality of transmission antennas 109 (for example, Nt transmission antennas).

Radar receiver 200 receives reflected wave signals, which are radar transmission signals reflected by a target object (target) (not illustrated), using a reception array antenna composed of a plurality of reception antennas 202-1 to 202-Na. Radar receiver 200 performs signal processing on the reflected wave signals received at reception antennas 202 to, for example, detect the presence or absence of the target object, or estimate the distances through which the reflected wave signals arrive, the Doppler frequencies (in other words, the relative velocities), and the directions of arrival, and outputs information on an estimation result (in other words, positioning information).

Note that, radar apparatus 10 may be mounted, for example, on a mobile body such as a vehicle, and a positioning output of radar receiver 200 (information on the estimation result) may, for example, be connected to an Electronic Control Unit (ECU) (not illustrated) such as an Advanced Driver Assistance System (ADAS) or an autonomous driving system for enhancing the collision safety and utilized for a vehicle drive control or alarm call control.

Radar apparatus 10 may also be mounted on a relatively high-altitude structure (not illustrated), such as, for example, a roadside utility pole or traffic lights. Radar apparatus 10 may also be utilized, for example, as a sensor of a support system for enhancing the safety of passing vehicles or pedestrians, or as a sensor of a suspicious intrusion prevention system (not illustrated). The positioning output of radar receiver 200 may also be connected, for example, to a control device (not illustrated) in the support system or the suspicious intrusion prevention system for enhancing safety and may be utilized for an alarm call control or an abnormality detection control. The use of radar apparatus 10 is not limited to the above, and may also be used for other uses.

In addition, the target object is an object to be detected by radar apparatus 10. Examples of the target object include vehicles (including four-wheel and two-wheel vehicles), a person, and a block or a curb.

[Configuration of Radar Transmitter 100]

Radar transmitter 100 includes radar transmission signal generator 101, phase rotation amount setter 105, phase rotators 108, and transmission antennas 109.

Radar transmission signal generator 101 generates a radar transmission signal. Radar transmission signal generator 101 includes, for example, transmission signal generation controller 102, modulation signal generator 103, and Voltage Controlled Oscillator (VCO) 104. The constituent sections of radar transmission signal generator 101 will be described below.

Transmission signal generation controller 102 sets, for example, a transmission signal generation timing for each radar transmission period, and outputs information on the set transmission signal generation timing to modulation signal generator 103 and phase rotation amount setter 105 (e.g., Doppler shift setter 106). Here, the radar transmission period is represented by Tr.

Modulation signal generator 103 periodically generates, for example, saw-toothed modulation signals based on the information on the transmission signal generation timing for each radar transmission period Tr inputted from transmission signal generation controller 102.

Figure 2:
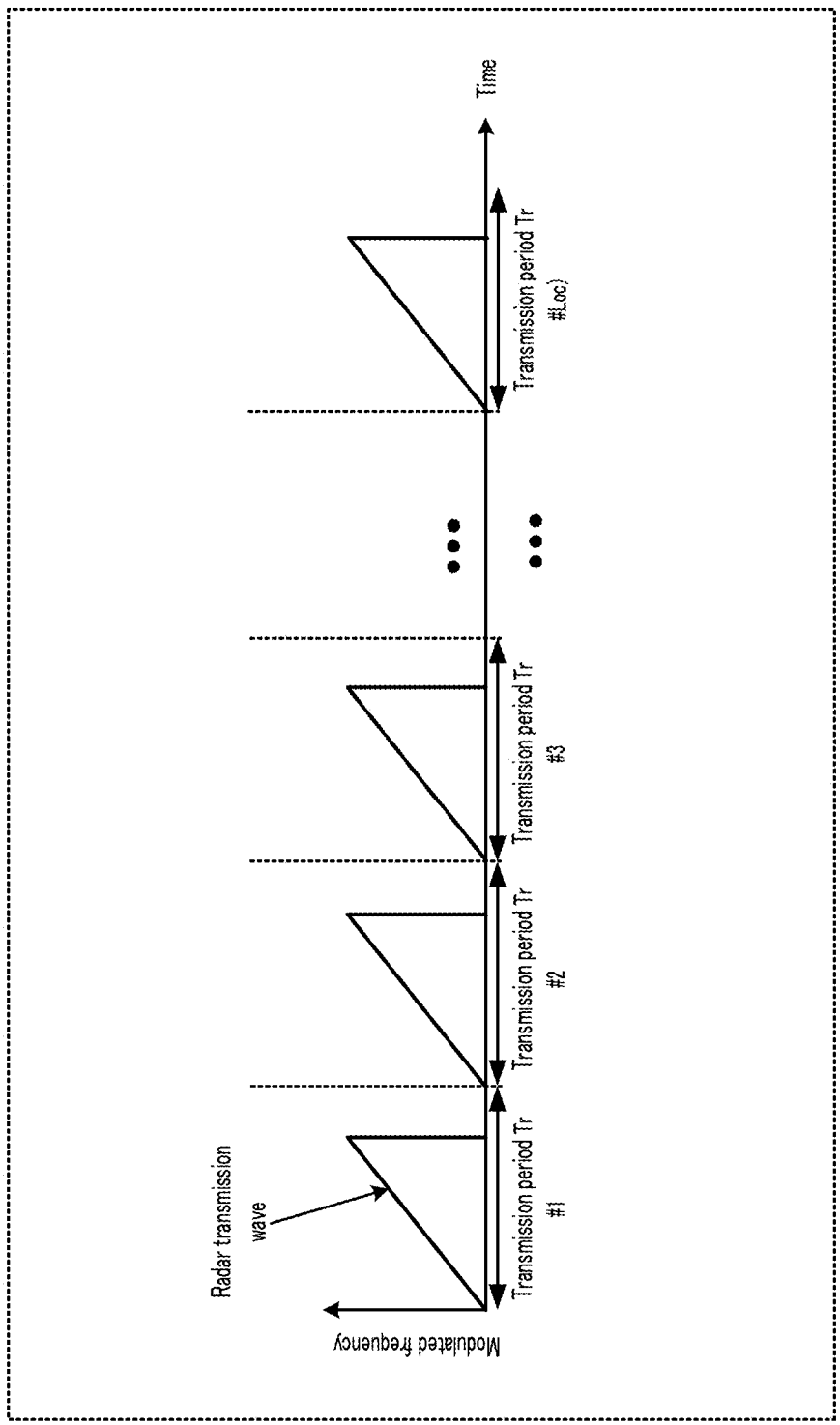
FIG. 2 illustrates an example of a transmission signal in a case where a chirp pulse is used.

VCO 104 outputs, based on the modulation signals inputted from modulation signal generator 103, frequency-modulated signals (hereinafter referred to as, for example, frequency chirp signals or chirp signals) to phase rotators 108 and radar receiver 200 (mixer 204 described below) as the radar transmission signals (radar transmission waves) illustrated in FIG. 2.

Phase rotation amount setter 105 sets phase rotation amounts applied to radar signals for each radar transmission period Tr at phase rotators 108 (in other words, phase rotation amounts corresponding to the coded Doppler multiplexing transmission) based on the information on the transmission signal generation timing for each radar transmission period Tr inputted from transmission signal generation controller 102. Phase rotation amount setter 105 includes, for example, Doppler shift setter 106 and encoder 107.

Doppler shift setter 106 sets phase rotation amounts that are applied to the radar transmission signals (e.g., chirp signals) and that correspond to Doppler shift amounts, for example, based on the information on the transmission signal generation timing for each radar transmission period Tr.

Encoder 107 sets a phase rotation amount corresponding to coding, for example, based on the information on the transmission signal generation timing for each radar transmission period Tr. Encoder 107 calculates phase rotation amounts for phase rotators 108 based on, for example, the phase rotation amounts outputted from Doppler shift setter 106 and the phase rotation amount corresponding to coding, and outputs the phase rotation amounts to phase rotators 108. Further, encoder 107 outputs, for example, information on code sequences used for coding (for example, elements of orthogonal code sequences) to radar receiver 200 (for example, output switch 209).

The number of coded Doppler multiplexing for Doppler multiplexed signals that is set by encoder 107 does not have to depend on the phase rotation amounts (Doppler shift amounts) of respective transmission antennas 109 set by phase rotators 108. In other words, even when phase rotators 108 sets the same phase rotation amount (Doppler shift amount) for a pair of adjacent transmission antennas 109, encoder 107 may set the same number of coded Doppler multiplexing or may set different values.

Phase rotators 108 apply the phase rotation amounts inputted from encoder 107 to the chirp signals inputted from VCO 104 and outputs the signals subjected to phase rotation to transmission antennas 109. For example, each of phase rotators 108 includes a phase shifter, a phase modulator, and the like (not illustrated). The output signals of phase rotators 108 are amplified to a defined transmission power and are radiated respectively from transmission antennas 109 to space. In other words, radar transmission signals are multiplexed by application of the phase rotation amounts corresponding to the Doppler shift amounts and the orthogonal code sequences and are transmitted from a plurality of transmission antennas 109.

Next, an example method for phase rotation amount setter 105 to set the phase rotation amounts will be described.

Doppler shift setter 106 sets phase rotation amount $\varphi_{ndm}$ for applying Doppler shift amount $DOP_{ndm}$ and outputs phase rotation amount $\varphi_{ndm}$ to encoder 107. Here, $ndm=1, \ldots, N_{DM}$. $N_{DM}$ denotes the set number of different Doppler shift amounts and is hereinafter referred to as the "number of Doppler multiplexing."

In radar apparatus 10, since coding performed by encoder 107 is used for some purposes, number $N_{DM}$ of Doppler multiplexing may be set smaller than number Nt of transmission antennas 109 used for multiplexing transmission. Note that, number $N_{DM}$ of Doppler multiplexing is greater than or equal to 2.

Doppler shift amounts at equal intervals, or Doppler shift amounts at unequal intervals may, for example, be set as Doppler shift amounts $DOP_1, DOP_2, \ldots,$ and $DOP_{N\_DM}$ ("N_DM" is also represented as "$N_{DM}$"). Doppler shift amounts $DOP_1, DOP_2, \ldots,$ and $DOP_{N\_DM}$ may be set to satisfy, for example, $0 \le DOP_1, DOP_2, \ldots, DOP_{N\_DM} < (1/TrL_{oc})$ since the coding by encoder 107 described later is used for some purposes. Alternatively, Doppler shift amounts $DOP_1, DOP_2, \ldots,$ and $DOP_{N\_DM}$, for example, may be set to satisfy Expression 1:

[1]

$$\frac{-1}{2T_r L_{oc}} \leq DOP_1, DOP_2, \ldots, DOP_{N\_DM} < \frac{1}{2T_r L_{oc}}. \quad \text{(Expression 1)}$$

Further, for example, minimum Doppler shift interval $\Delta f_{MinInterval}$ between Doppler shift amounts $DOP_1$, $DOP_2, \ldots$, and $DOP_{N\_DM}$ may satisfy following Expression 2. Note that, the Doppler shift interval may be defined as an absolute value of a difference between any two of Doppler shift amounts $DOP_1, DOP_2, \ldots$, and $DOP_{N\_DM}$. Here, Loc represents the number of code elements. For example, Loc represents the code length of a code used in encoder 107.

[2]

$$0 < \Delta f_{MinInterval} \leq \frac{1}{T_r N_{DM} L_{oc}} \quad \text{(Expression 2)}$$

Further, phase rotation amounts $\varphi_{ndm}$ for applying Doppler shift amounts $DOP_1, DOP_2, \ldots$, and $DOP_{N\_DM}$ may, for example, be assigned as given by following Expression 3:

[3]

$$\phi_{ndm} = 2\pi DOP_{ndm} / \left(\frac{1}{T_r L_{oc}}\right). \quad \text{(Expression 3)}$$

Note that, when the Doppler shift amounts at the equal interval of $\Delta f_{MinInterval}$ are set (hereinafter, such Doppler shift amounts are referred to as "equal-interval Doppler shift amount setting"), phase rotation amounts $\varphi_{ndm}$ for applying Doppler shift amounts $DOP_{ndm}$ are assigned, for example, as given by following Expression 4:

[4]

$$\phi_{ndm} = 2\pi(ndm-1)\Delta f_{MinInterval} / \left(\frac{1}{T_r L_{oc}}\right). \quad \text{(Expression 4)}$$

Note that, as minimum Doppler shift interval $\Delta f_{MinInterval}$ is made narrower, the interference between Doppler multiplexed signals is more likely to occur, and the target detection accuracy is more likely to be reduced (e.g., degraded). Thus, it is preferable that the intervals between the Doppler shift amounts be widened as much as possible within the range satisfying the constraints of Expression 2. For example, when the equal sign holds true in Expression 2 (e.g., $\Delta f_{MinInterval}=1/(T_r N_{DM} L_{OC})$), the intervals between the Doppler multiplexed signals in the Doppler domain can be maximized (hereinafter, referred to as "maximum equal-interval Doppler shift amount setting"). In this case, a phase rotation range greater than or equal to 0 and less than $2\pi$ are equally divided into $N_{DM}$ sub-ranges, and Doppler shift amounts $DOP_1, DOP_2, \ldots$, and $DOP_{N\_DM}$ are assigned respective different phase rotation amounts. For example, phase rotation amount $\varphi_{ndm}$ for applying Doppler shift amount $DOP_{ndm}$ is assigned as given by following Expression 5. Note that, in the following, the angle is expressed in radian.

[5]

$$\phi_{ndm} = \frac{2\pi(ndm-1)}{N_{DM}} \quad \text{(Expression 5)}$$

In Expression 5, for example, when number $N_{DM}$ of Doppler multiplexing is 2, phase rotation amount $\varphi_1$ for applying Doppler shift amount $DOP_1$ is 0, and phase rotation amount $\varphi_2$ for applying Doppler shift amount $DOP_2$ is $\pi$. Likewise, in Expression 5, for example, when number $N_{DM}$ of Doppler multiplexing is 4, phase rotation amount $\varphi_1$ for applying Doppler shift amount $DOP_1$ is 0, phase rotation amount $\varphi_2$ for applying Doppler shift amount $DOP_2$ is $\pi/2$, phase rotation amount $\varphi_3$ for applying Doppler shift amount $DOP_3$ is $\pi$, and phase rotation amount $\varphi_4$ for applying Doppler shift amount $DOP_4$ is $3\pi/2$. In other words, intervals between phase rotation amounts $\varphi_{ndm}$ for applying Doppler shift amounts $DOP_{ndm}$ are equal intervals.

Note that, the assignment of the phase rotation amounts for applying Doppler shift amounts $DOP_1, DOP_2, \ldots$, and $DOP_{N\_DM}$ is not limited to this assignment method. For example, the assignment of the phase rotation amounts given by Expression 5 may be shifted. For example, the phase rotation amounts may be assigned such that $\varphi_{ndm}=2\pi(ndm)/N_{DM}$. Alternatively, phase rotation amounts $\varphi_1$, $\varphi_2, \ldots$, and $\varphi_{N\_DM}$ may be randomly assigned for Doppler shift amounts $DOP_1, DOP_2, \ldots$, and $DOP_{NDM}$ (where "N_DM" corresponds to $N_{DM}$) using an assignment table of the phase rotation amounts.

In addition, in the equal-interval Doppler shift amount setting, when the denominator of phase rotation amount $\varphi_{ndm}$ given by Expression 4 is set to an integer and the phase rotation amounts are set to integer values in units of Degree, it becomes easier to set the phase rotation amounts. For example, by setting $\Delta f_{MinInterval}=1/T_r(N_{DM}+N_{int})L_{OC}$, the denominator of phase rotation amount $\varphi_{ndm}$ given by Expression 4 is set to an integer value as given by following Expression 6. Further, when $N_{int}$ is set such that the value of the denominator $(N_{DM}+N_{int})$ in Expression 6 is a divisor of 360, the phase rotation amount is set to an integer value, and it becomes easier to set the phase rotation amounts.

[6]

$$\phi_{ndm} = \frac{2\pi(ndm-1)}{N_{DM}+N_{int}} \quad \text{(Expression 6)}$$

Here, $N_{int}$ takes an integer value greater than or equal to 0. For example, when $N_{int}=1$ is set in the case of $N_{DM}=7$, $\varphi_{ndm}=2\pi(ndm-1)/(N_{DM}+N_{int})=\pi(ndm-1)/4$ holds. Accordingly, $\varphi_1, \varphi_2, \ldots$, and $\varphi_{N\_DM}$ are integer values in units of Degree such as 0°, 45°, 90°, 135°, ..., and 270°, respectively, and it becomes easier to set the phase rotation amounts.

Note that, when $N_{int}=0$ in Expression 6, the maximum equal-interval Doppler shift amount setting is used.

Regarding phase rotation amounts $\varphi_1, \ldots$, and $\varphi_{N\_DM}$ for applying $N_{DM}$ Doppler shift amounts inputted from Doppler shift setter 106, encoder 107 sets the phase rotation amounts based on one or a plurality (equal to or less than $N_{CM}$) of orthogonal code sequences. Further, encoder 107 sets the phase rotation amounts based on both the Doppler shift amounts and the orthogonal code sequences, for example, the "coded Doppler phase rotation amounts" for generating coded Doppler multiplexed signals, and outputs the coded Doppler phase rotation amounts to phase rotators 108.

An example of the operation of encoder 107 will be described below.

For example, encoder 107 uses orthogonal code sequences with number $N_{CM}$ of codes (in other words, the number of code multiplexing) and with code length Loc.

In the following, $N_{CM}$ orthogonal code sequences with code length Loc are denoted as $Code_{ncm}=\{OC_{ncm}(1), OC_{ncm}(2), \ldots, OC_{ncm}(Loc)\}$. $OC_{ncm}(noc)$ represents the noc-th code element in ncm-th orthogonal code sequence $Code_{ncm}$. Here, noc denotes the index of a code element, and noc=1, ..., Loc.

The orthogonal code sequences used in encoder 107 are, for example, codes that are orthogonal (uncorrelated) to one another. For example, the orthogonal code sequences may be Walsh-Hadamard codes. In this case, code length Loc used to generate orthogonal code sequences with number $N_{CM}$ of codes is given by following Expression 7.

[7]

$$Loc = 2^{ceil[log_2(N_{CM})]} \qquad \text{(Expression 7)}$$

Here, ceil[x] is an operator (ceiling function) that outputs the smallest integer greater than or equal to real number x.

For example, in a case where $N_{CM}=2$, code length Loc of Walsh-Hadamard codes is 2, and the orthogonal code sequences are represented by $Code_1=\{1, 1\}$ and $Code_2=\{1, -1\}$. Note that, when a code element constituting the orthogonal code sequences is 1, 1=exp(j0) holds true and, thus, the phase thereof is 0. In addition, when a code element constituting the orthogonal code sequences is $-1$, $-1=\exp(j\pi)$ holds true and, thus, the phase thereof is $\pi$.

Further, for example, in a case where $N_{CM}=4$, code length Loc is 4, and the orthogonal code sequences are represented by $Code_1=\{1, 1, 1, 1\}$, $Code_2=\{1, -1, 1, -1\}$, $Code_3=\{1, 1, -1, -1\}$, and $Code_4=\{1, -1, -1, 1\}$.

Note that, code elements constituting an orthogonal code sequence are not limited to real numbers and may include complex number values. For example, orthogonal code sequence $Code_{ncm}$ given by following Expression 8 may be used. Here, ncm=1, ..., $N_{CM}$. In this case, the code length used to generate orthogonal code sequences with number $N_{CM}$ of codes is represented by Loc=$N_{CM}$.

[8]

$$Code_{ncm} = \left\{1, \exp\left[j\frac{2\pi}{N_{CM}}(ncm-1)\right], \exp\left[j\frac{2\pi}{N_{CM}}2(ncm-1)\right], \ldots \exp\left[j\frac{2\pi}{N_{CM}}(N_{CM}-1)(ncm-1)\right]\right\} \quad \text{(Expression 8)}$$

For example, in a case where $N_{CM}=3$, code length Loc is 3 (=$N_{CM}$), and encoder 107 generates orthogonal code sequences represented by $Code_1=\{1, 1, 1\}$, $Code_2=\{1, \exp(j2\pi/3), \exp(j4\pi/3)\}$, and $Code_3=\{1, \exp(-j2\pi/3), \exp(-j4\pi/3)\}$.

Further, for example, in a case where $N_{CM}=4$, code length Loc is 4 (=$N_{CM}$), and encoder 107 generates orthogonal code sequences represented by $Code_1=\{1, 1, 1, 1\}$, $Code_2=\{1, j, -1, j\}$, $Code_3=\{1, -1, 1, -1\}$, and $Code_4=\{1, j, -1, j\}$. Here, j is the imaginary unit.

In encoder 107, the number of code multiplexing (hereinafter referred to as the number of coded Doppler multiplexing) for encoding a Doppler multiplexed signal using ndm-th Doppler shift amount $DOP_{ndm}$ inputted from Doppler shift setter 106 is represented by "$N_{DOP\_CODE}(ndm)$." Here, ndm=1, ..., $N_{DM}$.

Encoder 107 sets number $N_{DOP\_CODE}(ndm)$ of coded Doppler multiplexing such that, for example, the sum of numbers $N_{DOP\_CODE}(1)$, $N_{DOP\_CODE}(2)$, ..., and $N_{DOP\_CODE}(N_{DM})$ of coded Doppler multiplexing for encoding Doppler multiplexed signals is equal to number Nt of transmission antennas 109 used for multiplexing transmission. In other words, encoder 107 sets number $N_{DOP\_CODE}(ndm)$ of coded Doppler multiplexing so as to satisfy following Expression 9. This allows radar apparatus 10 to perform multiplexing transmission in the Doppler domain and in the code domain (hereinafter referred to as the coded Doppler multiplexing transmission) using Nt transmission antennas 109.

[9]

$$\sum_{ndm=1}^{N_{DM}} N_{DOP\_CODE}(ndm) = Nt \qquad \text{(Expression 9)}$$

Further, encoder 107 may set numbers $N_{DOP\_CODE}(1)$, $N_{DOP\_CODE}(2)$, ..., and $N_{DOP\_CODE}(N_{DM})$ of coded Doppler multiplexing, for example, using the equal-interval Doppler shift amount setting including the maximum equal-interval Doppler shift amount setting, such that different numbers of coded Doppler multiplexing ranging from 1 through $N_{CM}$ are included. For example, encoder 107 does not use number $N_{CM}$ of codes for all the numbers of coded Doppler multiplexing, but sets number $N_{DOP\_CODE}(ndm)$ of coded Doppler multiplexing corresponding to at least one Doppler shift amount $DOP_{ndm}$ such that this number of coded Doppler multiplexing is smaller than $N_{CM}$. Accordingly, among a plurality of combinations of the Doppler shift amounts $DOP_{ndm}$ and the orthogonal code sequences, number $N_{DOP\_CODE}(ndm)$ of multiplexing (number of coded Doppler multiplexing) by the orthogonal code sequences which is associated with at least one Doppler shift amount $DOP_{ndm}$ may differ from the numbers of coded Doppler multiplexing associated with the other Doppler shift amounts. In other words, encoder 107 sets the numbers of coded Doppler multiplexing for the Doppler multiplexed signals non-uniformly. With this setting, radar apparatus 10 can individually separate and receive the coded Doppler multiplexed signals transmitted from a plurality of transmission antennas 109 over a Doppler range of ±½Tr, for example, by aliasing judgement processing in reception processing described later.

Alternatively, encoder 107 may set numbers $N_{DOP\_CODE}(1)$, $N_{DOP\_CODE}(2)$, ..., and $N_{DOP\_CODE}(N_{DM})$ of coded Doppler multiplexing, for example, using the equal-interval Doppler shift amount setting of intervals narrower than the intervals of the maximum equal-interval Doppler shift amount setting, such that the same number of coded Doppler multiplexing in the range of from 1 through $N_{CM}$ is included. For example, encoder 107 may set number $N_{CM}$ of codes for all the numbers of coded Doppler multiplexing. Accordingly, among a plurality of combinations of Doppler shift amounts $DOP_{ndm}$ and the orthogonal code sequences, numbers $N_{DOP\_CODE}(ndm)$ of multiplexing (number of coded Doppler multiplexing) by the orthogonal code sequences which are associated with Doppler shift amounts $DOP_{ndm}$ may be the same. In other words, encoder 107 sets the numbers of coded Doppler multiplexing for the Doppler multiplexed signals uniformly. With this setting, radar apparatus 10 can individually separate and receive the coded Doppler multiplexed signals transmitted from a plurality of transmission antennas 109 over a Doppler range of $\pm 1/(2\times Loc\times Tr)$, for example, by aliasing judgement processing in reception processing described later.

Alternatively, encoder 107 may set numbers $N_{DOP\_CODE}(1)$, $N_{DOP\_CODE}(2)$, . . . , and $N_{DOP\_CODE}(N_{DM})$ of coded Doppler multiplexing, for example, using the maximum equal-interval Doppler shift amount setting such that the same number of coded Doppler multiplexing in the range of from 1 through $N_{CM}$ is included. For example, encoder 107 may set number $N_{CM}$ of codes for all the numbers of coded Doppler multiplexing. In other words, encoder 107 sets the numbers of coded Doppler multiplexing for the Doppler multiplexed signals uniformly. In the case of this setting, for example, the aliasing judgement processing in the reception processing described below is not applied. In addition, radar apparatus 10 can individually separate and receive the coded Doppler multiplexed signals transmitted from a plurality of transmission antennas 109 over a Doppler range of $\pm 1/(2Loc\times N_{DM}\times Tr)$, for example.

With respect to phase rotation amount $\varphi_{ndm}$ for applying ndm-th Doppler shift amount $DOP_{ndm}$, encoder 107 sets coded Doppler phase rotation amount $\psi_{ndop\_code(ndm),\ ndm}(m)$ for m-th transmission period Tr that is given by following Expression 10, and outputs coded Doppler phase rotation amount $\psi_{ndop\_code(ndm),\ ndm}(m)$ to phase rotator 108:

[10]

$$\psi_{ndop\_code(ndm),ndm}(m) = \text{floor}\left[\frac{(m-1)}{Loc}\right]\times \phi_{ndm} + \text{angle}[OC_{ndop\_code(ndm)}(OC\_INDEX)].$$

(Expression 10)

Here, the subscript "ndop_code(ndm)" represents an index less than or equal to number $N_{DOP\_CODE}(ndm)$ of coded Doppler multiplexing for phase rotation amount $\varphi_{ndm}$ for applying Doppler shift amount $DOP_{ndm}$. For example, ndop_code(ndm)=1, . . . , $N_{DOP\_CODE}(ndm)$. Here, angle[x] is an operator outputting the radian phase of real number x, and for example, angle[1]=0, angle[−1]=π, angle[j]=π/2, and angle[−j]=−π/2. In addition, floor[x] is an operator that outputs the largest integer that does not exceed real number x. The character "j" is an imaginary unit.

For example, as given by Expression 10, coded Doppler phase rotation amount $\psi_{ndop\_code(ndm),\ ndm}(m)$ provides a constant phase rotation amount for applying Doppler shift amount $DOP_{ndm}$ (for example, the first term in Expression 9) in the duration of Loc transmission periods ("Loc" is the code length used for coding), and applies a phase rotation amount corresponding to each of Loc code elements $OC_{ndop\_code(ndm)}(1)$, . . . , and $OC_{ndop\_code(ndm)}(Loc)$ of code $Code_{ndop\_code(ndm)}$ used for coding (the second term in Expression 9).

Further, encoder 107 outputs, in each transmission period (Tr), orthogonal code element index OC_INDEX to radar receiver 200 (output switch 209 described below). OC_INDEX represents an orthogonal code element index indicating an element of orthogonal code sequence $Code_{ndop\_code(ndm)}$, and cyclically varies in the range of from 1 to Loc in each transmission period (Tr), as given by following Expression 11:

[11]

$$OC\_INDEX = \text{mod}(m-1,\ Loc) + 1.$$

(Expression 11)

Here, mod(x, y) denotes a modulo operator and is a function that outputs the remainder after x is divided by y. Further, m=1, . . . , Nc. Nc denotes the number of transmission periods used for radar positioning (hereinafter referred to as "radar-transmission-signal transmission times"). In addition, radar-transmission-signal transmission times Nc is set to an integer multiple of Loc (by a factor of Ncode). For example, Nc=Loc×Ncode.

Next, an example method by encoder 107 for setting numbers $N_{DOP\_CODE}(ndm)$ of coded Doppler multiplexing for Doppler multiplexed signals non-uniformly will be described.

For example, encoder 107 sets number $N_{CM}$ of orthogonal code sequences (in other words, the number of code multiplexing or the number of codes) satisfying the condition below. For example, number $N_{CM}$ of orthogonal code sequences and number $N_{DM}$ of Doppler multiplexing satisfy the following relationship for number Nt of transmission antennas 109 used for multiplexing transmission:

(Number $N_{CM}$ of orthogonal code sequences)×(Number $N_{DM}$ of Doppler multiplexing)>Number Nt of transmission antennas used for multiplexing transmission.

For example, among numbers $N_{CM}$ of orthogonal code sequences and numbers $N_{DM}$ of Doppler multiplexing satisfying the above-described condition, the use of a combination yielding a smaller product ($N_{CM}\times N_{DM}$) is desirable in terms of both characteristics and complexity of circuit configuration. Note that among numbers $N_{CM}$ of orthogonal code sequences and numbers $N_{DM}$ of Doppler multiplexing satisfying the above-described condition, a combination having a smaller value of the product ($N_{CM}\times N_{DM}$) is not limitative, and any other combination may be applied.

For example, in a case where Nt=3, the combination of $N_{DM}=2$ and $N_{CM}=2$ is desirable.

Figure 3:
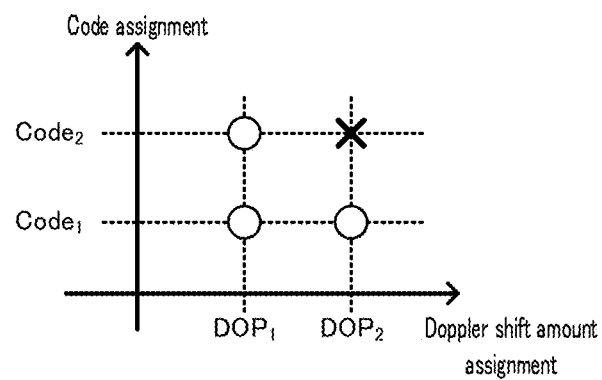
FIG. 3 illustrates examples of assignment of Doppler shift amounts and orthogonal codes according to Embodiment 1.
Figure 3:
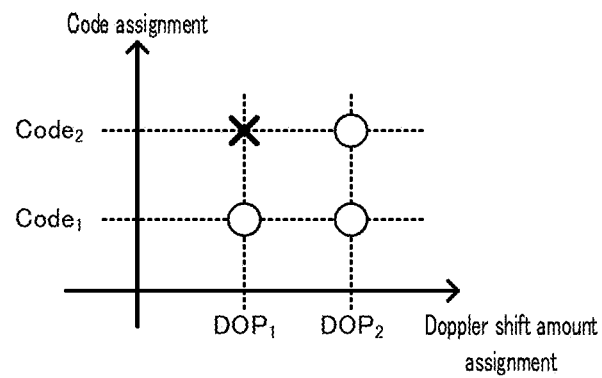

In this case, the assignment of Doppler shift amounts $DOP_1$ and $DOP_2$ and orthogonal codes $Code_1$ and $Code_2$ is determined in accordance with the setting of $N_{DOP\_CODE}(1)$ and $N_{DOP\_CODE}(2)$, for example, as illustrated at (a) and (b) in FIG. 3. In FIG. 3, white circles ("○") represent Doppler shift amounts and orthogonal codes used, and crosses ("x") represent Doppler shift amounts and orthogonal codes not used (the same applies to the following description).

For example, (a) in FIG. 3 illustrates an example of $N_{DOP\_CODE}(1)=2$ and $N_{DOP\_CODE}(2)=1$, and (b) in FIG. 3 illustrates an example of $N_{DOP\_CODE}(1)=1$ and $N_{DOP\_CODE}(2)=2$.

Figure 4:
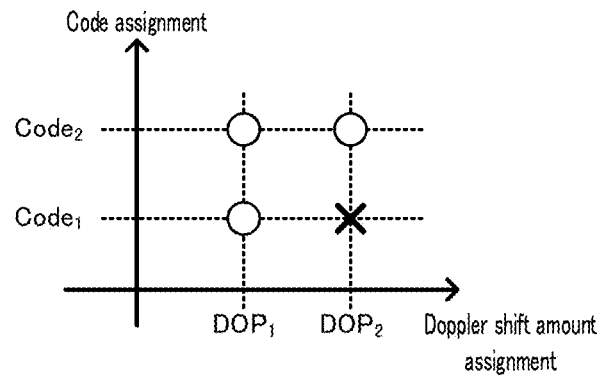
FIG. 4 illustrates examples of the assignment of Doppler shift amounts and orthogonal codes according to Embodiment 1.
Figure 4:
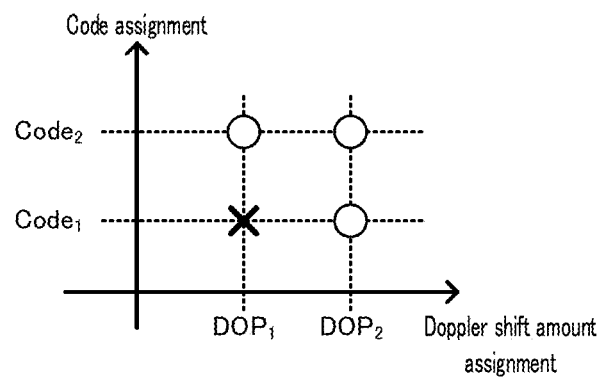

Note that, in FIG. 3, $Code_1$ is used for the Doppler shift amount (e.g., $DOP_2$ at (a) in FIG. 3 and $DOP_1$ at (b) in FIG. 3) corresponding to number $N_{DOP\_CODE}(ndm)=1$ of coded Doppler multiplexing, but the present disclosure is not limited thereto. For example, in the case of $N_{DOP\_CODE}(1)<N_{CM}$, or $N_{DOP\_CODE}(2)<N_{CM}$, $Code_2$ instead of $Code_1$ may be used for the Doppler shift amount (e.g., $DOP_2$ at (a) in FIG. 4 and $DOP_1$ at (b) in FIG. 4) corresponding to $N_{DOP\_CODE}(ndm)=1$ as illustrated in FIG. 4.

Further, for example, in a case where Nt=4 or 5, the combination of $N_{DM}=3$ and $N_{CM}=2$ or the combination of $N_{DM}=2$ and $N_{CM}=3$ is desirable.

Figure 5:
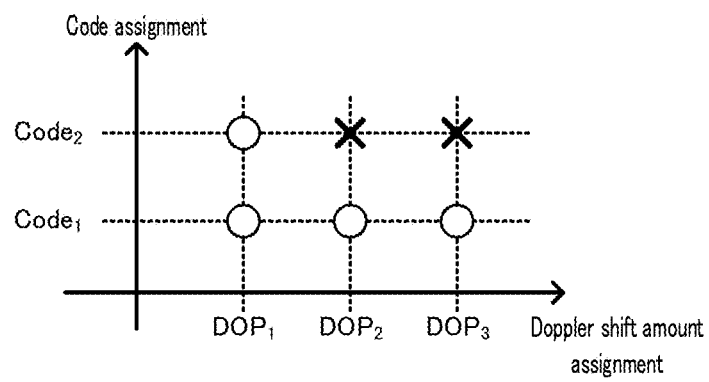
FIG. 5 illustrates examples of the assignment of Doppler shift amounts and orthogonal codes according to Embodiment 1.
Figure 5:
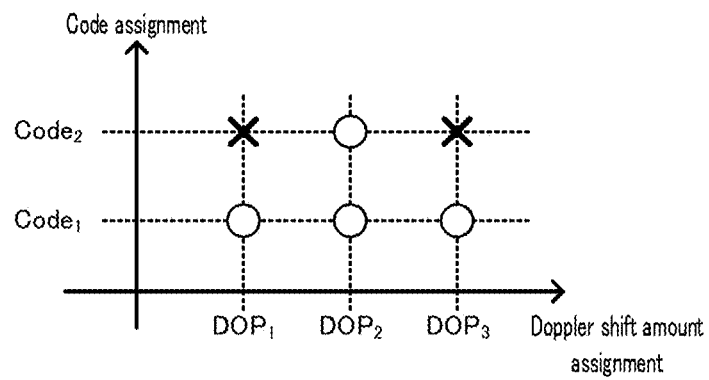
Figure 5:
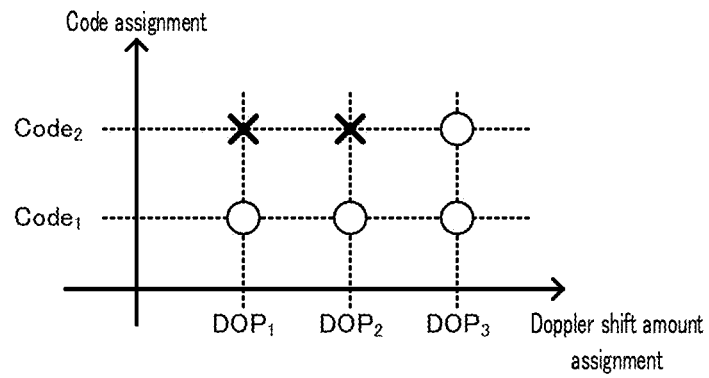

By way of example, FIG. 5 illustrate a case where Nt=4, $N_{DM}=3$, and $N_{CM}=2$. For example, the assignment of Doppler shift amounts $DOP_1$, $DOP_2$, and $DOP_3$ and orthogonal codes $Code_1$ and $Code_2$ is determined in accordance with the setting of $N_{DOP\_CODE}(1)$, $N_{DOP\_CODE}(2)$, and $N_{DOP\_CODE}(3)$ as illustrated in FIG. 5.

For example, (a) in FIG. 5 illustrates an example where $N_{DOP\_CODE}(1)=2$, $N_{DOP\_CODE}(2)=1$, and $N_{DOP\_CODE}(3)=1$, (b) in FIG. 5 illustrates an example where $N_{DOP\_CODE}(1)=1$, $N_{DOP\_CODE}(2)=2$, and $N_{DOP\_CODE}(3)=1$, and (c) in FIG. 5 illustrates an example where $N_{DOP\_CODE}(1)=1$, $N_{DOP\_CODE}(2)=1$, and $N_{DOP\_CODE}(3)=2$.

Figure 6:
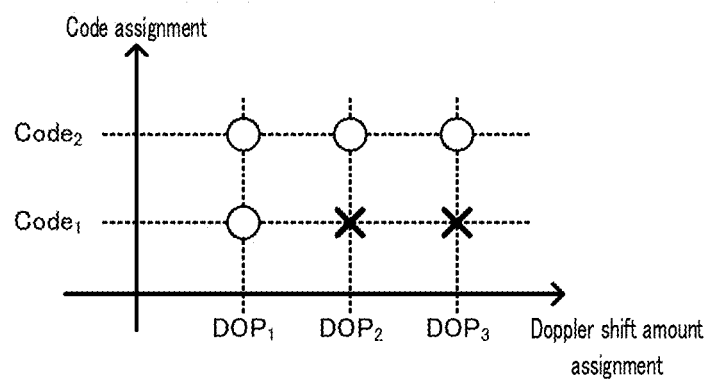
FIG. 6 illustrates examples of the assignment of Doppler shift amounts and orthogonal codes according to Embodiment 1.
Figure 6:
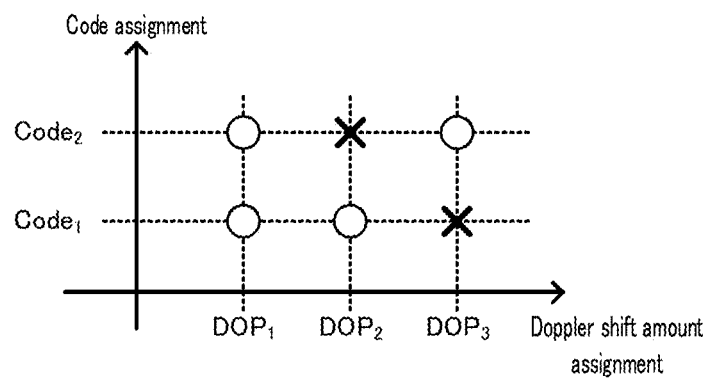
Figure 6:
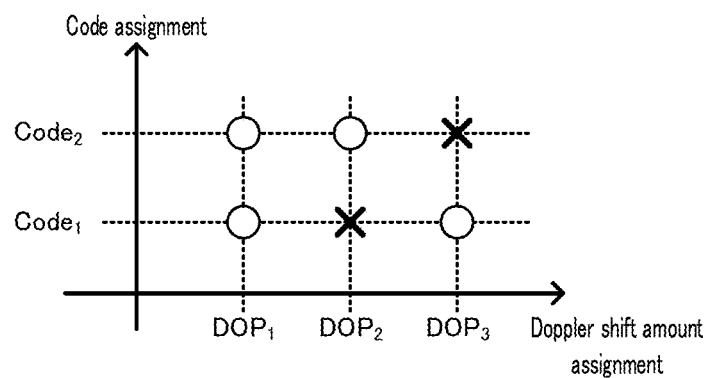

Note that, in FIG. 5, $Code_1$ is used for the Doppler shift amounts corresponding to number $N_{DOP\_CODE}(ndm)=1$ of coded Doppler multiplexing, but the present disclosure is not limited thereto. For example, for settings in which the numbers of coded Doppler multiplexing are each smaller than $N_{CM}$, $Code_2$ may be used in place of $Code_1$ as illustrated at (a) in FIG. 6, or both $Code_1$ and $Code_2$ may be used as illustrated at (b) or (c) in FIG. 6.

Figure 7:
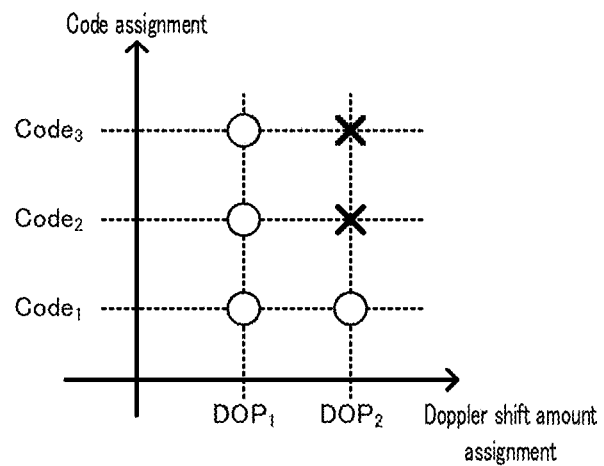
FIG. 7 illustrates examples of the assignment of Doppler shift amounts and orthogonal codes according to Embodiment 1.
Figure 7:
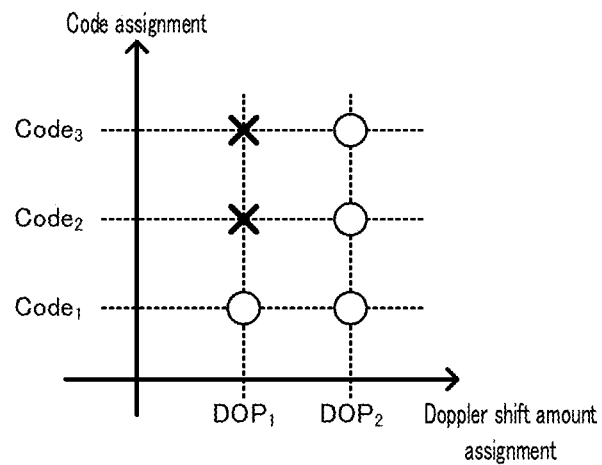

By way of another example, FIG. 7 illustrates a case where Nt=4, $N_{DM}=2$, and $N_{CM}=3$. For example, the assignment of Doppler shift amounts $DOP_1$ and $DOP_2$ and orthogonal codes $Code_1$, $Code_2$, and $Code_3$ is determined in accordance with the setting of $N_{DOP\_CODE}(1)$ and $N_{DOP\_CODE}(2)$ as illustrated in FIG. 7.

For example, (a) in FIG. 7 illustrates an example where $N_{DOP\_CODE}(1)=3$ and $N_{DOP\_CODE}(2)=1$, and (b) in FIG. 7 illustrates an example where $N_{DOP\_CODE}(1)=1$ and $N_{DOP\_CODE}(2)=3$.

Figure 8:
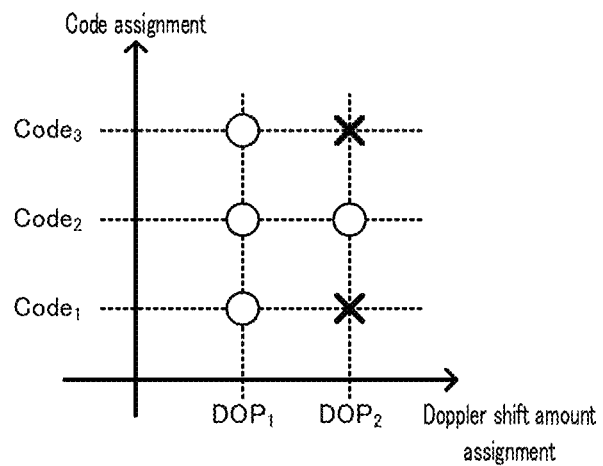
FIG. 8 illustrates examples of the assignment of Doppler shift amounts and orthogonal codes according to Embodiment 1.
Figure 8:
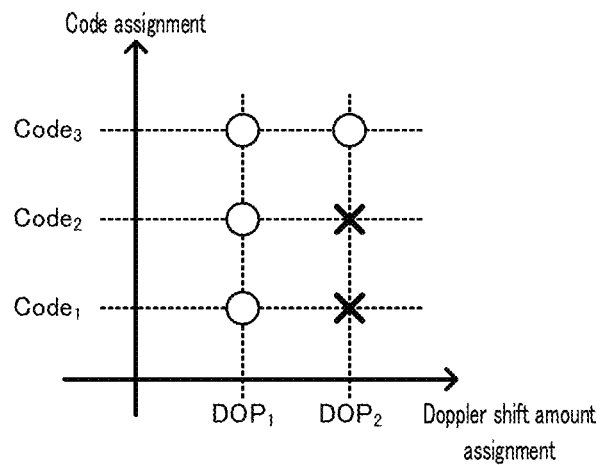

Note that, in FIG. 7, $Code_1$ is used for the Doppler shift amounts corresponding to number $N_{DOP\_CODE}(ndm)=1$ of coded Doppler multiplexing, but the present disclosure is not limited thereto. For example, when $N_{DOP\_CODE}(1)<N_{CM}$ or $N_{DOP\_CODE}(2)<N_{CM}$, $Code_2$ may be used in place of $Code_1$ as illustrated at (a) in FIG. 8, and $Code_3$ may be used in place of $Code_1$ as illustrated at (b) in FIG. 8.

As in the case of $N_{DOP\_CODE}(1)=3$ and $N_{DOP\_CODE}(2)=1$, or the case of $N_{DOP\_CODE}(1)=1$ and $N_{DOP\_CODE}(2)=3$ as illustrated in FIG. 7, numbers $N_{DOP\_CODE}$ of coded Doppler multiplexing are set non-uniformly for Doppler shift amounts $DOP_1$ and $DOP_2$. In such settings, the Doppler frequency range can be equivalent to, for example, the maximum Doppler velocity at the time of single-antenna transmission (the details will be described below).

Further, for example, in a case where Nt=6 or 7, the combination of $N_{DM}=4$ and $N_{CM}=2$ or the combination of $N_{DM}=2$ and $N_{CM}=4$ is desirable.

Figure 9:
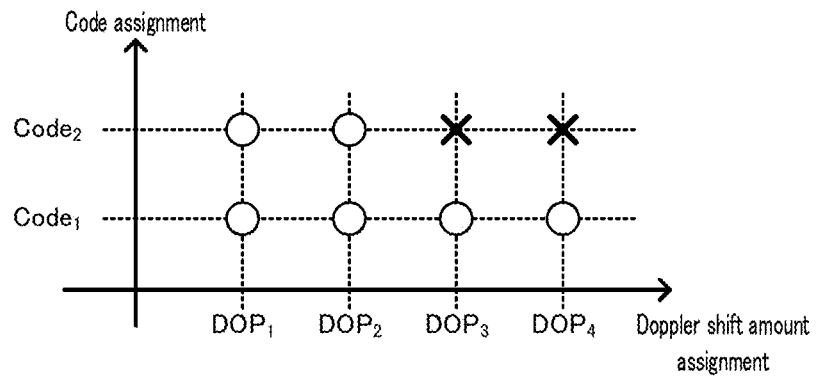
FIG. 9 illustrates examples of the assignment of Doppler shift amounts and orthogonal codes according to Embodiment 1.
Figure 9:
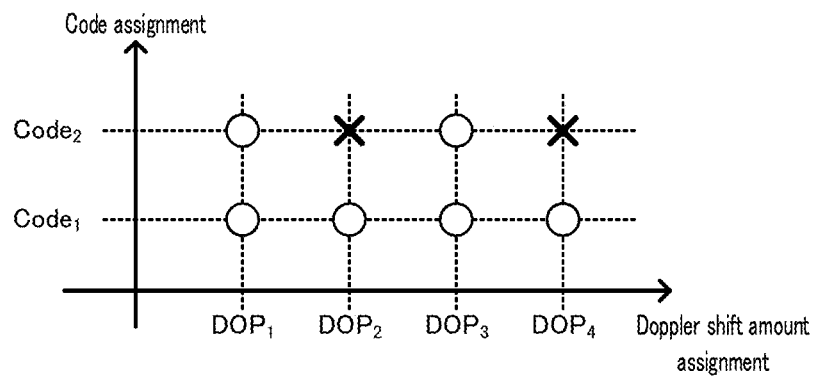

By way of example, FIG. 9 illustrates a case where Nt=6, $N_{DM}=4$, and $N_{CM}=2$. For example, the assignment of Doppler shift amounts $DOP_1$, $DOP_2$, $DOP_3$, and $DOP_4$ and orthogonal codes $Code_1$ and $Code_2$ is determined in accordance with the setting of $N_{DOP\_CODE}(1)$, $N_{DOP\_CODE}(2)$, $N_{DOP\_CODE}(3)$, and $N_{DOP\_CODE}(4)$ as illustrated in FIG. 9.

For example, (a) in FIG. 9 illustrates an example where $N_{DOP\_CODE}(1)=N_{DOP\_CODE}(2)=2$ and $N_{DOP\_CODE}(3)=N_{DOP\_CODE}(4)=1$, and (b) in FIG. 9 illustrates an example where $N_{DOP\_CODE}(1)=N_{DOP\_CODE}(3)=2$ and $N_{DOP\_CODE}(2)=N_{DOP\_CODE}(4)=1$.

Figure 10:
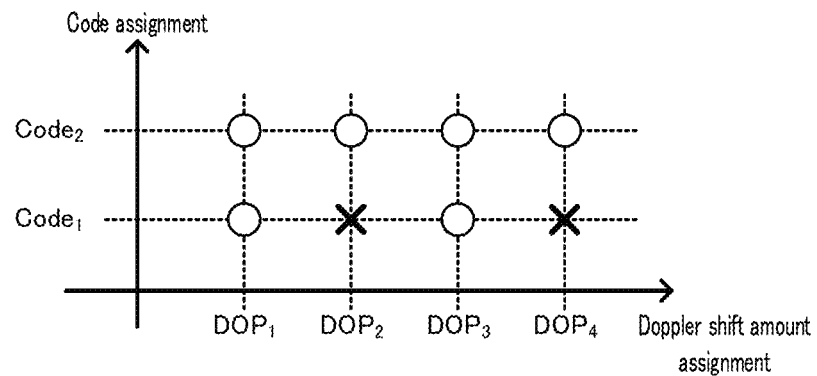
FIG. 10 illustrates examples of the assignment of Doppler shift amounts and orthogonal codes according to Embodiment 1.
Figure 10:
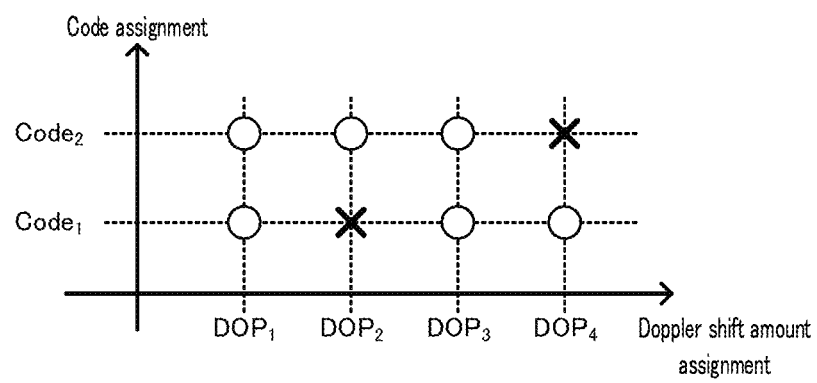

Note that, in FIG. 9, $Code_1$ is used for the Doppler shift amounts corresponding to number $N_{DOP\_CODE}(ndm)=1$ of coded Doppler multiplexing, but the present disclosure is not limited thereto. For example, for settings in which the numbers of coded Doppler multiplexing are each smaller than $N_{CM}$, $Code_2$ may be used in place of $Code_1$ as illustrated in at (a) in FIG. 10, or both $Code_1$ and $Code_2$ may be used as illustrated at (b) in FIG. 10.

Further, for example, as illustrated in FIG. 9, in a case where Nt=6, $N_{DM}=4$, and $N_{CM}=2$, there are two Doppler shift amounts that do not use all the codes. Further, for example, in the case of $N_{DM}=4$, in respect of the combinations of Doppler shift amounts that do not use all the codes, there are six combinations ($=_4C_2$) of two Doppler shift amounts selected from four Doppler shift amounts, and in each of the six combinations, there are four combinations ($=N_{CM} \times N_{CM}$) of codes used. Accordingly, in a case where Nt=6, $N_{DM}=4$, and $N_{CM}=2$, there is a total of 24 combinations of Doppler shift amounts DOP and orthogonal codes Code assigned.

Likewise, for example, in a case where Nt=8, the combination of $N_{DM}=3$ and $N_{CM}=3$ or the combination of $N_{DM}=5$ and $N_{CM}=2$ is desirable. For example, in a case where Nt=9, the combination of $N_{DM}=5$ and $N_{CM}=2$ is desirable. For example, in a case where Nt=10, the combination of $N_{DM}=6$ and $N_{CM}=2$ or the combination of $N_{DM}=4$ and $N_{CM}=3$ is desirable. For example, in a case where Nt=12, the combination of $N_{DM}=5$ and $N_{CM}=3$ or the combination of $N_{DM}=4$ and $N_{CM}=4$ is desirable. Note that, number Nt of transmission antennas 109 is not limited to that in the examples described above, and an exemplary embodiment of the present disclosure is also applicable in the case where Nt=11 or more.

Next, an example method by encoder 107 for setting numbers $N_{DOP\_CODE}(ndm)$ of coded Doppler multiplexing uniformly for Doppler multiplexed signals will be described.

Note that, for the method by encoder 107 for setting numbers $N_{DOP\_CODE}(ndm)$ of coded Doppler multiplexing uniformly for Doppler multiplexed signals, the use of a combination having a smaller product ($N_{CM} \times N_{DM}$) from among numbers $N_{CM}$ of orthogonal code sequences and numbers $N_{DM}$ of Doppler multiplexing satisfying the following condition is desirable in terms of both characteristics and complexity of circuit configuration. However, the present disclosure is not limited to the combination having a smaller value of the product ($N_{CM} \times N_{DM}$), but other combinations may also be applicable.

For example, encoder 107 sets number $N_{CM}$ of orthogonal code sequences (in other words, the number of code multiplexing or the number of codes) satisfying the condition below. For example, number $N_{CM}$ of orthogonal code sequences and number $N_{DM}$ of Doppler multiplexing satisfy the following relationship for number Nt of transmission antennas 109 used for multiplexing transmission:

(Number $N_{CM}$ of orthogonal code sequences)×(Number $N_{DM}$ of Doppler multiplexing)=Number Nt of transmission antennas used for multiplexing transmission.

For example, in a case where Nt=4, the combination of $N_{DM}=2$ and $N_{CM}=2$ is desirable. For example, in a case where Nt=6, the combination of $N_{DM}=2$ and $N_{CM}=3$ or the combination of $N_{DM}=3$ and $N_{CM}=2$ is desirable. For example, in a case where Nt=8, the combination of $N_{DM}=4$ and $N_{CM}=2$ or the combination of $N_{DM}=2$ and $N_{CM}=4$ is desirable. For example, in a case where Nt=9, the combination of $N_{DM}=3$ and $N_{CM}=3$ is desirable. For example, in a case where Nt=10, the combination of $N_{DM}=2$ and $N_{CM}=5$ or the combination of $N_{DM}=5$ and $N_{CM}=2$ is desirable. Further, for example, in a case where Nt=12, the combination of $N_{DM}=2$ and $N_{CM}=6$, the combination of $N_{DM}=6$ and $N_{CM}=2$, the combination of $N_{DM}=3$ and $N_{CM}=4$, or the combination of $N_{DM}=4$ and $N_{CM}=3$ is desirable.

Note that, number Nt of transmission antennas 109 is not limited to those in the examples described above, and the exemplary embodiment of the present disclosure is applicable to other numbers. In this case, in order to satisfy the combination of integers satisfying number $N_{CM}$ of orthogonal code sequences>1 and number $N_{DM}$ of Doppler multiplexing>1, and to satisfy (number $N_{CM}$ of orthogonal code sequences)×(number $N_{DM}$ of Doppler multiplexing)=number Nt of transmission antennas used for multiplexing transmission, number Nt of transmission antennas used for multiplexing transmission may be set to 4 or more, and to satisfy the above condition.

Further, the example method by encoder 107 for setting numbers $N_{DOP\_CODE}(ndm)$ of coded Doppler multiplexing uniformly for Doppler multiplexed signals is not limited to the above, and a larger $N_{CM}$ may be set in the above-described combinations.

For example, in a case where Nt=4, a combination satisfying $N_{DM}$=2 and $N_{CM}$≥2 is possible.

Further, for example, in the case of Nt=6, a combination of $N_{DM}$=2 and $N_{CM}$≥3, or a combination of $N_{DM}$=3 and $N_{CM}$≥2 is possible.

Further, for example, in the case of Nt=8, a combination of $N_{DM}$=4 and $N_{CM}$≥2, or a combination of $N_{DM}$=2 and $N_{CM}$≥4 is possible.

Further, for example, in the case of Nt=9, a combination of $N_{DM}$=3 and $N_{CM}$≥3 is possible.

Further, for example, in the case of Nt=10, a combination of $N_{DM}$=2 and $N_{CM}$≥5, or a combination of $N_{DM}$=5 and $N_{CM}$≥2 is possible.

Further, for example, in the case of Nt=12, a combination of $N_{DM}$=2 and $N_{CM}$≥6, a combination of $N_{DM}$=6 and $N_{CM}$≥2, a combination of $N_{DM}$=3 and $N_{CM}$≥4, or a combination of $N_{DM}$=4 and $N_{CM}$≥3 is possible.

Figure 11:
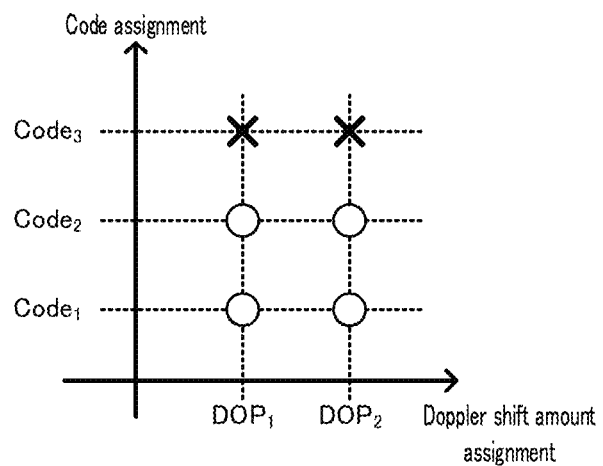
FIG. 11 illustrates examples of the assignment of Doppler shift amounts and orthogonal codes according to Embodiment 1.
Figure 11:
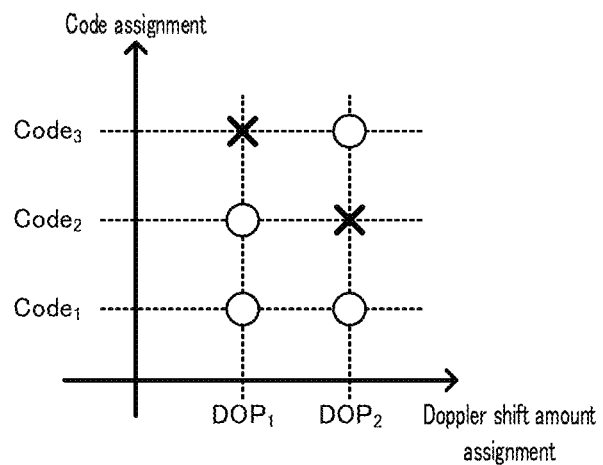

For example, in a case where Nt=4, $N_{DM}$=2, and $N_{CM}$=3, if $N_{DOP\_CODE}(1)$=2 and $N_{DOP\_CODE}(2)$=2 are set as illustrated in FIG. 11, numbers $N_{DOP\_CODE}$ of coded Doppler multiplexing are uniformly set for Doppler shift amounts $DOP_1$ and $DOP_2$. In this setting, for example, it is assumed that the same codes (for example, $Code_1$ and $Code_2$) are assigned for Doppler shift amounts $DOP_1$ and $DOP_2$ as illustrated at (a) in FIG. 11, or different codes are assigned for Doppler shift amounts $DOP_1$ and $DOP_2$ as illustrated at (b) in FIG. 11.

Next, an example of setting of coded Doppler phase rotation amount $\psi_{ndop\_code(ndm), ndm}(m)$ will be described.

For example, a description will be given of a case where in encoder 107, number Nt of transmission antennas used for multiplexing transmission is 3, number $N_{DM}$ of Doppler multiplexing is 2, and number $N_{CM}$ of code multiplexing is 2, and orthogonal code sequences $Code_1$={1, 1} and $Code_2$={1, −1} with code length Loc=2 are used. In this case, for example, when numbers $N_{DOP\_CODE}(1)$ and $N_{DOP\_CODE}(2)$ of coded Doppler multiplexing are 1 and 2, encoder 107 sets coded Doppler phase rotation amounts $\psi_{1,1}(m)$, $\psi_{1,2}(m)$, and $\psi_{2,2}(m)$ given by following Expressions 12 to 14 and outputs coded Doppler phase rotation amounts $\psi_{1,1}(m)$, $\psi_{1,2}(m)$, and $\psi_{2,2}(m)$ to phase rotators 108:

[12]

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \dots\} = \{0, 0, \phi_1, \phi_1, 2\phi_1, 2\phi_1, 3\phi_1, 3\phi_1, \dots\};$$

(Expression 12)

[13]

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \dots\} = \{0, 0, \phi_2, \phi_2, 2\phi_2, 2\phi_2, 3\phi_2, 3\phi_2, \dots\};$$

(Expression 13)

[14]

$$\{\psi_{2,2}(1), \psi_{2,2}(2), \psi_{2,2}(3), \psi_{2,2}(4), \psi_{2,2}(5), \psi_{2,2}(6), \psi_{2,2}(7), \psi_{2,2}(8), \dots\} = \{0, \pi, \phi_2, \phi_2+\pi, 2\phi_2, 2\phi_2+\pi, 3\phi_2, 3\phi_2+\pi, \dots\}.$$

(Expression 14)

Here, as an example, $\varphi_{ndm}=2\pi(ndm-1)/N_{DM}$ in Expression 5 is used as the phase rotation amount for applying Doppler shift amount $DOP_{ndm}$, and phase rotation amount $\varphi_1$=0 for applying Doppler shift amount $DOP_1$ and phase rotation amount $\varphi_2$=π for applying Doppler shift amount $DOP_2$ are used. In this case, encoder 107 sets coded Doppler phase rotation amounts $\psi_{1,1}(m)$, $\psi_{1,2}(m)$, and $\psi_{2,2}(m)$ given by following Expressions 15 to 17 and outputs coded Doppler phase rotation amounts $\psi_{1,1}(m)$, $\psi_{1,2}(m)$, and $\psi_{2,2}(m)$ to phase rotators 108. Here, m=1, . . . , Nc. Here, a modulo operation for 2π is performed, and results are expressed in radians ranging from 0 to less than 2π (the same applies to the following description).

[15]

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \dots\} = \{0, 0, 0, 0, 0, 0, 0, 0, \dots\}$$

(Expression 15)

[16]

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \dots\} = \{0, 0, \pi, \pi, 0, 0, \pi, \pi, \dots\}$$

(Expression 16)

[17]

$$\{\psi_{2,2}(1), \psi_{2,2}(2), \psi_{2,2}(3), \psi_{2,2}(4), \psi_{2,2}(5), \psi_{2,2}(6), \psi_{2,2}(7), \psi_{2,2}(8), \dots\} = \{0, \pi, \pi, 0, 0, \pi, \pi, 0, \dots\}$$

(Expression 17)

As given by Expressions 15 to 17, when the phase rotation amounts are set to $\varphi_{ndm}=2\pi(ndm-1)/N_{DM}$, into which 2π is equally divided, coded Doppler phase rotation amounts $\psi_{1,1}(m)$, $\psi_{1,2}(m)$, and $\psi_{2,2}(m)$ are changed in transmission periods given by $N_{DM} \times N_{CM}$=2×2=4.

As another example, $\varphi_{ndm}=2\pi(ndm)/N_{DM}$ may be used as the phase rotation amount for applying Doppler shift amount $DOP_{ndm}$, and phase rotation amount $\varphi_1$=π for applying Doppler shift amount $DOP_1$ and phase rotation amount $\varphi_2$=0 for applying Doppler shift amount $DOP_2$ may be set. In this case, encoder 107 sets coded Doppler phase rotation amounts $\psi_{1,1}(m)$, $\psi_{1,2}(m)$, and $\psi_{2,2}(m)$ as given by following Expressions 18 to 20 and outputs coded Doppler phase rotation amounts $\psi_{1,1}(m)$, $\psi_{1,2}(m)$, and $\psi_{2,2}(m)$ to phase rotators 108. Here, m=1, . . . , Nc.

[18]

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \dots\} = \{0, 0, \pi, \pi, 0, 0, \pi, \pi, \dots\}$$

(Expression 18)

[19]

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \dots\} = \{0, 0, 0, 0, 0, 0, 0, 0, \dots\}$$

(Expression 19)

[20]

$$\{\psi_{2,2}(1), \psi_{2,2}(2), \psi_{2,2}(3), \psi_{2,2}(4), \psi_{2,2}(5), \psi_{2,2}(6), \psi_{2,2}(7), \psi_{2,2}(8), \dots\} = \{0, \pi, 0, \pi, 0, \pi, 0, \pi, \dots\}$$

(Expression 20)

As given by Expressions 15 to 17 or Expressions 18 to 20, the number of phases (for example, two phases of 0 and π) used for the phase rotation amounts (for example, the phase rotation amounts for applying the Doppler shift amounts) is smaller than number Nt=3 of transmission antennas 109 used for multiplexing transmission. In other words, as given by Expressions 15 to 17 or Expressions 18 to 20, the number of phases (for example, two phases of 0 and π) used for the phase rotation amounts for applying the Doppler shift amounts is equal to number $N_{DM}=2$ of Doppler shift amounts used for multiplexing transmission (in other words, the number of Doppler multiplexing).

In addition, for example, a description will be given of a case where in encoder 107, number Nt of transmission antennas used for multiplexing transmission is 6, number $N_{DM}$ of Doppler multiplexing is 4, and number $N_{CM}$ of code multiplexing is 2, and orthogonal code sequences $Code_1=\{1, 1\}$ and $Code_2=\{1, -1\}$ with code length Loc=2 are used. In this case, for example, if numbers $N_{DOP\_CODE}(1)$, $N_{DOP\_CODE}(2)$, $N_{DOP\_CODE}(3)$, and $N_{DOP\_CODE}(4)$ of coded Doppler multiplexing are 1, 1, 2, and 2, respectively, encoder 107 sets coded Doppler phase rotation amounts $\psi_{1,1}(m)$, $\psi_{1,2}(m)$, ψ1, 3(m), ψ2, 3(m), ψ1, 4(m), and ψ2, 4(m) given by following Expressions 21 to 26 and outputs coded Doppler phase rotation amounts $\psi_{1,1}(m)$, $\psi_{1,2}(m)$, ψ1, 3(m), ψ2, 3(m), ψ1, 4(m), and ψ2, 4(m) to phase rotators 108. Here, m=1, . . . , Nc.

[21]
$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \{0, 0, \phi_1, \phi_1, 2\phi_1, 2\phi_1, 3\phi_1, 3\phi_1, \ldots\}$$
(Expression 21)

[22]
$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \{0, 0, \phi_2, \phi_2, 2\phi_2, 2\phi_2, 3\phi_2, 3\phi_2, \ldots\}$$
(Expression 22)

[23]
$$\{\psi_{1,3}(1), \psi_{1,3}(2), \psi_{1,3}(3), \psi_{1,3}(4), \psi_{1,3}(5), \psi_{1,3}(6), \psi_{1,3}(7), \psi_{1,3}(8), \ldots\} = \{0, 0, \phi_3, \phi_3, 2\phi_3, 2\phi_3, 3\phi_3, 3\phi_3, \ldots\}$$
(Expression 23)

[24]
$$\{\psi_{2,3}(1), \psi_{2,3}(2), \psi_{2,3}(3), \psi_{2,3}(4), \psi_{2,3}(5), \psi_{2,3}(6), \psi_{2,3}(7), \psi_{2,3}(8), \ldots\} = \{0, \pi, \phi_3, \phi_3+\pi, 2\phi_3, 2\phi_3+\pi, 3\phi_3, 3\phi_3+\pi, \ldots\}$$
(Expression 24)

[25]
$$\{\psi_{1,4}(1), \psi_{1,4}(2), \psi_{1,4}(3), \psi_{1,4}(4), \psi_{1,4}(5), \psi_{1,4}(6), \psi_{1,4}(7), \psi_{1,4}(8), \ldots\} = \{0, 0, \phi_4, \phi_4, 2\phi_4, 2\phi_4, 3\phi_4, 3\phi_4, \ldots\}$$
(Expression 25)

[26]
$$\{\psi_{2,4}(1), \psi_{2,4}(2), \psi_{2,4}(3), \psi_{2,4}(4), \psi_{2,4}(5), \psi_{2,4}(6), \psi_{2,4}(7), \psi_{2,4}(8), \ldots\} = \{0, \pi, \phi_4, \phi_4+\pi, 2\phi_4, 2\phi_4+\pi, 3\phi_4, 3\phi_4+\pi, \ldots\}$$
(Expression 26)

Here, as an example, $\varphi_{ndm}=2\pi(ndm-1)/N_{DM}$ is used as the phase rotation amount for applying Doppler shift amount $DOP_{ndm}$, and phase rotation amount $\varphi_1=0$ for applying Doppler shift amount $DOP_1$, phase rotation amount $\varphi_2=\pi/2$ for applying Doppler shift amount $DOP_2$, phase rotation amount $\varphi_3=\pi$ for applying Doppler shift amount $DOP_3$, and phase rotation amount $\varphi_4=3\pi/2$ for applying Doppler shift amount $DOP_4$ are used. In this case, encoder 107 sets coded Doppler phase rotation amounts $\psi_{1,1}(m)$, $\psi_{1,2}(m)$, ψ1, 3(m), ψ2, 3(m), ψ1, 4(m), and ψ2, 4(m) given by following Expressions 27 to 32 and outputs coded Doppler phase rotation amounts $\psi_{1,1}(m)$, $\psi_{1,2}(m)$, ψ1, 3(m), ψ2, 3(m), ψ1, 4(m), and ψ2, 4(m) to phase rotators 108. Here, m=1, . . . , Nc.

[27]
$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \{0, 0, 0, 0, 0, 0, 0, 0, \ldots\}$$
(Expression 27)

[28]
$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \left\{0, 0, \frac{\pi}{2}, \frac{\pi}{2}, \pi, \pi, \frac{3\pi}{2}, \frac{3\pi}{2}, \ldots\right\}$$
(Expression 28)

[29]
$$\{\psi_{1,3}(1), \psi_{1,3}(2), \psi_{1,3}(3), \psi_{1,3}(4), \psi_{1,3}(5), \psi_{1,3}(6), \psi_{1,3}(7), \psi_{1,3}(8), \ldots\} = \{0, 0, \pi, \pi, 0, 0, \pi, \pi, \ldots\}$$
(Expression 29)

[30]
$$\{\psi_{2,3}(1), \psi_{2,3}(2), \psi_{2,3}(3), \psi_{2,3}(4), \psi_{2,3}(5), \psi_{2,3}(6), \psi_{2,3}(7), \psi_{2,3}(8), \ldots\} = \{0, \pi, \pi, 0, 0, \pi, \pi, 0, \ldots\}$$
(Expression 30)

[31]
$$\{\psi_{1,4}(1), \psi_{1,4}(2), \psi_{1,4}(3), \psi_{1,4}(4), \psi_{1,4}(5), \psi_{1,4}(6), \psi_{1,4}(7), \psi_{1,4}(8), \ldots\} = \left\{0, 0, \frac{3\pi}{2}, \frac{3\pi}{2}, \pi, \pi, \frac{\pi}{2}, \frac{\pi}{2}, \ldots\right\}$$
(Expression 31)

[32]
$$\{\psi_{2,4}(1), \psi_{2,4}(2), \psi_{2,4}(3), \psi_{2,4}(4), \psi_{2,4}(5), \psi_{2,4}(6), \psi_{2,4}(7), \psi_{2,4}(8), \ldots\} = \left\{0, \pi, \frac{3\pi}{2}, \frac{\pi}{2}, \pi, 0, \frac{\pi}{2}, \frac{3\pi}{2}, \ldots\right\}$$
(Expression 32)

As given by Expressions 27 to 32, when the phase rotation amounts are set to $\varphi_{ndm}=2\pi(ndm-1)/N_{DM}$, into which 2π is equally divided, coded Doppler phase rotation amounts $\psi_{1,1}(m)$, $\psi_{1,2}(m)$, ψ1, 3(m), ψ2, 3(m), ψ1, 4(m), and ψ2, 4(m) are changed in transmission periods given by $N_{DM} \times N_{CM}=4\times2=8$.

Further, as illustrated in Expressions 27 to 32, the number of phases used for the phase rotation amounts (e.g., the phase rotation amounts for applying the Doppler shift amounts) (e.g., four phases of 0, π/2, π, and 3π/2) is less than number Nt=6 of transmission antenna 109 used for multiplexing transmission. In other words, as given by Expressions 27 to 32, the number of phases (for example, four phases of 0, π/2, π, and 3π/2) used for the phase rotation amounts for applying the Doppler shift amounts is equal to number $N_{DM}$=4 of Doppler shift amounts used for multiplexing transmission (in other words, the number of Doppler multiplexing).

The description has been given of, as examples, the settings of phase rotation amounts in a case where number Nt of transmission antennas 109 is 3 and number $N_{DM}$ of Doppler multiplexing is 2 and in a case where number Nt of transmission antennas 109 is 6 and number $N_{DM}$ of Doppler multiplexing is 4. However, number Nt of transmission antennas 109 and number $N_{DM}$ of Doppler multiplexing are not limited to the values described above. For example, the number of phases used for the phase rotation amounts may be set smaller than number Nt of transmission antennas 109 used for multiplexing transmission, regardless of number Nt of transmission antennas 109. Further, the number of phases used for the phase rotation amounts for applying the Doppler shift amounts may be equal to number $N_{DM}$ of Doppler shift amounts used for multiplexing transmission.

Further, the above example has been described with respect to the maximum equal-interval Doppler shift amount setting of the phase rotation amounts. However, the setting of the phase rotation amounts is not limited thereto, and the equal-interval Doppler shift amount setting of the phase rotation amounts (for example, Expression 6) may be used.

The foregoing description has been given of the method for phase rotation amount setter 105 to set the phase rotation amounts.

In FIG. 1, phase rotators 108 apply the phase rotation amounts in each transmission period Tr to the chirp signals inputted from radar transmission signal generator 101, based on coded Doppler phase rotation amounts $\psi_{ndop\_code(ndm),\ ndm}(m)$ set by phase rotation amount setter 105. Here, ndm=1, . . . , $N_{DM}$, and ndop_code(ndm)= 1, . . . , $N_{DOP\_CODE}$(ndm).

The sum of numbers $N_{DOP\_CODE}$(1), $N_{DOP\_CODE}$(2), . . . , and $N_{DOP\_CODE}(N_{DM})$ of coded Doppler multiplexing is set to be equal to number Nt of transmission antennas 109, and Nt coded Doppler phase rotation amounts are respectively inputted to Nt phase rotators 108.

Each of Nt phase rotators 108 applies, in each transmission period Tr, inputted coded Doppler phase rotation amount $\psi_{ndop\_code(ndm),\ ndm}(m)$ to a chirp signal inputted from radar transmission signal generator 101. The outputs of Nt phase rotators 108 (referred to as, for example, coded Doppler multiplexed signals) are amplified to a defined transmission power and are then radiated into space from Nt transmission antennas 109 of a transmission array antenna section.

In the following, phase rotator 108 that applies coded Doppler phase rotation amount $\psi_{ndop\_code(ndm),\ ndm}(m)$ is represented by "phase rotator PROT #[ndop_code(ndm), ndm]." Likewise, transmission antenna 109 that radiates the output of phase rotator PROT #[ndop_code(ndm), ndm] into a space is represented by "transmission antenna Tx #[ndop_code(ndm), ndm]." Here, ndm=1, . . . , $N_{DM}$, and ndop_code (ndm)=1, . . . , $N_{DOP\_CODE}$(ndm).

For example, a description will be given of a case where number Nt of transmission antennas used for multiplexing transmission is 3, number $N_{DM}$ of Doppler multiplexing is 2, number $N_{CM}$ of code multiplexing is 2, orthogonal code sequences Code$_1$={1, 1} and Code$_2$={1, −1} with code length Loc=2 are set, and numbers $N_{DOP\_CODE}$(1) and $N_{DOP\_CODE}$(2) of coded Doppler multiplexing are 1 and 2, respectively. In this case, coded Doppler phase rotation amounts $\psi_{1,1}(m)$, $\psi_{1,2}(m)$, and $\psi_{2,2}(m)$ are outputted from encoder 107 to phase rotators 108 in each transmission period.

For example, phase rotator PROT #[1, 1] applies, in each transmission period, phase rotation amount $\psi_{1,1}(m)$ given by following Expression 33 to a chirp signal generated by radar transmission signal generator 101 in each transmission period. The output of phase rotator PROT #[1, 1] is outputted from transmission antenna Tx #[1, 1]. Here, cp(t) denotes a chirp signal for each transmission period.

[33]

$$\exp[j\psi_{1,1}(1)]cp(t), \exp[j\psi_{1,1}(2)]cp(t), \qquad \text{(Expression 33)}$$
$$\exp[j\psi_{1,1}(3)]cp(t), \ldots, \exp[j\psi_{1,1}(Nc)]cp(t)$$

Likewise, phase rotator PROT #[1, 2] applies, in each transmission period, phase rotation amount $\psi_{1,2}(m)$ given by following Expression 34 to a chirp signal generated by radar transmission signal generator 101 in each transmission period. The output of phase rotator PROT #[1, 2] is outputted from transmission antenna Tx #[1, 2].

[34]

$$\exp[j\psi_{1,2}(1)]cp(t), \exp[j\psi_{1,2}(2)]cp(t), \qquad \text{(Expression 34)}$$
$$\exp[j\psi_{1,2}(3)]cp(t), \ldots, \exp[j\psi_{1,2}(Nc)]cp(t)$$

Likewise, phase rotator PROT #[2, 2] applies, in each transmission period, phase rotation amount $\psi_{2,2}(m)$ given by following Expression 35 to a chirp signal generated by radar transmission signal generator 101 in each transmission period. The output of phase rotator PROT #[2, 2] is outputted from transmission antenna Tx #[2, 2].

[35]

$$\exp[j\psi_{2,2}(1)]cp(t), \exp[j\psi_{2,2}(2)]cp(t), \qquad \text{(Expression 35)}$$
$$\exp[j\psi_{2,2}(3)]cp(t), \ldots, \exp[j\psi_{2,2}(Nc)]cp(t)$$

The foregoing description has been given of an example of setting of coded Doppler phase rotation amount $\psi_{ndop\_code(ndm),\ ndm}(m)$.

Further, in the present embodiment, the arrangement of transmission antennas 109 and the assignment of the coded Doppler phase rotation amounts are, for example, associated with each other as described below. This association allows radar apparatus 10 to utilize, in radar processing, the transmission antennas such that the number thereof is made greater than the number of transmission antennas 109 for multiplexing transmission.

For example, at least a pair of adjacent transmission antennas 109 transmit radar transmission signals using the same Doppler multiplexing (e.g., the same Doppler shift amount). For example, adjacent $N_{DOP\_CODE}(ndm_{\_BF})$ transmission antennas 109 include transmission antenna Tx #[1, $ndm_{\_BF}$], transmission antenna Tx #[2, $ndm_{\_BF}$], . . . , and transmission antenna Tx #[$N_{DOP\_CODE}(ndm_{\_BF})$, $ndm_{\_BF}$] to which phase rotator PROT #[1, $ndm_{\_BF}$], phase rotator PROT #[2, $ndm_{\_BF}$], . . . , and phase rotator PROT #[$N_{DOP\_CODE}(ndm_{\_BF})$, $ndm_{\_BF}$] are assigned. Here, ndm$_{\_BF}$ is any value of 1, . . . , and N$_{DM}$ and is 1< N$_{DOP\_CODE}$(ndm$_{\_BF}$)≤N$_{CM}$. In other words, among a plurality of combinations of Doppler shift amounts DOP$_{ndm}$ and the orthogonal code sequences, the Doppler shift amount is the same (e.g., ndm=ndm$_{\_BF}$) between combinations associated respectively with adjacent transmission antennas 109 of the plurality of transmission antennas 109.

For example, one or more combinations may be included that satisfy the aforementioned association between the assignment of the coded Doppler phase rotation amounts and the arrangement of transmission antennas 109.

By way of example, a description will be given of a case where number Nt of transmission antennas used for multiplexing transmission is 3, number N$_{DM}$ of Doppler multiplexing is 2, number N$_{CM}$ of code multiplexing is 2, orthogonal code sequences Code$_1$={1, 1} and Code$_2$={1, −1} with code length Loc=2 are used, and numbers N$_{DOP\_CODE}$(1) and N$_{DOP\_CODE}$(2) of coded Doppler multiplexing are 2 and 1, respectively. Note that number N$_{BF}$ of beam transmission antennas is set to 1, and ndm$_{\_BF}$=1 is used as an index of a Doppler multiplexed signal used for the beam transmission antenna.

Figure 12:
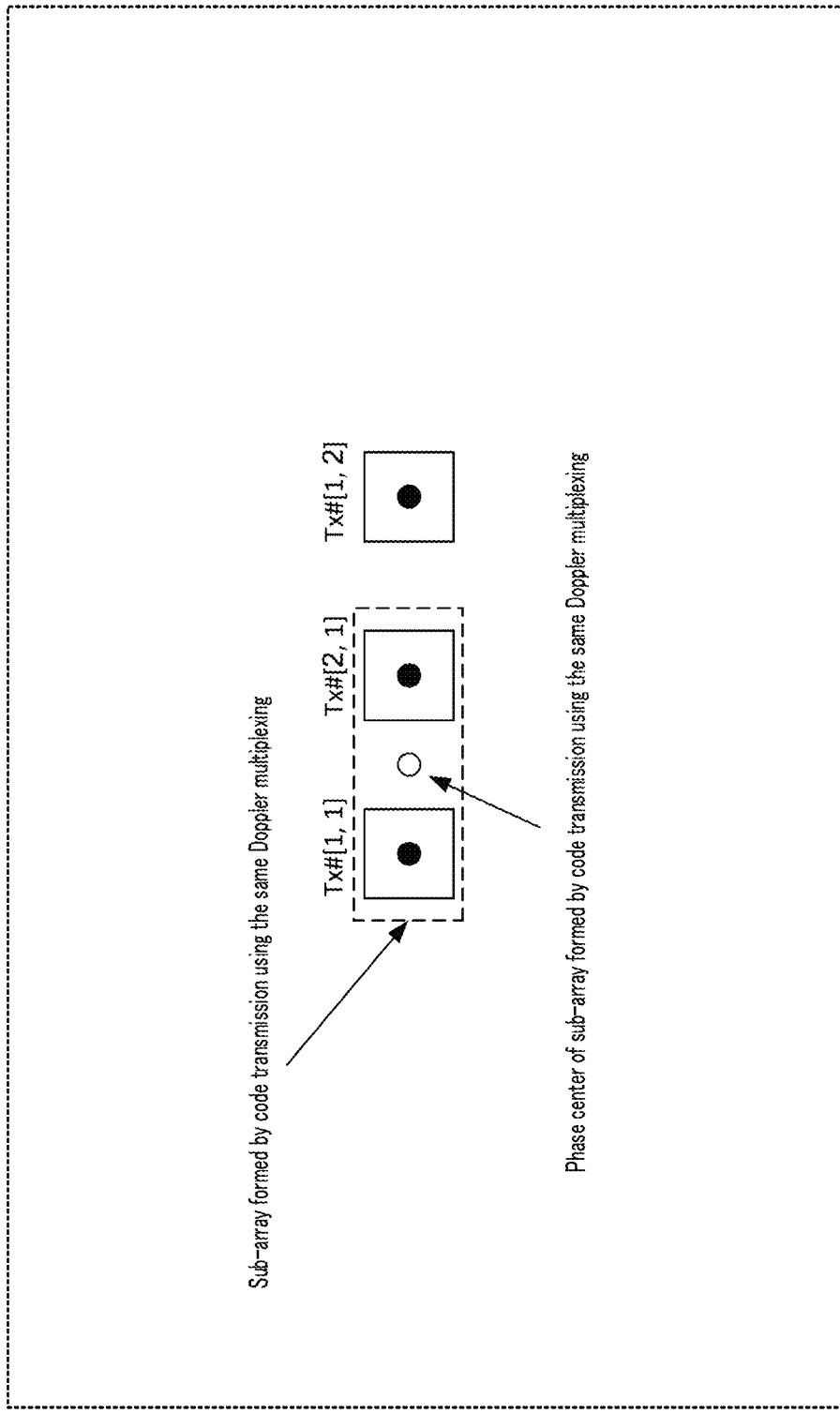
FIG. 12 illustrates an arrangement example of transmission antennas according to Embodiment 1.

In FIG. 12, for example, horizontally adjacent Nt=3 transmission antennas 109 are transmission antenna Tx #[1, 1], transmission antenna Tx #[2, 1], and transmission antenna Tx #[1, 2] from the left. In FIG. 12, left two (=N$_{DOP\_CODE}$(1)) adjacent transmission antennas Tx #[1, 1] and Tx #[2, 1] (first sub-array antenna) transmit radar transmission signals using the same Doppler multiplexing (Doppler shift amount=DOP$_1$).

By way of another example, a description will be given of a case where number Nt of transmission antennas used for multiplexing transmission is 4, number N$_{DM}$ of Doppler multiplexing is 2, number N$_{CM}$ of code multiplexing is 2, orthogonal code sequences Code$_1$={1, 1} and Code$_2$={1, −1} with code length Loc=2 are used, and numbers N$_{DOP\_CODE}$(1) and N$_{DOP\_CODE}$(2) of coded Doppler multiplexing are 2 and 2. Note that number N$_{BF}$ of beam transmission antennas is set to 2, and ndm$_{\_BF1}$=1 and ndm$_{\_BF2}$=2 are used as indices of Doppler multiplexed signals used for the beam transmission antennas.

Figure 13:
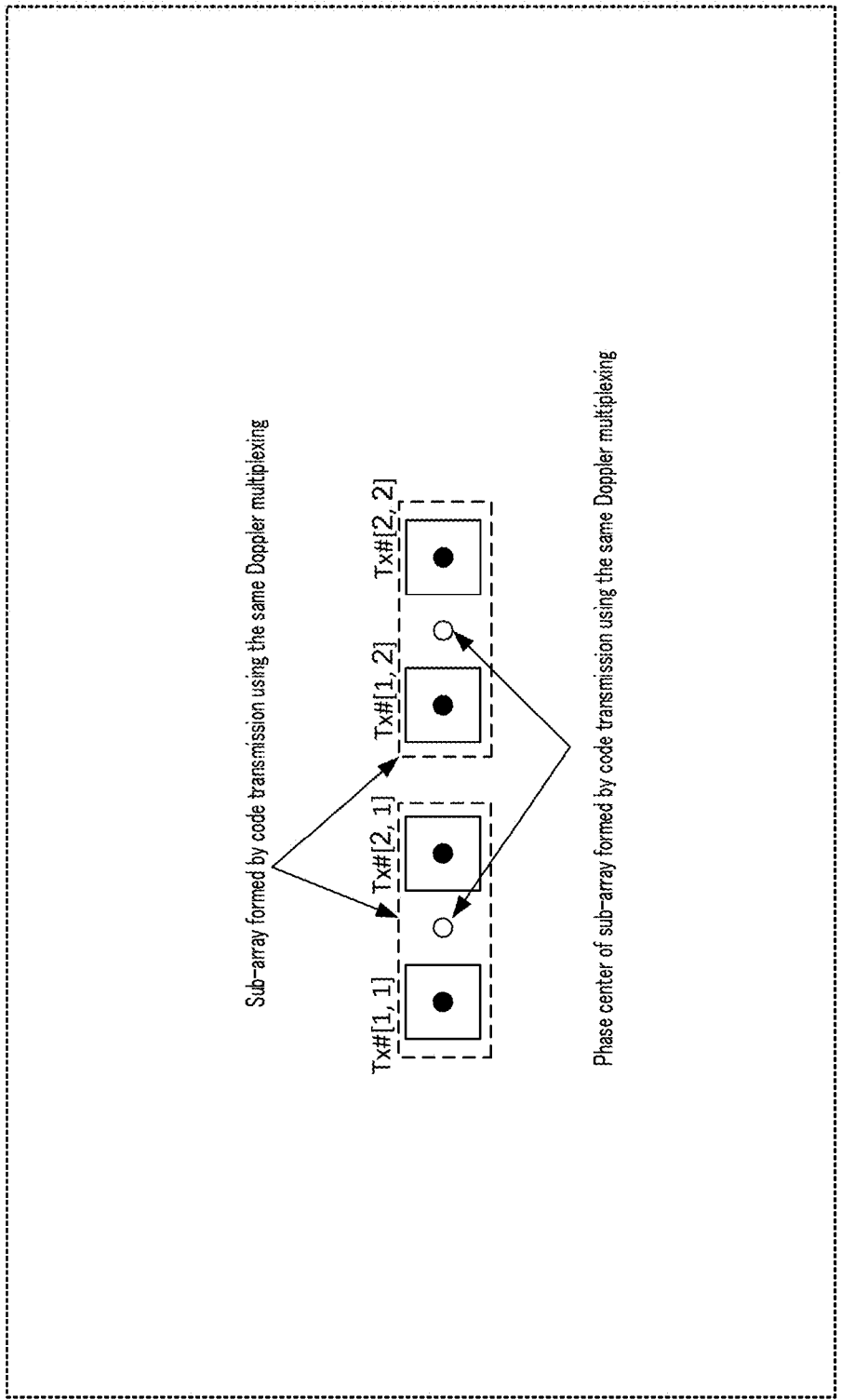
FIG. 13 illustrates an arrangement example of the transmission antennas according to Embodiment 1.

In FIG. 13, for example, horizontally adjacent Nt=4 transmission antennas 109 are transmission antenna Tx #[1, 1], transmission antenna Tx #[2, 1], transmission antenna Tx #[1, 2], and transmission antenna Tx #[2, 2] from the left. In FIG. 13, left two (=N$_{DOP\_CODE}$(1)) adjacent transmission antennas Tx #[1, 1] and Tx #[2, 1] (first sub-array antenna) transmit radar transmission signals using the same Doppler multiplexing (Doppler shift amount=DOP$_1$). Further, right two (=N$_{DOP\_CODE}$(2)) adjacent transmission antennas Tx #[1, 2] and Tx #[2, 2] (second sub-array antenna) transmit radar transmission signals using the same Doppler multiplexing (Doppler shift amount=DOP$_2$).

As is understood from these, at least one pair of adjacent transmission antennas 109 transmit radar transmission signals using the same Doppler multiplexing. In other words, at least one pair of adjacent transmission antennas 109 perform code multiplexing transmission using the same Doppler multiplexing.

Here, reception signals for each transmission period that correspond to the radar transmission signals on which the code multiplexing transmission is performed using the same Doppler multiplexing can be regarded as reception signals corresponding to orthogonal beam transmission by a plurality of transmission antennas 109. For example, the transmission by at least one pair of adjacent transmission antennas 109 described above is equivalent to orthogonal beam transmission by a sub-array composed of such adjacent transmission antennas 109. When a radar transmission signal is transmitted from the at least one pair of adjacent transmission antennas 109 described above, for example, at an equal power, such transmission may be treated as transmission by a new transmission antenna (hereinafter, referred to as a "beam transmission antenna") for which a midpoint position between adjacent transmission antennas 109 serves as the phase center of the sub-array (details will be described later in conjunction with the reception processing). Note that, when the radar transmission signal is not transmitted at an equal power from transmission antennas 109 constituting the beam transmission antenna, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

The transmission method as described above allows radar apparatus 10 to utilize the transmission antennas such that the number thereof is made greater than number Nt of transmission antennas for multiplexing transmission.

Note that, the example in which transmission antennas 109 are horizontally arranged has been described with reference to FIGS. 12 and 13, the arrangement method of transmission antennas 109 is not limited thereto. For example, transmission antennas 109 may be vertically arranged, or may be arranged in a horizontal and vertical plane. Further, antennas constituting transmission antennas 109 may be composed of a plurality of horizontally arranged sub-array elements, a plurality of vertically arranged sub-array elements, or a plurality of sub-array elements arranged in a horizontal and vertical plane. In addition, the antennas illustrated in FIGS. 12 and 13 may be a part of a plurality of antennas that radar apparatus 10 includes.

As is understood, in the present embodiment, each of a plurality of transmission antennas 109 is associated with the combination (in other words, assignment) of Doppler shift amount DOP$_{ndm}$ and orthogonal code sequence Code$_{ncm}$ such that at least one of Doppler shift amount DOP$_{ndm}$ and orthogonal code sequence Code$_{ncm}$ differs from combination to combination.

Further, in the present embodiment, when numbers N$_{DOP\_CODE}$(ndm) of coded Doppler multiplexing for the Doppler multiplexed signals are set non-uniformly, the numbers of multiplexing by orthogonal code sequences Code$_{ncm}$ (in other words, numbers N$_{DOP\_CODE}$(ndm) of coded Doppler multiplexing) corresponding respectively to Doppler shift amounts DOP$_{ndm}$ may be different among the combinations of Doppler shift amounts DOP$_{ndm}$ and orthogonal code sequences Code$_{ncm}$. By way of example, as illustrated in FIG. 3, Nt transmission antennas 109 may at least include a plurality of (e.g., two) transmission antennas 109 from which transmission signals that are code-multiplexed using different orthogonal code sequences are transmitted, and at least one transmission antenna 109 from which a transmission signal that is not code-multiplexed is transmitted. In other words, radar transmission signals transmitted from radar transmitter 100 include at least a coded Doppler multiplexed signal for which number N$_{DOP\_CODE}$(ndm) of coded Doppler multiplexing is set to number N$_{CM}$ of codes, and a coded Doppler multiplexed signal for which number N$_{DOP\_CODE}$(ndm) of coded Doppler multiplexing is set smaller than number N$_{CM}$ of codes.

Further, in the present embodiment, when numbers N$_{DOP\_CODE}$(ndm) of coded Doppler multiplexing for the Doppler multiplexed signals are set uniformly, the numbers of multiplexing by orthogonal code sequences $Code_{ncm}$ (in other words, numbers $N_{DOP\_CODE}$(ndm) of coded Doppler multiplexing) corresponding respectively to Doppler shift amounts $DOP_{ndm}$ may be the same among the combinations of Doppler shift amounts $DOP_{ndm}$ and orthogonal code sequences $Code_{ncm}$.

[Configuration of Radar Receiver 200]

In FIG. 1, radar receiver 200 includes Na reception antennas 202, which constitute an array antenna. Radar receiver 200 further includes Na antenna system processors 201-1 to 201-Na, constant false alarm rate (CFAR) section 211, coded Doppler demultiplexer 212, peak extractor 213, and direction estimator 214.

Each of reception antennas 202 receives a reflected wave signal that is a radar transmission signal reflected from a target object (target), and outputs the received reflected wave signal to the corresponding one of antenna system processors 201 as a reception signal.

Each of antenna system processors 201 includes reception radio 203 and signal processor 206.

Figure 14:
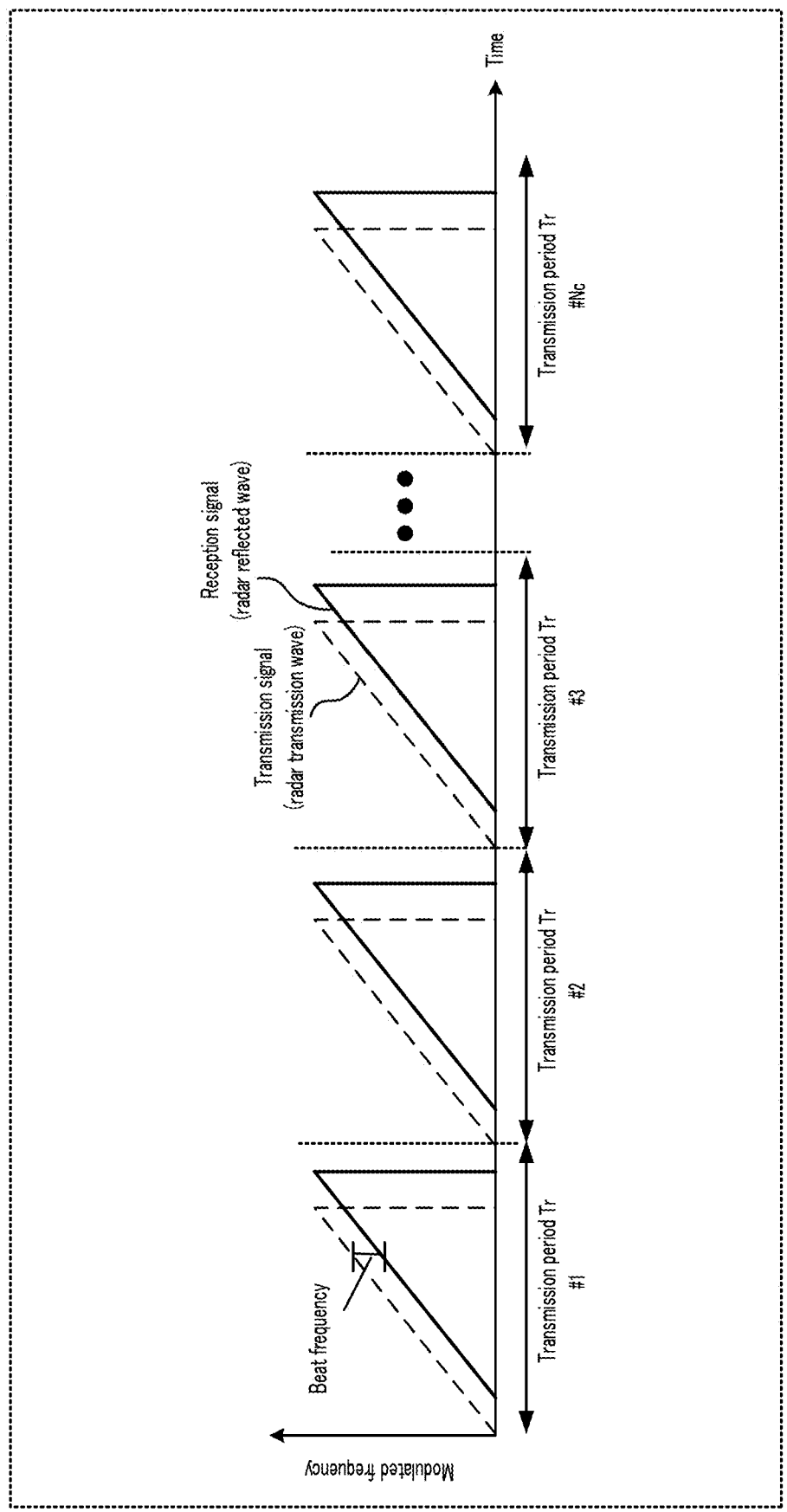
FIG. 14 illustrates an example of transmission signals and reception signals in a case where a chirp pulse is used.

Reception radio 203 includes mixer 204 and low pass filter (LPF) 205. Reception radio 203 mixes, at mixer 204, a chirp signal inputted from radar transmission signal generator 101, which is a transmission signal, with the received reflected wave signal, and passes the resulting mixed signal through LPF 205. As a result, a beat signal having a frequency corresponding to the delay time of the reflected wave signal is acquired. For example, as illustrated in FIG. 14, the difference frequency between the frequency of a transmission chirp signal (transmission frequency-modulated wave) and the frequency of a reception chirp signal (reception frequency-modulated wave) is obtained as a beat frequency.

In each antenna system processor 201-z (where z is any of 1 to Na), signal processor 206 includes analog-to-digital (AD) converter 207, beat frequency analyzer 208, output switch 209, and Doppler analyzers 210.

The signal (for example, beat signal) outputted from LPF 205 is converted into discretely sampled data by AD converter 207 in signal processor 206.

Beat frequency analyzer 208 performs, in each transmission period Tr, FFT processing on $N_{data}$ pieces of discretely sampled data obtained in a defined time range (range gate). Signal processor 206 thus outputs a frequency spectrum in which a peak appears at a beat frequency dependent on the delay time of the reflected wave signal (radar reflected wave). In the FFT processing, for example, beat frequency analyzer 208 may perform multiplication by a window function coefficient such as the Han window or the Hamming window. The use of the window function coefficient can suppress sidelobes around the beat frequency peak.

Here, a beat frequency response obtained from the m-th chirp pulse transmission, which is outputted from beat frequency analyzer 208 in z-th signal processor 206, is represented by $RFT_z(f_b, m)$. Here, $f_b$ denotes the beat frequency index and corresponds to an FFT index (bin number). For example, $f_b=0, \ldots, N_{data}/2-1$, $z=1, \ldots, Na$, and $m=1, \ldots, N_C$. A beat frequency having smaller beat frequency index $f_b$ indicates a shorter delay time of the reflected wave signal (in other words, a shorter distance to the target object).

In addition, beat frequency index $f_b$ may be converted into distance information $R(f_b)$ using following Expression 36. Thus, in the following, beat frequency index $f_b$ is also referred to as "distance index $f_b$."

[36]

$$R(f_b) = \frac{C_0}{2B_w} f_b \quad \text{(Expression 36)}$$

Here, $B_w$ denotes a frequency-modulation bandwidth within the range gate for a chirp signal, and C0 denotes the speed of light.

Output switch 209 performs selective switching to output the output of beat frequency analyzer 208 for each transmission period to OC_INDEX-th Doppler analyzer 210 among Loc Doppler analyzers 210 based on orthogonal code element index OC_INDEX inputted from encoder 107 of phase rotation amount setter 105. In other words, output switch 209 selects OC_INDEX-th Doppler analyzer 210 given by Expression 11 for m-th transmission period Tr.

Signal processor 206 includes Loc Doppler analyzers 210-1 to 210-Loc. For example, data is inputted by output switch 209 to noc-th Doppler analyzer 210 in each of Loc transmission periods (Loc×Tr). Accordingly, noc-th Doppler analyzer 210 performs Doppler analysis for each distance index $f_b$ using data of Ncode transmission periods among Nc transmission periods (for example, using beat frequency response $RFT_z(f_b, m)$ inputted from beat frequency analyzer 208). Here, noc denotes the index of a code element, and noc=1, . . . , Loc.

For example, when Ncode is a power of 2, FFT processing is applicable in the Doppler analysis. In this case, the FFT size is Ncode, and a maximum Doppler frequency that is derived from the sampling theorem and in which no aliasing occurs is $\pm 1/(2Loc \times Tr)$. Further, the Doppler frequency interval of Doppler frequency index $f_s$ is $1/(Ncode \times Loc \times Tr)$, and the range of Doppler frequency index $f_s$ is given by $f_s = -Ncode/2, \ldots, 0, \ldots, Ncode/2-1$.

The following description will be given of a case where Ncode is a power of 2, as an example. Note that, when Ncode is not a power of 2, zero-padded data is included, for example, to allow FFT processing to be performed, with the data size (FFT size) being equal to a power of 2. In the FFT processing, Doppler analyzer 210 may perform multiplication by a window function coefficient such as the Han window or the Hamming window. The application of a window function can suppress sidelobes around the Doppler frequency peak.

For example, output $VFT_z^{noc}(f_b, f_s)$ of Doppler analyzer 210 of z-th signal processor 206 is given by following Expression 37. Here, j is the imaginary unit and z=1 to Na.

[37]

$$VFT_z^{noc}(f_b, f_s) = \sum_{s=0}^{N_{code}-1} RFT_z(f_b, L_{OC} \times s + noc) \exp\left[-j\frac{2\pi s f_s}{N_{code}}\right] \quad \text{(Expression 37)}$$

The processing by the constituent sections of signal processor 206 has been described above.

In FIG. 1, CFAR section 211 performs CFAR processing (in other words, adaptive threshold judgement) using the outputs of Loc Doppler analyzers 210 in each of the first to Na-th signal processors 206 and extracts distance indices $f_{b\_cfar}$ and Doppler frequency indices $f_{s\_cfar}$ that provide peak signals.

For example, CFAR section 211 performs power addition of outputs $VFT_z^{noc}(f_b, f_s)$ of Doppler analyzers 210 in first to Na-th signal processors 206, for example, as given by following Expression 38, so as to perform two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

[38]

$$PowerFT(f_b, f_s) = \sum_{z=1}^{N_a} \sum_{noc=1}^{L_{oc}} |VFT_z^{noc}(f_b, f_s)|^2 \quad \text{(Expression 38)}$$

CFAR section 211 adaptively sets a threshold and outputs, to coded Doppler demultiplexer 212, distance index $f_{b\_cfar}$ and Doppler frequency index $f_{s\_cfar}$ that provide a received power greater than the threshold, and received-power information $PowerFT(f_{b\_cfar}, f_{s\_cfar})$.

For example, when phase rotation amount $\varphi_{ndm}$ for applying Doppler shift amount $DOP_{ndm}$ is determined using Expression 5, the intervals between the Doppler shift amounts in the Doppler frequency domain, which are outputted from Doppler analyzers 210, are equal intervals, and $\Delta FD = Ncode/N_{DM}$ when intervals $\Delta FD$ of the Doppler shift amounts are represented by the intervals of the Doppler frequency indices. Accordingly, in the outputs of Doppler analyzers 210, a peak is detected for each Doppler-shift multiplexed signal at an interval of $\Delta FD$ in the Doppler frequency domain. Note that, when phase rotation amount $\varphi_{ndm}$ is determined using Expression 5, $\Delta FD$ may sometimes not be an integer depending on Ncode and $N_{DM}$. In this case, Expression 59 described below may be used to obtain $\Delta FD$ having an integer value. The following describes a reception processing operation using $\Delta FD$ having an integer value.

Figure 15:
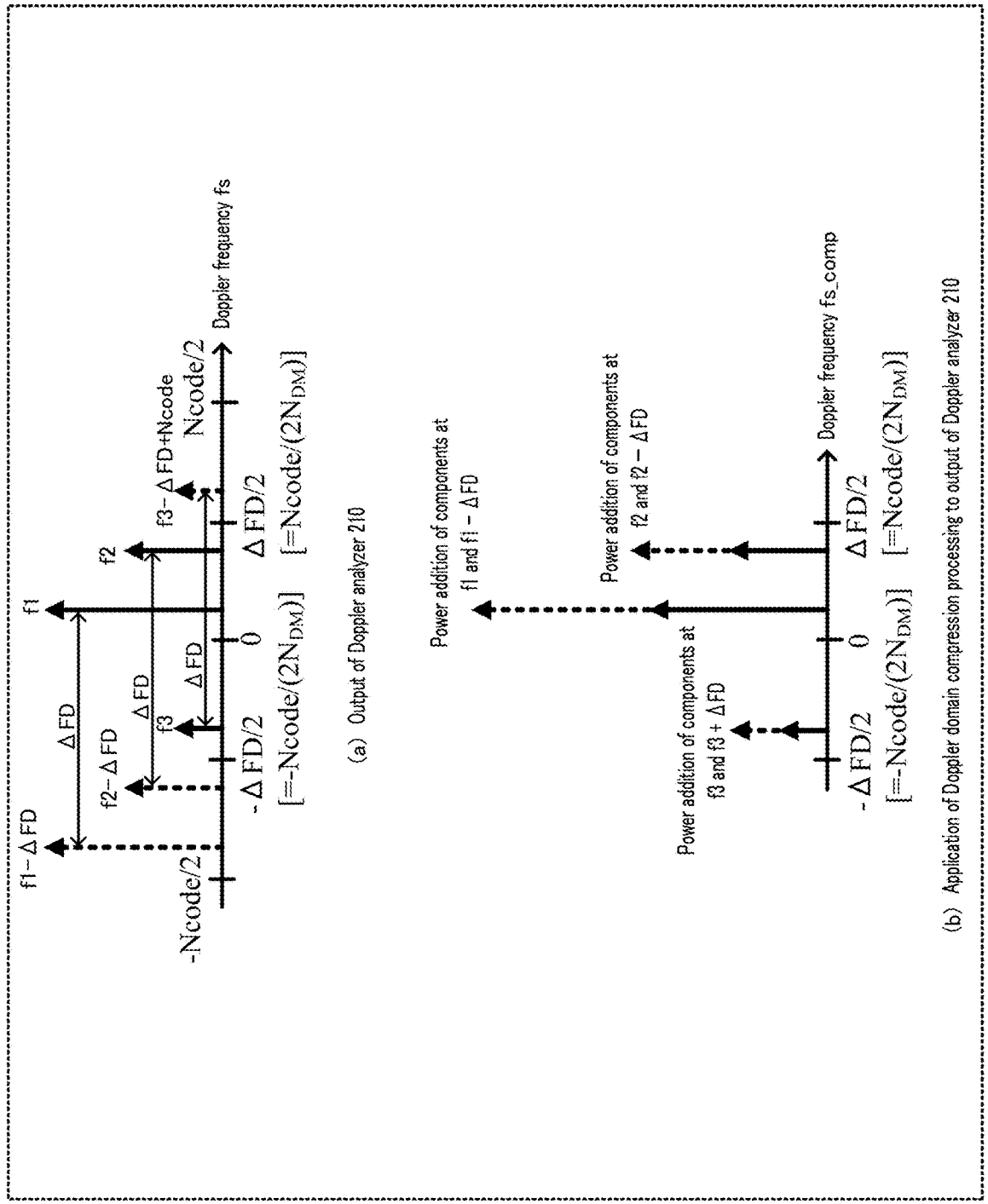
FIG. 15 illustrates an example of Doppler domain compression processing.

Part (a) in FIG. 15 illustrates an example of the outputs of Doppler analyzers 210 for the distances over which reflected waves from three targets exist in a case where $N_{DM}=2$. For example, as illustrated at (a) in FIG. 15, when reflected waves from the three targets are observed at Doppler frequency indices f1, f2, and f3, the reflected waves are also observed at respective Doppler frequency indices spaced from f1, f2 and f3 by the interval of $\Delta FD$ (for example, f1−$\Delta FD$, f2−$\Delta FD$, and f3−$\Delta FD$+Ncode).

Accordingly, CFAR section 211 may perform, as given by following Expression 39, power addition (referred to as, for example, "Doppler domain compression") with respect to the outputs of Doppler analyzers 210 while adjusting peak positions of Doppler-shift multiplexed signals to respective ranges resulting from division by the range of interval $\Delta FD$ of the Doppler shift amounts. Subsequently, CFAR section 211 may perform CFAR processing (referred to as, for example, "Doppler domain compression CFAR processing"). Here, $f_{s\_comp}=-\Delta FD/2, \ldots, -\Delta FD/2-1$. For example, when $\Delta FD=Ncode/N_{DM}$, then $f_{s\_comp}=Ncode/(2N_{DM}), \ldots, Ncode/(2N_{DM})-1$.

[39]

$$PowerFT_{comp}(f_b, f_{s\_comp}) = \sum_{nfd=1}^{N_{DM}} PowerFT \quad \text{(Expression 39)}$$

$$\left(f_b, f_{s\_comp} + \left(nfd - \text{ceil}\left(\frac{N_{DM}}{2}\right) - 1\right) \times \Delta FD\right)$$

However, in Expression 39, in the case of

[40]

$$f_{s\_comp} + \left(nfd - \text{ceil}\left(\frac{N_{DM}}{2}\right) - 1\right) \times \Delta FD < -Ncode/2,$$

the Doppler frequency index to which Ncode is added is used.

Likewise, in Expression 39, in the case of

[41]

$$f_{s\_comp} + \left(nfd - \text{ceil}\left(\frac{N_{DM}}{2}\right) - 1\right) \times \Delta FD > \frac{Ncode}{2} - 1,$$

the Doppler frequency index from which Ncode is further subtracted is used.

It is thus possible to compress the Doppler frequency range for the CFAR processing to $1/N_{DM}$ to reduce the amount of CFAR processing and to simplify the circuit configuration. In addition, CFAR section 211 is capable of power addition for $N_{DM}$ Doppler-shift multiplexed signals, to improve a signal to noise ratio (SNR) by about $(N_{DM})^{1/2}$. As a result, the radar sensing performance of radar apparatus 10 can be improved.

Part (b) in FIG. 15 illustrates an example of outputs that are the outputs of Doppler analyzers 210 illustrated at (a) in FIG. 15 to which the Doppler domain compression processing given by Expression 39 is applied. As illustrated at (b) in FIG. 15, in a case where $N_{DM}=2$, CFAR section 211 adds together the power component for Doppler frequency index f1 and the power component for f1−$\Delta FD$ through the Doppler domain compression processing and outputs the result. Likewise, as illustrated at (b) in FIG. 15, CFAR section 211 adds together the power component of Doppler frequency index f2 and the power component of f2−$\Delta FD$ and outputs the result. Further, regarding the power component of Doppler frequency index f3, f3−$\Delta FD$ is smaller than −Ncode/2. Thus, CFAR section 211 adds together the power component of Doppler frequency index f3 and the power component of f3−$\Delta FD$+Ncode (f3+$\Delta FD$ when $N_{DM}=2$, for example) and outputs the result.

As a result of the Doppler domain compression, the range of Doppler frequency indices $f_{s\_comp}$ in the Doppler frequency domain is reduced to the range of from −$\Delta FD/2$ through $\Delta FD/2-1$ (when $\Delta FD=Ncode/N_{DM}$, the range is from −$Ncode/(2N_{DM})$ through $Ncode/(2N_{DM})-1$) and the range of the CFAR processing is compressed, resulting in reduction of the computation amount of CFAR processing. In addition, in FIG. 15, for example, because of power addition for the reflected waves from the three targets, the SNR of the signal components is improved. Note that the power of noise components is also combined, and thus, improvement in SNR is, for example, about $(N_{DM})^{1/2}$.

For example, CFAR section 211, which uses the Doppler domain compression CFAR processing, adaptively sets a threshold and outputs, to coded Doppler demultiplexer 212, distance index $f_{b\_cfar}$ and Doppler frequency index $f_{s\_comp\_cfar}$ that provide a received power greater than the threshold, and received-power information PowerFT($f_{b\_cfar}$, $f_{s\_comp\_cfar}$+(nfd−ceil($N_{DM}/2$)−1)×ΔFD (where nfd=1, ... , $N_{DM}$)) for Doppler frequency indices ($f_{s\_comp\_cfar}$+(nfd−ceil($N_{DM}/2$)−1)×ΔFD) of $N_{DM}$ Doppler multiplexed signals.

In addition, CFAR section 211 outputs, for example, distance index $f_{b\_cfar}$ and Doppler frequency index $f_{s\_comp\_cfar}$ to peak extractor 213.

Note that phase rotation amount $\varphi_{ndm}$ for applying Doppler shift amount $DOP_{ndm}$ is not limited to that given by Expression 5. CFAR section 211 can apply the Doppler domain compression CFAR processing, for example, if phase rotation amounts $\varphi_{ndm}$ of Doppler-shift multiplexed signals are such that peaks are detected at constant intervals in the Doppler frequency domain in the outputs from Doppler analyzers 210.

For example, when $\Delta f_{MinInterval}=1/(T_r(N_{DM}+N_{int})LOC)$ is set using the equal-interval Doppler shift amount setting, phase rotation amount $\varphi_{ndm}$ is set according to Expression 6, and the Doppler-shift multiplexed signals are detected as peaks at the intervals of $\Delta FD=Ncode/(N_{DM}+N_{int})$ in the Doppler frequency domain in the outputs from the Doppler analyzers 210. Also in such a case, CFAR section 211 can apply the Doppler domain compression CFAR processing.

Next, an example of the operation of coded Doppler demultiplexer 212 illustrated in FIG. 1 will be described. The following describes an example of processing performed by coded Doppler demultiplexer 212 when CFAR section 211 uses the Doppler domain compression CFAR processing.

Based on the outputs of CFAR section 211 (e.g., distance indices $f_{b\_cfar}$, Doppler frequency indices $f_{s\_comp\_cfar}$, and received-power information PowerFT($f_{b\_cfar}$, $f_{s\_comp\_cfar}$+(nfd−ceil($N_{DM}/2$)−1)×ΔFD) for Doppler frequency indices ($f_{s\_comp\_cfar}$+(nfd−ceil($N_{DM}/2$)−1)×ΔFD (where nfd=1, ... , $N_{DM}$)) of $N_{DM}$ Doppler multiplexed signals), coded Doppler demultiplexer 212 separates, using the outputs of Doppler analyzers 210, coded-Doppler multiplexed signals transmitted, and distinguishes (in other words, also referred to as "judges" or "identifies") transmission antennas 109 and Doppler frequencies (in other words, Doppler velocities or relative velocities).

As described above, when the equal-interval Doppler shift amount setting including the maximum equal-interval Doppler shift amount setting is used, encoder 107 in phase rotation amount setter 105 does not set all of $N_{DM}$ numbers $N_{DOP\_CODE}(1), N_{DOP\_CODE}(2), \ldots,$ and $N_{DOP\_CODE}(N_{DM})$ of coded Doppler multiplexing to $N_{CM}$, for example, but may set at least one of the numbers of coded Doppler multiplexing to a value smaller than $N_{CM}$. For example, coded Doppler demultiplexer 212 performs (1) code separation processing to detect a coded Doppler multiplexed signal for which the number of coded Doppler multiplexing is set smaller than $N_{CM}$ (in other words, detect an unused coded Doppler multiplexed signal that is not used for multiplexing transmission), to perform aliasing judgement. Thereafter, coded Doppler demultiplexer 212 performs (2) Doppler code separation processing on coded Doppler multiplexed signals used for multiplexing transmission based on an aliasing judgement result.

Processing (1) and processing (2) by coded Doppler demultiplexer 212 described above will be described below.

<(1) Aliasing Judgement Processing (Detection Processing of Detecting Unused Coded Doppler Multiplexed Signal)>

Coded Doppler demultiplexer 212 performs the Doppler aliasing judgement processing, for example, on the assumption that the Doppler range of a target is ±1/(2Tr).

Here, each of Doppler analyzers 210 applies the FFT processing to each code element, for example, when Ncode is a power value of 2, and thus performs the FFT processing in periods of (Loc×Tr) using the output from beat frequency analyzer 208. Thus, for Doppler analyzer 210, the Doppler range in which no aliasing occurs according to the sampling theorem is ±1/(2Loc×Tr). Since Doppler multiplexing is further performed on this Doppler range of ±1/(2Loc×Tr) by using number $N_{DM}$ of Doppler multiplexing, coded Doppler demultiplexer 212 performs the aliasing judgement processing, assuming the Doppler range of ±1/(2Tr) resulting from multiplication, by Loc×$N_{DM}$, of the Doppler range of ±1/(2Loc×$N_{DM}$×Tr) in which aliasing due to Doppler multiplexing does not occur.

Here, by way of example, a description will be given of a case where Nt is 3, number $N_{DM}$ of Doppler multiplexing is 2, and number $N_{CM}$ of code multiplexing is 2. Here, phase rotation amount $\varphi_{ndm}$ for applying Doppler shift amount $DOP_{ndm}$ is assigned, for example, as given by Expression 5 that is based on the maximum equal-interval Doppler shift amount setting. In this case, phase rotation amount $\varphi_1$ for applying Doppler shift amount $DOP_1$ is 0, and, phase rotation amount $\varphi_2$ for applying Doppler shift amount $DOP_2$ is π. In addition, encoder 107 uses two orthogonal codes $Code_1=\{1, 1\}$ and $Code_2=\{1, -1\}$ among Walsh-Hadamard codes having code length Loc=2. Further, as illustrated at (a) in FIG. 3, $N_{DOP\_CODE}(1)=2$ and $N_{DOP\_CODE}(2)=1$ are used.

In this case, with respect to the Doppler range of ±1/(2Loc×$N_{DM}$×Tr)=±1/(8Tr) in which no aliasing due to the coded Doppler multiplexing occurs, coded Doppler demultiplexer 212 performs the aliasing judgement processing assuming the Doppler range of ±1/(2Tr) resulting from multiplication of the Doppler range of ±1/(2Loc×$N_{DM}$×Tr)=±1/(8Tr) by 4 (=Loc×$N_{DM}$).

Figure 16:
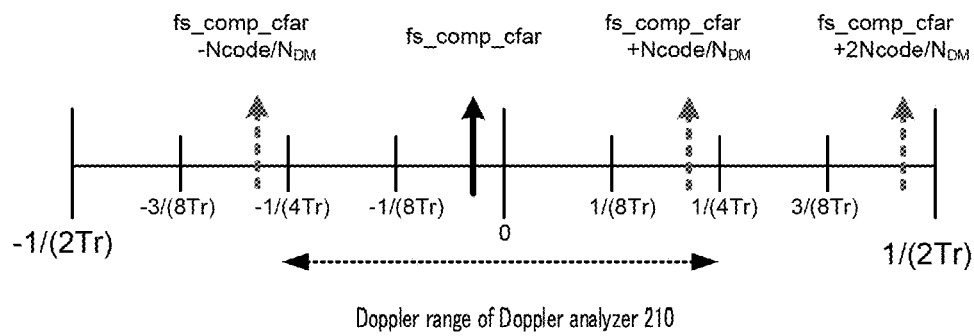
FIG. 16 illustrates an example of Doppler aliasing judgement.
Figure 16:
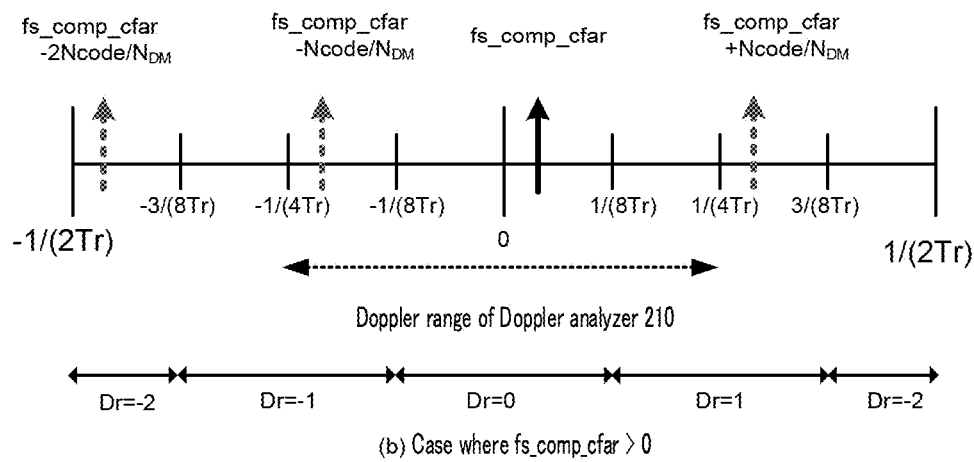

Here, Doppler component $VFT_z^{noc}(f_{b\_cfar}, f_{s\_comp\_cfar})$, which is the output of Doppler analyzer 210 corresponding to distance index $f_{b\_cfar}$ and Doppler frequency index $f_{s\_comp\_cfar}$ extracted in CFAR section 211, may contain a Doppler component including aliasing as illustrated at (a) and (b) in FIG. 16, for example, in the Doppler Range of ±1/(2Tr).

For example, as illustrated at (a) in FIG. 16, there is a possibility of four (=Loc×$N_{DM}$) Doppler components of $f_{s\_comp\_cfar}$−Ncode/$N_{DM}$, $f_{s\_comp\_cfar}$, $f_{s\_comp\_cfar}$±Ncode/$N_{DM}$, and $f_{s\_comp\_cfar}$+2Ncode/$N_{DM}$ in the case of $f_{s\_comp\_cfar}<0$ within the Doppler range of ±1/(2Tr) (the Doppler components may also be expressed using ΔFD=Ncode/$N_{DM}$ as $f_{s\_comp\_cfar}$−ΔFD, $f_{s\_comp\_cfar}$, $f_{s\_comp\_cfar}$+ΔFD, and $f_{s\_comp\_cfar}$+2ΔFD).

Further, for example, as illustrated at (b) in FIG. 16, there is a possibility of four (=Loc×$N_{DM}$) Doppler components of $f_{s\_comp\_cfar}$−2Ncode/$N_{DM}$, $f_{s\_comp\_cfar}$−Ncode/$N_{DM}$, $f_{s\_comp\_cfar}$, and $f_{s\_comp\_cfar}$+Ncode/$N_{DM}$ in the case of $f_{s\_comp\_cfar}>0$ within the Doppler range of ±1/(2Tr) (the Doppler components may also be expressed using ΔFD=Ncode/$N_{DM}$ as $f_{s\_comp\_cfar}$−2ΔFD, $f_{s\_comp\_cfar}$−ΔFD, $f_{s\_comp\_cfar}$, and $f_{s\_comp\_cfar}$+ΔFD). These possible Doppler components (four (=Loc×$N_{DM}$) components) with respect to $f_{s\_comp\_cfar}$ are called "Doppler component candidates" with respect to $f_{s\_comp\_cfar}$. In the following, Doppler regions in which such four (=Loc×$N_{DM}$) Doppler component candidates are present are represented using index "$D_r$" indicating the Doppler aliasing range as illustrated in FIG. 16. Dr is an index indicating the Doppler aliasing range, and for example, an integer value in a range of $D_r \in \{-\text{ceil}(\text{Loc} \times N_{DM}/2), \ldots, \text{ceil}(\text{Loc} \times N_{DM}/2)-1\}$ is used. In FIG. 16, $D_r = -2, \ldots, 1$. Note that, the region where $D_r = 0$ indicates the region where no Doppler aliasing occurs, and the regions where $D_r \neq 0$ indicate the regions where Doppler aliasing occurs. Further, the greater the absolute value of $D_r$, the more distant the Doppler region is from the Doppler region indicated by $D_r = 0$.

Coded Doppler demultiplexer 212 corrects phase changes corresponding to the four (=Loc×$N_{DM}$) Doppler components including aliasing within the Doppler range of ±1/(2Tr) as illustrated in FIG. 16, and performs the coded Doppler demultiplexing processing on the coded Doppler multiplexed signal for which the number of coded Doppler multiplexing is set smaller than $N_{CM}$ (in other words, the unused coded Doppler multiplexed signal).

Then, based on the received power of components obtained by the coded Doppler demultiplexing processing on the unused coded Doppler multiplexed signal, coded Doppler demultiplexer 212 judges whether or not each of the Doppler component candidates is a true Doppler component.

For example, coded Doppler demultiplexer 212 may detect, among the Doppler component candidates with respect to $f_{s\_comp\_cfar}$, a Doppler component having the minimum received power obtained by the coded Doppler demultiplexing processing based on the unused coded Doppler multiplexed signal, to judge that the detected Doppler component is the true Doppler component. In other words, coded Doppler demultiplexer 212 may judge that those of the Doppler component candidates with respect to $f_{s\_comp\_cfar}$ which have received powers different from the minimum received power are false Doppler components.

This aliasing judgement processing can resolve the ambiguity in the Doppler range of ±1/(2Tr). In addition, by this aliasing judgement processing, the range in which a Doppler frequency can be detected without ambiguity can be extended to a range of from −1/(2Tr) to less than 1/(2Tr) as compared with the Doppler range of ±1/(2Loc×$N_{DM}$×Tr)=±1/(8Tr) in which aliasing due to Doppler multiplexing does not occur.

By the coded Doppler demultiplexing based on the unused coded Doppler multiplexed signal, for example, the phase change of the true Doppler component is corrected and the orthogonality between the coded Doppler multiplexed signals used for multiplexing transmission and the unused coded Doppler multiplexed signal is maintained. Therefore, the coded Doppler multiplexed signal codes used for multiplexing transmission and the unused coded Doppler multiplexed signal become uncorrelated, and the received power becomes as low as a noise level.

On the other hand, the phase changes of false Doppler components are, for example, erroneously corrected and the orthogonality between the coded Doppler multiplexed signals used for multiplexing transmission and the unused coded Doppler multiplexed signal is not maintained. Thus, a correlated component (interference component) is caused between the coded Doppler multiplexed signal codes used for the multiplexing transmission and the unused coded Doppler multiplexed signal, and, for example, a received power greater than a noise level may be detected. Therefore, as described above, coded Doppler demultiplexer 212 may judge that the Doppler component having the minimum received power among the Doppler component candidates with respect to $f_{s\_comp\_cfar}$ resulting from the coded Doppler demultiplexing based on the unused coded Doppler multiplexed signal is the true Doppler component, and judge that the other Doppler components having the received powers different from the minimum received power are the false Doppler components.

For example, coded Doppler demultiplexer 212 corrects the phase changes corresponding to the Doppler components of the Doppler component candidates with respect to $f_{s\_comp\_cfar}$ based on the outputs of Doppler analyzers 210 in each antenna system processor 201, and calculates, according to Expression 40, received power $P_{DAR}(f_{b\_cfar}, f_{s\_comp\_p\_cfar}, D_r, \text{nuc}, \text{nud})$ after the code separation using the unused coded Doppler multiplexed signal.

Here, nuc and nud represent an index of an orthogonal code serving as the unused coded Doppler multiplexed signal and an index of the Doppler multiplexed signal, respectively. For example, in the case of (b) of FIG. 3, the unused coded Doppler multiplexed signal is indicated by a cross mark in the figure, is assigned the code of $Code_2$, and is assigned the Doppler shift amount of $DOP_1$. Accordingly, indices nuc and nud of the orthogonal code to which the unused coded Doppler multiplexed signal is assigned are 2 and 1, respectively.

In the following, a pair of the index of the orthogonal code and the index of the Doppler multiplexed signal that are used for the coded Doppler multiplexed signal is described as "DCI (index of orthogonal code, index of Doppler multiplexed signal)." DCI (nuc, nud) represents, for example, the index of an orthogonal code to which an unused coded Doppler multiplexed signal is assigned and the index of a Doppler multiplexed signal. For example, in the case of (b) in FIG. 3, the unused coded Doppler multiplexed signal is assigned to DCI (2, 1). Similarly, for example, in the case of (a) in FIG. 5, the unused coded Doppler multiplexed signal is assigned to DCI (2, 2) and DCI (2, 3). Further, for example, in the case of (c) in FIG. 6, the unused coded Doppler multiplexed signal is assigned to DCI (1, 2) and DCI (2, 3).

[42]

(Expression 40)
$$P_{DAR}(f_{b\_cfar}, f_{s\_comp\_cfar}, D_r, nuc, nud) = \sum_{z=1}^{N_a} |Y_z(f_{b\_cfar}, f_{s\_comp\_cfar}, D_r, nuc, nud)|^2$$

Here, $Y_z(f_{b\_cfar}, f_{s\_comp\_cfar}, D_r, \text{nuc}, \text{nud})$ is a received signal obtained by correction of the phase changes corresponding to the Doppler components of Doppler component candidates with respect to $f_{s\_comp\_cfar}$ and separation of the unused coded Doppler multiplexed signal to which DCI (nuc, nud) is assigned. The correction and separation are based on the outputs of Doppler analyzers 210 in z-th antenna system processor 201 as given by following Expression 41:

[43]

(Expression 41)
$$Y_z(f_{b_{cfar}}, f_{scomp_{cfar}}, D_r, nuc, nud) = \\ Code^*_{nuc}\{\alpha(f_{s\_comp\_cfar}, D_r) \otimes \\ VFTALL_z(f_{b\_cfar}, f_{s\_comp\_cfar}, D_r, nud)\}.$$

In Expressions 40 and 41, in order to separate the unused coded Doppler multiplexed signal to which DCI (nuc, nud) is assigned, the received powers after code separation using unused orthogonal code $Code_{nuc}$ are calculated with respect to outputs $VFTALL_z(f_{b\_cfar}, f_{s\_comp\_cfar}, D_r, \text{nud})$ of Doppler analyzers 210 in z-th antenna system processor 201, and the sum of such powers is calculated with respect to all the antenna system processors 201. Thus, it is possible to increase the aliasing judgement accuracy even when the received signal level is low. However, instead of Expression 40, the received powers after code separation using the unused coded Doppler multiplexed signal may be calculated with respect to the outputs of Doppler analyzers 210 in some of antenna system processors 201. Even in this case, it is possible to reduce the arithmetic processing amount while maintaining the aliasing judgement accuracy, for example, in a range where the received signal level is sufficiently high.

Note that, in Expressions 40 and 41, $D_r$ is an index indicating the Doppler aliasing range, and takes an integer value in a range of $D_r \in \{-\text{ceil}(\text{Loc} \times N_{DM}/2), \ldots, \text{ceil}(\text{Loc} \times N_{DM}/2)-1\}$, for example.

Further, in Expression 41, operator "$\otimes$" [44]

represents a product between each pair of elements of vectors having the same number of elements. For example, for n-th order vectors $A=[a_1, \ldots, a_n]$ and $B=[b_1, \ldots, b_n]$, the product between each pair of elements is expressed by following Expression 42:

[45]

$$A \otimes B = [a_1, \ldots, a_n] \otimes [b_1, \ldots, b_n] = [a_1 b_1, \ldots, a_n b_n]. \quad \text{(Expression 42)}$$

Moreover, in Expression 41, superscript T represents vector transposition, and superscript * (asterisk) represents a complex conjugate operator.

In Expression 41, $\alpha(f_{s\_comp\_cfar}, D_r)$ represents "Doppler phase correction vector." Doppler phase correction vector $\alpha(f_{s\_comp\_cfar}, D_r)$ corrects the Doppler phase rotation caused by a time difference between Doppler analyses of Loc Doppler analyzers 210 within Doppler aliasing range $D_r$ when Doppler frequency index $f_{s\_comp\_cfar}$ extracted in CFAR section 211 is in an output range (in other words, Doppler range) of Doppler analyzers 210 that does not include Doppler aliasing, for example.

For example, Doppler phase correction vector $\alpha(f_{s\_comp\_cfar}, D_r)$ is expressed by following Expression 43. For example, Doppler phase correction vector $\alpha(f_{s\_comp\_cfar}, D_r)$ as given by Expression 43 is a vector having, as an element, a Doppler phase correction factor. The Doppler phase correction factor corrects phase rotations of Doppler components having Doppler frequency indices $f_{s\_comp\_cfar}$ and being within Doppler aliasing range $D_r$. The phase rotations are caused by the time lags of Tr, 2Tr, ..., (Loc−1)Tr of the outputs of from output $VFT_z^2(f_{b\_cfar}, f_{s\_comp\_cfar})$ of second Doppler analyzer 210 to output $VFT_z^{Loc}(f_{b\_cfar}, f_{s\_comp\_cfar})$ of Loc-th Doppler analyzer 210, for example, with reference to the Doppler analysis time for analysis on output $VFT_z^1(f_{b\_cfar}, f_{s\_comp\_cfar})$ of first Doppler analyzer 210. Note that, the term "$D_r N_{code}/N_{DM}$" in Expression 43 can also be expressed as "$D_r \Delta FD$" using $\Delta FD = N code/N_{DM}$. Therefore, the expression is applicable in the other cases than the case of $\Delta FD = N code/N_{DM}$.

[46]

$$\alpha(f_{s\_comp\_cfar}, D_r) = \quad \text{(Expression 43)}$$

$$\left[ 1, \exp\left(-\frac{j2\pi\left(f_{s\_comp\_cfar} + \frac{D_r N_{code}}{N_{DM}}\right)}{N_{code}} \times \frac{1}{L_{oc}}\right), \ldots, \right.$$

$$\left. \exp\left(-\frac{j2\pi\left(f_{s\_comp\_cfar} + \frac{D_r N_{code}}{N_{DM}}\right)}{N_{code}} \times \frac{(L_{oc}-1)}{L_{oc}}\right) \right]^T$$

Such phase correction by Doppler phase correction vector $\alpha(f_{s\_comp\_cfar}, D_r)$ corresponds to correction of phase changes corresponding to Doppler components of the Doppler component candidates with respect to $f_{s\_comp\_cfar}$.

Further, for example, as given by following Expression 44, $VFTALL_z(f_{b\_cfar}, f_{s\_comp\_cfar}, D_r, \text{nud})$ in Expression 41 represents, in a vector format, components of an unused coded Doppler multiplexed signal to which DCI (nuc, nud) is assigned. The components are extracted within Doppler aliasing range $D_r$. The unused coded Doppler multiplexed signal corresponds to distance index $f_{b\_cfar}$ and Doppler frequency index $f_{s\_comp\_cfar}$ extracted in CFAR section 211 among outputs $VFT_z^{noc}(f_b, f_s)$ of Loc Doppler analyzers 210 in z-th antenna system processor 201. Here, noc=1, ..., Loc and noc takes an integer value in the range of $D_r=\{-\text{ceil}(\text{Loc} \times N_{DM}/2), \ldots, \text{ceil}(\text{Loc} \times N_{DM}/2)-1\}$.

$$VFTALL_z(f_{b\_cfar}, f_{s\_comp\_cfar}, D_r, \text{nud}) = \quad \text{(Expression 44)}$$

$$\left[ VFT_z^1\left(f_{bcfar}, f_{scomp_{cfar}} + \frac{N_{code} F_R(D_r, \text{nud})}{N_{DM}}\right) \ldots \right.$$

$$\left. VFT_z^{Loc}\left(f_{b_{cfar}}, f_{scomp_{cfar}} + \frac{N_{code} F_R(D_r, \text{nud})}{N_{DM}}\right) \right]^T$$

In Expression 44, $N_{code} F_R(D_r, \text{nud})/N_{DM}$ represents an offset value of the Doppler index of the nud-th Doppler multiplexed signal with respect to $f_{s\_comp\_cfar}$ within Doppler aliasing range $D_r$. Note that, the term "$N_{code} F_R(D_r, \text{nud})/N_{DM}$" in Expression 44 can also be expressed as $F_R(D_r, \text{nud})\Delta FD$ using $\Delta FD = N code/N_{DM}$. Therefore, the expression is applicable in the other cases than the case of $\Delta FD = N code/N_{DM}$. Here, ndm=1, ..., $N_{DM}$.

$F_R(D_r, \text{nud})$ can be set in advance when Doppler aliasing range $D_r$ and phase rotation amounts $\varphi_1, \varphi_2, \ldots,$ and $\varphi_{N\_DM}$ for applying Doppler shift amounts $DOP_1, DOP_2, \ldots,$ and $DOP_{N\_DM}$ are fixed. Therefore, for example, coded Doppler demultiplexer 212 may tabulate the correspondence between, on one hand, Doppler aliasing range $D_r$ and the phase rotation amounts and, on the other hand, $F_R(D_r, \text{nud})$, and may read $F_R(D_r, \text{nud})$ based on Doppler aliasing range $D_r$ and a phase rotation amount. Further, for example, when phase rotation amounts $\varphi_1, \varphi_2, \ldots,$ and $\varphi_{N\_DM}$ for applying Doppler shift amounts $DOP_1, DOP_2, \ldots,$ and $DOP_{N\_DM}$ satisfy $-\pi \leq \varphi_1 < \varphi_2 < \ldots < \varphi_{N\_DM} < \pi$, $F_R(D_r, \text{nud})$ can be expressed as in following Expression 45:

[48]

$$F_R(D_r, \text{nud}) = \text{mod}(\text{nud} - 1 - D_r, N_{DM}) - \text{ceil}\left(\frac{N_{DM}}{2}\right). \quad \text{(Expression 45)}$$

For example, in accordance with Expressions 40 and 41, coded Doppler demultiplexer 212 calculates, within each range of $D_r \in \{-\text{ceil}(\text{Loc} \times N_{DM}/2), \ldots, \text{ceil}(\text{Loc} \times N_{DM}/2)-1\}$, received power $P_{DAR}(f_{b\_cfar}, f_{s\_comp\_cfar}, D_r, \text{nuc}, \text{nud})$ after code separation using the unused coded Doppler multiplexed signal to which DCI (nuc, nud) is assigned.

Then, coded Doppler demultiplexer 212 detects a $D_r$ in which received power $P_{DAR}(f_{b\_cfar}, f_{s\_comp\_cfar}, D_r, \text{nuc}, \text{nud})$ is minimized among the ranges of $D_r$. In the following, $D_r$ in which received power $P_{DAR}(f_{b\_cfar}, f_{s\_comp\_cfar}, D_r, \text{nuc}, \text{nud})$ is minimized among the ranges of $D_r$ as given by following Expression 46 is referred to as "$D_{r\_min}$":

[49]

$$D_{r_{min}} = \qquad \text{(Expression 46)}$$
$$\left\{ \arg D_r \, \Big| \, \min_{D_r} P_{DAR}(f_{b\_cfar}, f_{s\_comp\_cfar}, D_r, \text{nuc}, \text{nud}) \right\}.$$

Note that when there are a plurality of unused coded Doppler multiplexed signals, coded Doppler demultiplexer 212 may use received power $\text{Pall}_{DAR}(f_{b\_cfar}, f_{s\_comp\_cfar}, D_r)$ after code separation using all unused orthogonal codes as given by following Expression 47, instead of received power $P_{DAR}(f_{b\_cfar}, f_{s\_comp\_cfar}, D_r, \text{nuc}, \text{nud})$:

[50]

$$\text{Pall}_{DAR}(f_{b\_cfar}, f_{s\_comp\_cfar}, D_r) = \qquad \text{(Expression 47)}$$
$$\sum_{nuc,nud} P_{DAR}((f_{b\_cfar}, f_{s\_comp\_cfar}, D_r, \text{nuc}, \text{nud}).$$

Obtaining the received power after code separation using all the unused orthogonal codes makes it possible to increase the accuracy of the aliasing judgement by the aliasing processing even when the reception signal level is low.

For example, coded Doppler demultiplexer 212 calculates $\text{Pall}_{DAR}(f_{b\_cfar}, f_{s\_comp\_cfar}, D_r)$ in each range of $D_r \in \{-\text{ceil}(\text{Loc} \times N_{DM}/2), \ldots, \text{ceil}(\text{Loc} \times N_{DM}/2)-1\}$, and detects $D_r$ (in other words, $D_{r\_min}$) in which $\text{Pall}_{DAR}(f_{b\_cfar}, f_{s\_comp\_cfar}, D_r)$ is minimized. For example, when Expression 47 is used, $D_r$ which provides the minimum received power among the ranges of $D_r$ is represented as "$D_{r\_min}$" as given by following Expression 48:

[51]

$$D_{r_{min}} = \left\{ \arg D_r \, \Big| \, \min_{D_r} \text{Pall}_{DAR}(f_{b\_cfar}, f_{s\_comp\_cfar}, D_r) \right\}. \qquad \text{(Expression 48)}$$

Further, coded Doppler demultiplexer 212 may perform processing for judging (in other words, measuring) the accuracy of the aliasing judgement, for example, by comparing minimum received power $\text{Pall}_{DAR}(f_{b\_cfar}, f_{s\_comp\_cfar}, D_{r\_min})$ after code separation using the unused coded Doppler multiplexed signal to which DCI (nuc, nud) is assigned, on the one hand, and received power $\text{PowerFT\_comp}(f_{b\_cfar}, f_{s\_comp\_cfar})$ of Expression 39 obtained in CFAR section 211 by performing power addition while adjusting peak positions of Doppler-shift multiplexed signals, on the other hand. In this case, coded Doppler demultiplexer 212 may judge the accuracy of the aliasing judgement in accordance with following Expressions 49 and 50, for example:

[52]

$$\text{Pall}_{DAR}(f_{b\_cfar}, f_{s\_comp\_cfar}, D_{rmin}) < \text{Threshold}_{DR} \times \qquad \text{(Expression 49)}$$
$$\text{PowerFT\_comp}(f_{b\_cfar}, f_{s\_comp\_cfar});$$

[53]

$$\text{Pall}_{DAR}(f_{b\_cfar}, f_{s\_comp\_cfar}, D_{rmin}) \geq \text{Threshold}_{DR} \times \qquad \text{(Expression 50)}$$
$$\text{PowerFT\_comp}(f_{b\_cfar}, f_{s\_comp\_cfar}).$$

For example, when minimum received power $\text{Pall}_{DAR}(f_{b\_cfar}, f_{s\_comp\_cfar}, D_{rmin})$ after code separation using the unused coded Doppler multiplexed signal to which DCI (nuc, nud) is assigned is smaller than the value obtained by multiplying, by predetermined value $\text{Threshold}_{DR}$, PowerFT\_comp($f_b$, and $f_{s\_comp\_cfar}$) for distance index $f_{b\_cfar}$ and Doppler frequency index $f_{s\_comp\_cfar}$ extracted in CFAR section 211 (for example, Expression 49), coded Doppler demultiplexer 212 judges that the aliasing judgement is sufficiently accurate. In this case, radar apparatus 10 may perform, for example, subsequent processing (e.g., code separation processing).

On the other hand, for example, when minimum received power $\text{Pall}_{DAR}(f_{b\_cfar}, f_{s\_comp\_cfar}, D_{rmin})$ after code separation using the unused coded Doppler multiplexed signal to which DCI (nuc, nud) is assigned is equal to or larger than the value obtained by multiplying PowerFT\_comp($f_b$, $f_{s\_comp\_cfar}$) by $\text{Threshold}_{DR}$ (for example, Expression 50), coded Doppler demultiplexer 212 judges that the accuracy of the aliasing judgement is not sufficient and the reliability of the aliasing judgement is low (for example, noise component). In this case, for example, radar apparatus 10 may omit to perform subsequent processing (e.g., code separation processing).

Such processing makes it possible to reduce a judgement error in aliasing judgement and to remove a noise component. Note that, predetermined value $\text{Threshold}_{DR}$ may, for example, be set to a range of from 0 to less than 1. By way of example, considering inclusion of a noise component, $\text{Threshold}_{DR}$ may be set in a range of approximately from 0.1 to 0.5.

The operation example of the aliasing processing has been described above.

<(2) Doppler Code Separation Processing on Coded Doppler Multiplexed Signal Used for Multiplexing Transmission>

Coded Doppler demultiplexer 212 performs coded Doppler demultiplexing processing on a coded Doppler multiplexed signal used for multiplexing transmission based on an aliasing judgement result.

For example, as given by following Expression 51, coded Doppler demultiplexer 212 applies Expression 41 based on $D_{rmin}$ that is a result of aliasing judgement in aliasing judgement processing, so as to separate and receive the coded Doppler multiplexed signal to which DCI (ncm, ndm) used for multiplexing transmission is assigned. For example, coded Doppler demultiplexer 212 performs the separation processing using following Expression 51 to separate and receive the coded Doppler multiplexed signal to which DCI (ncm, ndm) used for the multiplexing transmission is assigned. Since by the aliasing judgement processing it is possible to judge an index ($D_{rtrue}$) that is a true Doppler aliasing range within the Doppler range of from $-1/(2Tr)$ to less than $1/(2Tr)$ (in other words, it is possible to judge an index such that $D_{rmin} = D_{rtrue}$), it becomes possible for coded Doppler demultiplexer 212 to set, to zero, the correlation value between the orthogonal codes used for code multiplexing in the Doppler range of from −1/(2Tr) to less than 1/(2Tr), so as to perform the separation processing in which the interference between the code multiplexed signals is suppressed.

[54]

$$Y_z(f_{b\_cfar}, f_{s\_comp\_cfar}, D_{rmin}, ncm, ndm) = \quad \text{(Expression 51)}$$
$$\text{Code}^*_{ncm}\{\alpha(f_{s\_comp\_cfar}, D_{rmin}) \otimes$$
$$VFTALL_z(f_{b\_cfar}, f_{s\_comp\_cfar}, D_{rmin}, ndm)\}$$

Here, $Y_z(f_{b\_cfar}, f_{s\_comp\_cfar}, D_{rmin}, ncm, ndm)$ is an output (for example, coded Doppler demultiplexing result) resulting from code separation of the code multiplexed signal using orthogonal code $\text{Code}_{ncm}$ with respect to ndm-th coded Doppler multiplexed signal $VFTALL_z(f_{b\_cfar}, f_{s\_comp\_cfar}, D_{rmin}, ndm)$ in Doppler range $D_{rmin}$ among the outputs of distance indices $f_{b\_cfar}$ and Doppler frequency indices $f_{s\_comp\_cfar}$ of Doppler analyzers 210 in z-th antenna system processor 201. It is possible to separate the coded Doppler multiplexed signal to which DCI (ncm, ndm) used for the multiplexing transmission is assigned. Note that, z=1, ..., Na, and ncm=1, ..., $N_{CM}$.

Through the code separation processing as described above, radar apparatus 10 can separate and receive the coded Doppler multiplexed signal to which DCI (ncm, ndm) used for the multiplexing transmission is assigned. The separation and reception are based on the result of the aliasing judgement performed by Doppler analyzers 210 assuming a Doppler range of ±1/(2Tr) that is greater by a factor of Loc than the Doppler range of ±1/(2Loc×Tr) in which no aliasing occurs.

Further, since the coded Doppler multiplexed signal to which DCI (ncm, ndm) is assigned is transmitted from transmission antenna Tx #[ncm, ndm], it is also possible to judge transmission antenna 109. In other words, radar apparatus 10 can separate and receive the coded Doppler multiplexed signal which is transmitted from transmission antenna Tx #[ncm, ndm] and to which DCI (ncm, ndm) is assigned.

In addition, for example, during the coded Doppler demultiplexing processing, radar apparatus 10 performs, on the outputs of Doppler analyzer 210 for each code element, phase correction based on Doppler phase correction taking into account Doppler aliasing (for example, Doppler phase correction vector $\alpha(f_{s\_comp\_cfar}, D_r)$). Such phase correction corresponds to correcting phase changes corresponding to Doppler components among the Doppler component candidates with respect to $f_{s\_comp\_cfar}$. Mutual interference between code multiplexed signals can thus be reduced, for example, as low as a noise level. In other words, radar apparatus 10 can reduce inter-code interference to suppress an effect on degradation of the detection performance of radar apparatus 10.

The foregoing description has been given of an example of the operation of coded Doppler demultiplexer 212.

In FIG. 1, peak extractor 213 outputs, to direction estimator 214, at least one of the outputs of Doppler analyzers 210 for distance index $f_{b\_cfar}$ and Doppler frequency index $f_{s\_comp\_cfar}$ inputted from CFAR section 211. At this time, peak extractor 213 may use, for example, $D_{rmin}$ that is a Doppler aliasing judgement result inputted from coded Doppler demultiplexer 212.

For example, in the example illustrated in FIG. 1, peak extractor 213 outputs output $VFT_z^{-1}(f_{b\_cfar}, f_{s\_comp\_cfar} + (N_{code}F_R(D_{rmin}, ndm_{\_BF})/N_{DM}))$ of first Doppler analyzer 210 (Doppler analyzer 210-1) to direction estimator 214. Here, $ndm_{\_BF}$ is any one of 1, ..., $N_{DM}$, and a plurality of transmission antennas 109 to which the $ndm_{\_BF}$-th Doppler multiplexed signal is assigned are a combination of transmission antennas 109 that satisfies the condition of the adjacent arrangement described above, for example.

In FIG. 1, based on Doppler aliasing judgement result $D_{rmin}$ for distance index $f_{b\_cfar}$ and Doppler frequency index $f_{s\_comp\_cfar}$ inputted from coded Doppler demultiplexer 212, direction estimator 214 performs direction estimation processing for estimation of the direction of a target based on separated received signal $Y_z(f_{b\_cfar}, f_{s\_comp\_cfar}, D_{rmin}, ncm, ndm)$ of the coded Doppler multiplexed signal to which DCI (ncm, ndm) is assigned and which is transmitted from transmission antenna Tx #[ncm, ndm], and based on the output from a part of Doppler analyzers 210 (Doppler analyzer 210-1 in FIG. 1) inputted from peak extractor 213.

Note that, in the following description, a case in which output $VFT_z^{-1}(f_{b\_cfar}, f_{s\_comp\_cfar} + (N_{code}F_R(D_{rmin}, ndm_{\_BF})/N_{DM}))$ from first Doppler analyzer 210 is used will be described as an example, but the output from peak extractor 213 is not limited to this. In addition, z=1, ..., Na.

For example, direction estimator 214 generates, based on the outputs of coded Doppler demultiplexer 212 and peak extractor 213, virtual reception array correlation vector $h(f_{b\_cfar}, f_{s\_comp\_cfar})$ given by following Expression 52 and performs the direction estimation processing.

Virtual reception array correlation vector $h(f_{b\_cfar}, f_{s\_comp\_cfar})$ includes Nt×Na elements, the number of which is the product of number Nt of transmission antennas and number Na of reception antennas, and further includes an element resulting from use of a beam transmission antenna. Detailed descriptions will be given below.

Virtual reception array correlation vector $h(f_{b\_cfar}, f_{s\_comp\_cfar})$ includes elements of beam transmission antennas. The elements of beam transmission antennas are based on the output (e.g., $VFT_z^{-1}(f_{b\_cfar}, f_{s\_comp\_cfar} + (N_{code}F_R(D_{rmin}, ndm_{\_BF})/N_{DM}))$) of a part of Doppler analyzers 210 that is inputted from peak extractor 213. The elements of beam transmission antennas result from code multiplexing transmission using the same Doppler multiplexing and constitute a sub-array by adjacent transmission antennas 109 for orthogonal beam transmission.

For example, when there are $N_{BF}$ beam transmission antennas, virtual reception array correlation vector $h(f_{b\_cfar}, f_{s\_comp\_cfar})$ includes (Nt+$N_{BF}$)×Na elements. By way of example, when number $N_{BF}$ of beam transmission antennas is 1, virtual reception array correlation vector $h(f_{b\_cfar}, f_{s\_comp\_cfar})$ is expressed by following Expression 52. Expression 52 represents an example in which peak extractor 213 outputs output $VFT_z^{-1}(f_{b\_cfar}, f_{s\_comp\_cfar} + (N_{code}F_R(D_{rmin}, ndm_{\_BF})/N_{DM}))$ from first Doppler analyzer 210 to direction estimator 214, but the present invention is not limited to this.

Further, since the output of coded Doppler demultiplexer 212 and the output of peak extractor 213 have different noise levels, values obtained by multiplication by a normalizing factor may be used as virtual reception array correlation vector $h(f_{b\_cfar}, f_{s\_comp\_cfar})$.

[55]

(Expression 52)

$$h(f_{b\_cfar}, f_{s\_comp\_cfar}) =$$

$$\begin{bmatrix} Y_1(f_{b\_cfar}, f_{s\_comp\_cfar}, D_{rmin}, 1, 1) \\ Y_2(f_{b\_cfar}, f_{s\_comp\_cfar}, D_{rmin}, 1, 1) \\ \vdots \\ Y_{Na}(f_{b\_cfar}, f_{s\_comp\_cfar}, D_{rmin}, 1, 1) \\ \vdots \\ Y_1(f_{b\_cfar}, f_{s\_comp\_cfar}, D_{rmin}, N_{DOP\_CODE(1)}, 1) \\ Y_2(f_{b\_cfar}, f_{s\_comp\_cfar}, D_{rmin}, N_{DOP\_CODE(1)}, 1) \\ \vdots \\ Y_{Na}(f_{b\_cfar}, f_{s\_comp\_cfar}, D_{rmin}, N_{DOP\_CODE(1)}, 1) \\ \vdots \\ Y_1(f_{b\_cfar}, f_{s\_comp\_cfar}, D_{rmin}, 1, N_{DM}) \\ Y_2(f_{b\_cfar}, f_{s\_comp\_cfar}, D_{rmin}, 1, N_{DM}) \\ \vdots \\ Y_{Na}(f_{b\_cfar}, f_{s\_comp\_cfar}, D_{rmin}, 1, N_{DM}) \\ \vdots \\ Y_1(f_{b\_cfar}, f_{s\_comp\_cfar}, D_{rmin}, N_{DOP\_CODE(N_{DM})}, N_{DM}) \\ Y_2(f_{b\_cfar}, f_{s\_comp\_cfar}, D_{rmin}, N_{DOP\_CODE(N_{DM})}, N_{DM}) \\ \vdots \\ Y_{Na}(f_{b\_cfar}, f_{s\_comp\_cfar}, D_{rmin}, N_{DOP\_CODE(N_{DM})}, N_{DM}) \\ VFT_1^1\left(f_{b\_cfar}, f_{s\_comp\_cfar} + \frac{N_{code}F_R(D_{rmin}, \text{ndm\_BF})}{N_{DM}}\right) \\ VFT_2^1\left(f_{b\_cfar}, f_{s\_comp\_cfar} + \frac{N_{code}F_R(D_{rmin}, \text{ndm\_BF})}{N_{DM}}\right) \\ \vdots \\ VFT_{Na}^1\left(f_{b\_cfar}, f_{s\_comp\_cfar} + \frac{N_{code}F_R(D_{rmin}, \text{ndm\_BF})}{N_{DM}}\right) \end{bmatrix}$$

Virtual reception array correlation vector $h(f_{b\_cfar}, f_{s\_comp\_cfar})$ is used in processing for performing, on reflected wave signals from a target, direction estimation based on a phase difference between reception antennas 202.

Note that, since the directivity pattern is different between the beam transmission antenna and transmission antennas 109, it is preferable, for example, that direction estimator 214 perform the direction estimation processing in a range where the difference in directivity gain between the beam transmission antenna and transmission antennas 109 is within a predetermined range.

Antenna Arrangement Example

For example, a description will be given of a case where number Nt of transmission antennas used for multiplexing transmission is 3, number $N_{DM}$ of Doppler multiplexing is 2, number $N_{CM}$ of code multiplexing is 2, and orthogonal code sequences $Code_1=\{1, 1\}$ and $Code_2=\{1, -1\}$ with code length Loc=2 are set, and numbers $N_{DOP\_CODE}(1)$ and $N_{DOP\_CODE}(2)$ of coded Doppler multiplexing are set to 2 and 1, respectively. Note that number $N_{BF}$ of beam transmission antennas is set to 1, and $\text{ndm}_{\_BF}=1$ is used as an index of a Doppler multiplexed signal used for the beam transmission antenna.

Figure 17:
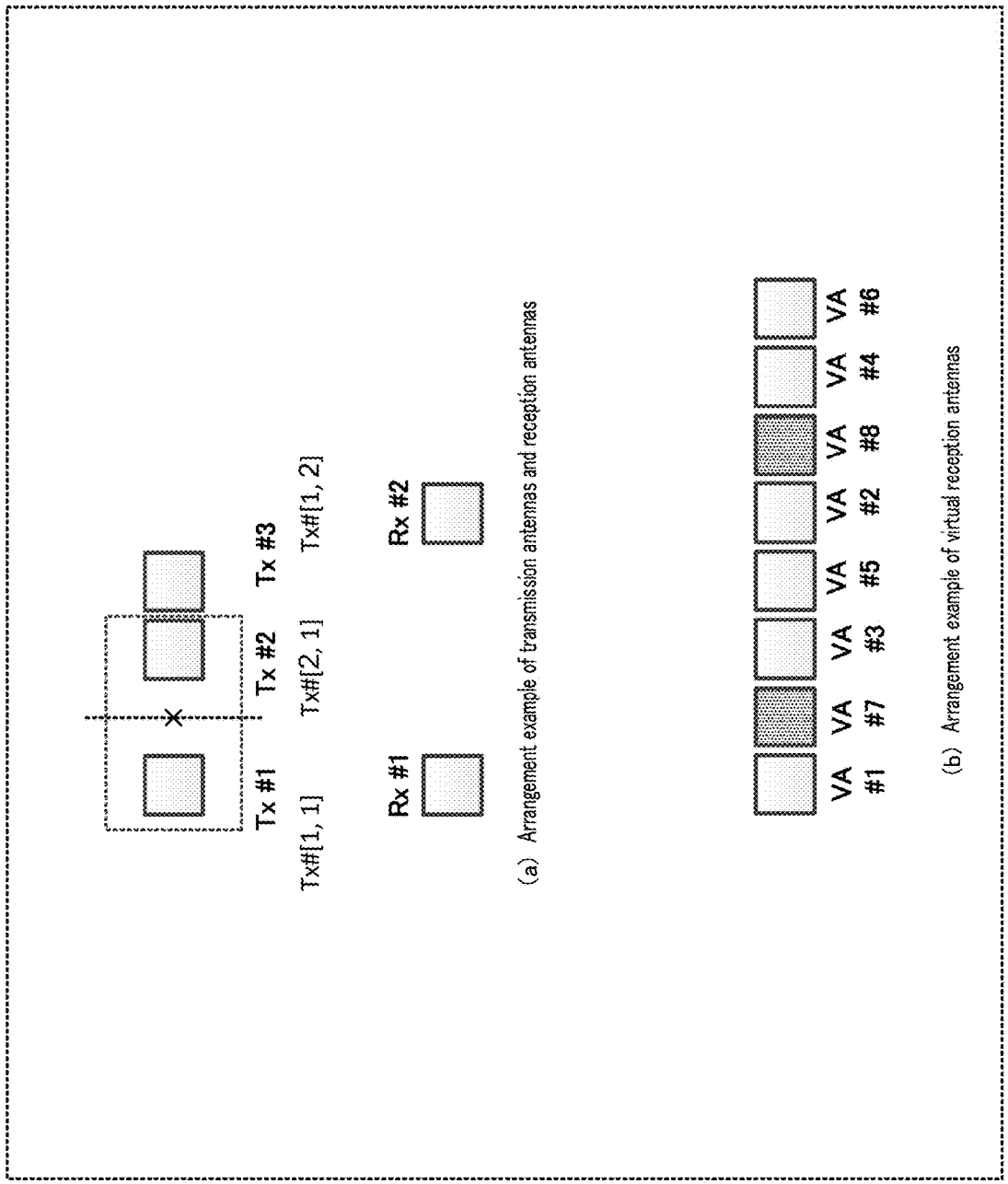
FIG. 17 illustrates an arrangement example of the transmission antennas according to Embodiment 1.

In FIG. 17, for example, in radar apparatus 10, three horizontally-arranged transmission antennas 109 (Tx #1, Tx #2, and Tx #3) are transmission antenna Tx #[1, 1], transmission antenna Tx #[2, 1], and transmission antenna Tx #[1, 2] from the left. In FIG. 17, left two adjacent transmission antennas Tx #1 (Tx #[1, 1]) and Tx #2 (Tx #[2, 1]) transmit radar transmission signals using the same Doppler multiplexing (Doppler shift amount=$DOP_1$). Thus, in FIG. 17, the beam transmission antenna is formed by Tx #1 and Tx #2 (first sub-array antenna). In FIG. 17, number $N_{BF}$ of beam transmission antennas is 1. In the following, the beam transmission antenna in FIG. 17 may also be referred to as "Tx #4."

Further, as illustrated in FIG. 17, number Na of reception antennas is two (e.g., Rx #1 and Rx #2). Note that, number Na of reception antennas is not limited to two, and may be three or more, for example.

For example, when a radar transmission signal is transmitted from adjacent Tx #1 (Tx #[1, 1]) and Tx #2 (Tx #[2, 1]), for example, at an equal power, the midpoint position between Tx #1 and Tx #2 serves as the phase center of beam transmission antenna Tx #4 (the cross mark illustrated at (a) in FIG. 17). Note that, when the radar transmission signal is not transmitted at an equal power from transmission antennas 109 constituting the beam transmission antenna, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

Arrangement of VA #1 to VA #8 of virtual reception antennas (or MIMO virtual antennas) as illustrated at (b) in FIG. 17 is constituted by the arrangement of transmission antennas Tx #1 to Tx #3, beam transmission antenna Tx #4 (e.g., Nt+$N_{BF}$ transmission antennas), and reception antennas Rx #1 and Rx #2 (e.g., Na reception antennas) as illustrated at (a) in FIG. 17. At (b) in FIG. 17, the virtual reception antenna arrangement obtained based on beam transmission antenna Tx #4 corresponds to VA #7 and VA #8.

Here, the arrangement of the virtual reception antennas (the virtual reception array) may be expressed by following Expression 53, for example, based on the positions of transmission antennas 109 constituting the transmission array antenna (e.g., the positions of feeding points) and the positions of reception antennas 202 constituting the reception array antenna (e.g., the positions of feeding points):

[56]

(Expression 53)

$$\begin{cases} X_{V\_\#k} = \left(X_{T\_\#[ceil(k/Na)]} - X_{T\_\#1}\right) + \left(X_{R\_\#[mod(k-1,Na)+1]} - X_{R\_\#1}\right) \\ Y_{V\_\#k} = \left(Y_{T\_\#[ceil(k/Na)]} - Y_{T\_\#1}\right) + \left(Y_{R\_\#[mod(k-1,Na)+1]} - Y_{R\_\#1}\right) \end{cases}.$$

Here, the position coordinates of transmission antennas 109 (e.g., Tx #n) constituting the transmission array antenna are represented as $(X_{T\_\#n}, Y_{T\_\#n})$ (e.g., n=1, ..., Nt+$N_{BF}$), the position coordinates of reception antennas 202 (e.g., Rx #m) constituting the reception array antenna are represented as $(X_{R\_\#m}, Y_{R\_\#m})$ (e.g., m=1, ..., Na), and the position coordinates of virtual antennas VA #k constituting a virtual reception array antenna are represented as $(X_{V\_\#k}, Y_{V\_\#k})$ (e.g., k=1, ..., (Nt+$N_{BF}$)×Na).

Note that, VA #1 is represented as the position reference (0, 0) of the virtual reception array, for example, in Expression 53.

Figure 18:
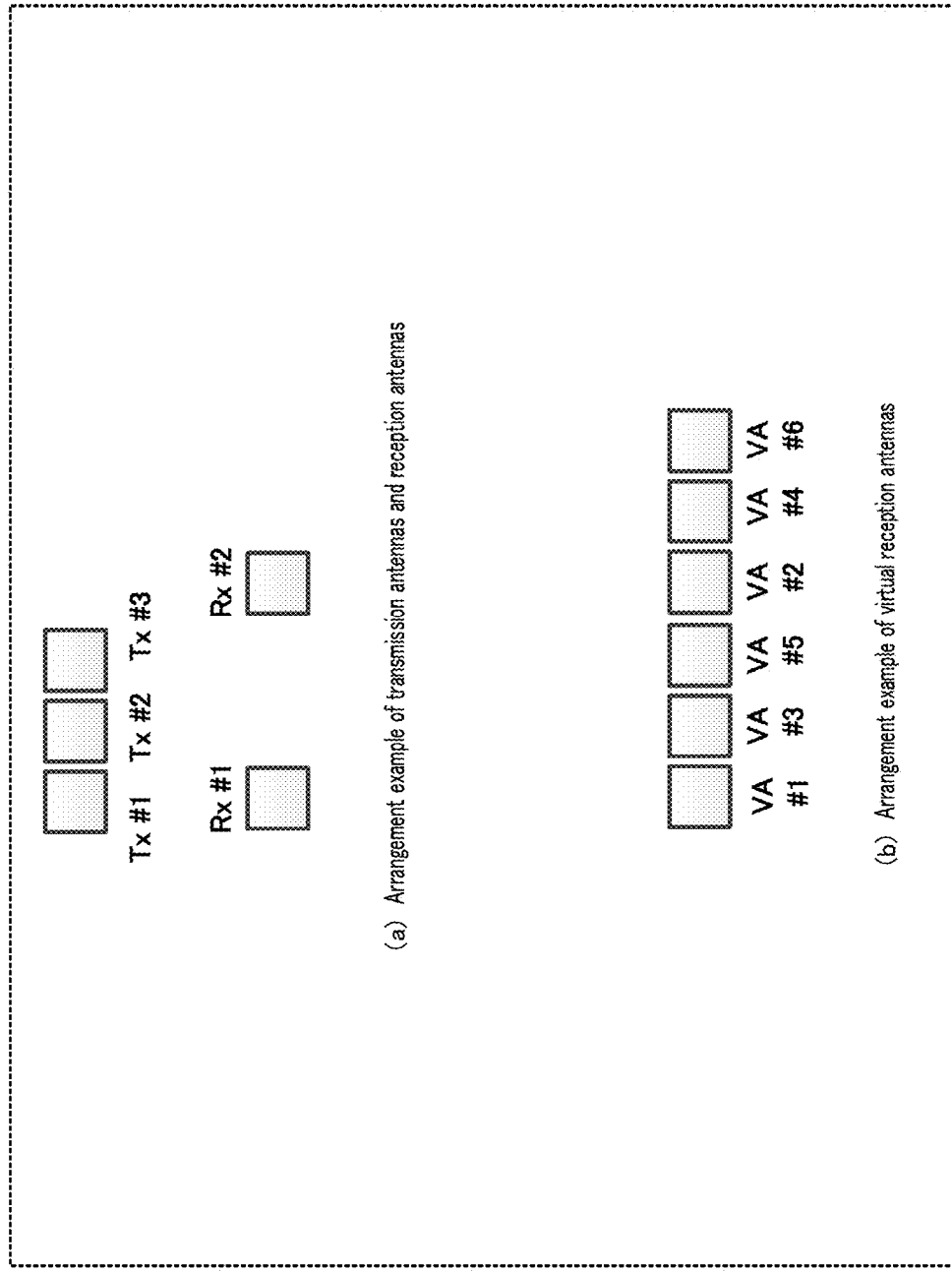
FIG. 18 illustrates an arrangement example of antennas.

As illustrated at (b) in FIG. 17, the virtual reception antenna arrangement using the beam transmission antenna is the equally spaced array arrangement of eight elements. On the other hand, as illustrated in FIG. 18, when no beam transmission antenna is used in the same antenna arrangement as (a) in FIG. 17, number Nt of transmission antennas is 3 and number Na of reception antennas is 2, and the virtual reception antenna arrangement is an equally spaced array arrangement of six elements when the equally spaced arrangement is formed in the same manner as at (b) in FIG. 17.

Thus, the virtual reception antenna arrangement using the beam transmission antenna makes it possible to enlarge the aperture length of the virtual reception antennas (e.g., increase the number of virtual reception antennas), so as to improve the angular resolution. Further, in the virtual reception antenna arrangement using the beam transmission antenna, it is possible to suppress an increase in sidelobes by densely arranging the virtual reception antennas to improve the angular resolution.

Although the example illustrated in FIG. 17 illustrates the case where number Nt of transmission antennas is 3 and number $N_{BF}$ of beam transmission antennas is 1, number Nt of transmission antennas and number $N_{BF}$ of beam transmission antennas are not limited thereto. For example, an increase in the number of transmission antennas 109 allows for the use of a larger number of beam transmission antennas, thus improving the angular resolution or suppressing the sidelobe level. Note that, the antennas illustrated in FIGS. 17 and 18 may be a part of a plurality of antennas that radar apparatus 10 includes.

The antenna arrangement example has been described above.

For example, direction estimator 214 calculates a spatial profile, with azimuth direction θ in direction estimation evaluation function value $P_H$ (θ, $f_{b\_cfar}$, $f_{s\_comp\_cfar}$) being variable within a defined angular range. Direction estimator 214 extracts a predetermined number of local maximum peaks in the calculated spatial profile in descending order and outputs the azimuth directions of the local maximum peaks as direction-of-arrival estimation values (for example, positioning outputs).

Note that, there are various methods with direction estimation evaluation function value $P_H$ (θ, $f_{b\_cfar}$, $f_{s\_comp\_cfar}$) depending on direction-of-arrival estimation algorithms. For example, an estimation method using an array antenna, as disclosed in NPL 3, may be used.

For example, when (Nt+$N_{BF}$)×Na virtual reception antennas are linearly arranged at equal intervals $d_H$, a beamformer method can be given by following Expressions 54 and 55. In addition, a technique such as Capon or MUSIC is also applicable.

[57]

$$P_H(\theta_u, f_{b\_cfar}, f_{s\_comp\_cfar}) = \qquad \text{(Expression 54)}$$
$$\left|a^H(\theta_u)D_{cal}h(f_{b\_cfar}, f_{s\_comp\_cfar})\right|^2$$

[58]

$$a(\theta_u) = \begin{bmatrix} 1 \\ \exp\{-j2\pi d_H \sin\theta_u/\lambda\} \\ \vdots \\ \exp\{-j2\pi((N_t+N_{BF})N_a-1)d_H \sin\theta_u/\lambda\} \end{bmatrix} \qquad \text{(Expression 55)}$$

Here, in Expression 54, superscript H denotes the Hermitian transpose operator. Further, a($\theta_u$) denotes the direction vector of the virtual reception array relative to an incoming wave in azimuth direction $\theta_u$.

Azimuth direction $\theta_u$ is a vector that is changed at azimuth interval $\beta_1$ in an azimuth range over which direction-of-arrival estimation is performed. For example, $\theta_u$ is set as follows:

$$\theta_u = \theta\min + u\beta_1, u = 0, \ldots, NU;$$
$$NU = \text{floor}[(\theta\max - \theta\min)/\beta_1] + 1.$$

Here, floor(x) is a function that returns the largest integer value not greater than real number x.

Further, in Expression 54, Dcal is an ((Nt+$N_{BF}$)×Na)-th order matrix including an array correction coefficient for correcting phase deviations and amplitude deviations between the transmission array antennas and between the reception array antennas, and a coefficient for reducing the influence of coupling of elements between the antennas. If the coupling between antennas in the virtual reception array is negligible, Dcal is a diagonal matrix with diagonal components including an array correction coefficient for correcting phase deviations and amplitude deviations between the transmission array antennas and between the reception array antennas.

For example, direction estimator 214 may output, as a positioning result, distance information based on distance index $f_{b\_cfar}$ and Doppler velocity information of the target based on the Doppler frequency judgement result for the target (result of Doppler aliasing judgement processing by coded Doppler demultiplexer 212), together with the direction estimation result. Direction estimator 214 may output the positioning result, for example, to a vehicle control apparatus (not illustrated) when the radar apparatus is used as an in-vehicle radar, or to an infrastructure control apparatus (not illustrated) when the radar apparatus is used as an infrastructure radar.

Note that, for example, when the phase rotation amount is determined using Expression 5, the Doppler frequency information can be calculated in the extended range as given by following Expression 56 using $D_{rmin}$ that is the result of the Doppler aliasing judgement processing by coded Doppler demultiplexer 212:

[59]

$$f_{out} = f_{s\_comp\_cfar} + \frac{D_{rmin}N_{code}}{N_{DM}}. \qquad \text{(Expression 56)}$$

Further, for example, when the phase rotation amount is determined using Expression 6, the Doppler frequency information can be calculated in the extended range as given by following Expression 57 using $D_{rmin}$ that is the result of the Doppler aliasing judgement processing:

[60]

$$f_{out} = f_{s\_comp\_cfar} + \frac{D_{rmin}N_{code}}{N_{DM}+N_{int}}. \qquad \text{(Expression 57)}$$

Note that, the Doppler frequency information may be converted into the relative velocity component and then outputted. Following Expression 58 may be used to convert Doppler frequency index $f_{out}$ to relative velocity component $v_d(f_{out})$ using $D_{rmin}$ that is the result of the Doppler aliasing judgement for a target. Here, λ is the wavelength of the carrier frequency of an RF signal outputted from a transmission radio (not illustrated) (when a chirp signal is used, the wavelength at the center frequency of the chirp signal is used). Further, $\Delta_f$ denotes the Doppler frequency interval in FFT processing performed in Doppler analyzer 210. For example, in the present embodiment, $\Delta_f=1/\{N_{code} \times Loc \times T_r\}$.

[61]
$$v_d(f_{out}) = \frac{\lambda}{2} f_{out} \Delta_f \quad \text{(Expression 58)}$$

As described above, in the present embodiment, radar apparatus 10 applies phase rotation amounts corresponding to Doppler shift amounts and orthogonal code sequences to radar transmission signals to perform multiplexing transmission of the radar transmission signals (in other words, coded Doppler multiplexed signals) from a plurality of transmission antennas 109. Further, at least one pair of adjacent transmission antennas 109 transmit radar transmission signals to which the same Doppler multiplexing (Doppler shift amount) is applied, to perform code multiplexing transmission using the same Doppler multiplexing.

It is thus possible to regard, as reception signals of orthogonal beam transmission, reception signals for each transmission period that correspond to the signals transmitted from the at least one pair of adjacent transmission antennas 109. Accordingly, a beam transmission antenna forming a sub-array is obtained by the at least one pair of adjacent transmission antennas 109. For example, when radar transmission signals are transmitted from transmission antennas 109 constituting the beam transmission antenna, for example, at equal power, the beam transmission antenna can be treated as an antenna for which a midpoint position between transmission antennas 109 serves as the phase center of the sub-array. Note that, when the radar transmission signals are not transmitted at an equal power from transmission antennas 109 constituting the beam transmission antenna, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

Thus, according to the present embodiment, it is possible for radar apparatus 10 to utilize the transmission antennas such that the number thereof is made greater than the number (Nt) of transmission antennas 109 for multiplexing transmission. Further, for example, radar apparatus 10 (radar receiver 200 (corresponding to the reception circuit)) performs sensing processing of sensing a target object (target) using virtual reception antennas (e.g., (Nt+$N_{BF}$)×Na virtual reception antennas) constituted by a beam transmission antenna (e.g., $N_{BF}$ antennas) formed by adjacent transmission antennas 109, a plurality of (e.g., Nt) transmission antennas 109, and a plurality of (e.g., Na) reception antennas 202. As is understood, radar apparatus 10 can increase the number of virtual reception antennas by using one or more beam transmission antennas and the plurality of transmission antennas 109. It is thus possible to improve the angle resolution of direction estimator 214 of radar apparatus 10 or to reduce the sidelobe level. Such improvement of the angular measurement performance makes it possible to improve target-object sensing accuracy of radar apparatus 10.

Further, in the present embodiment, each of a plurality of transmission antennas 109 is associated with a combination of the Doppler shift amount ($DOP_{ndm}$) and the orthogonal code sequence ($DOP_{ncm}$) such that at least one of the Doppler shift amount ($DOP_{ndm}$) and the orthogonal code sequence ($DOP_{ncm}$) differs from combination to combination. In the present embodiment, for example, encoder 107 may set the numbers of multiplexing by the orthogonal code sequences (in other words, the numbers of codes) corresponding respectively to the Doppler shift amounts in the combinations of the Doppler shift amounts and the orthogonal code sequences such that the numbers of multiplexing are different (in other words, such that the numbers of coded Doppler multiplexing for respective Doppler multiplexed transmission signals are not uniform), for example, using the equal-interval Doppler shift amount setting including the maximum equal-interval Doppler shift amount setting.

By setting the numbers of coded Doppler multiplexing for the respective Doppler multiplexed transmission signals non-uniformly, radar apparatus 10 can judge, based on, for example, the received power of a code-separated signal for each coded Doppler multiplexed signal, transmission antenna 109 associated with the coded Doppler multiplexed signal (in other words, the combination of the Doppler shift amount and the orthogonal code sequence) and the presence or absence of Doppler aliasing. It is thus possible for radar apparatus 10 to appropriately judge a Doppler frequency of a target even in the presence of Doppler aliasing.

Thus, according to the present embodiment, radar apparatus 10 can extend the effective Doppler frequency bandwidth to 1/(Tr) (e.g., a Doppler range of ±1/(2Tr)) to extend the detection range for detecting a Doppler frequency (relative velocity) without ambiguity. Accordingly, radar apparatus 10 can improve the target-object sensing accuracy over a wider Doppler frequency range.

Further, in the present embodiment, encoder 107 may set the same number of coded Doppler multiplexing for each Doppler multiplexed transmission signal (in other words, may set the numbers of coded Doppler multiplexing for respective Doppler multiplexed signals uniformly), for example, by using the equal-interval Doppler shift amount setting of intervals narrower than the intervals of the maximum equal-interval Doppler shift amount setting. By setting the numbers of coded Doppler multiplexing for respective Doppler multiplexed transmission signals uniformly, radar apparatus 10 can individually separate and receive the coded Doppler multiplexed signals transmitted from a plurality of transmission antennas 109 over a Doppler range of ±1/(2× Loc×Tr), for example, by aliasing judgement processing in reception processing.

Further, in the present embodiment, encoder 107 may set the same number of coded Doppler multiplexing for each Doppler multiplexed transmission signal (in other words, may set the numbers of coded Doppler multiplexing for respective Doppler multiplexed signals uniformly), for example, by using the maximum equal-interval Doppler shift amount setting. By setting the numbers of coded Doppler multiplexing for respective Doppler multiplexed transmission signals uniformly, radar apparatus 10 does not apply the aliasing judgement processing in the reception processing, for example. In addition, radar apparatus 10 can individually separate and receive the coded Doppler multiplexed signals transmitted from a plurality of transmission antennas 109 over a Doppler range of $\pm 1/(2Loc \times N_{DM} \times Tr)$, for example.

Further, in the present embodiment, the coded Doppler multiplexing, which is performed using both Doppler multiplexing and coding, can reduce the number of Doppler multiplexing as compared with a case where the Doppler multiplexing is used without the coding in multiplexing transmission. It is thus possible to increase the intervals of phase rotation amounts for applying Doppler shifts, so as to relieve the accuracy requirements (phase modulation accuracy) for the phase shifters, for example, and achieve the cost reduction effect of an RF section, including reduction of the man-hours required for adjustment of the phase shifters.

Further, in the present embodiment, since coded Doppler multiplexing is performed using both Doppler multiplexing and coding, radar apparatus 10 performs, for each code element, Fourier frequency analysis (FFT processing) for Doppler frequency detection (relative velocity detection). Accordingly, for example, in comparison to the Fourier frequency analysis (FFT processing) for the Doppler frequency detection (relative velocity detection) using the Doppler multiplexing without the coding in multiplexing transmission, the FFT size is (1/code length) and the number of times of FFT processing is increased by (code length) times. For example, when the amount of FFT operation for FFT size Nc is roughly estimated to be Nc×log$_2$(Nc), the coded Doppler multiplexing according to the present embodiment has an operation amount ratio of about {Loc× Nc/Loc×log$_2$(Nc/Loc)}/{Nc×log$_2$(Nc)}=1−log$_2$(Loc)/log$_2$(Nc) relative to the FFT operation with Doppler multiplexing without the coding. For example, in a case where Loc=2 and Nc=1024, the operation amount ratio is 0.9. The operation reduction effect on FFT processing can be achieved, and the effect of simplification of the circuit configuration and cost reduction can also be achieved.

Variation 1 of Embodiment 1

Phase rotation amount $\varphi_{ndm}$ for applying Doppler shift amount DOP$_{ndm}$ is not limited to, for example, the value given by Expression 5 and the like. For example, phase rotation amount $\varphi_{ndm}$ may be a value given by following Expression 59. Here, round(x) represents the round function that outputs a rounded integer value for real number x. Note that, the term "round(N$_{code}$/N$_{DM}$)" is introduced so that the phase rotation amount is an integer multiple of the Doppler frequency interval in Doppler analyzer 210. In addition, in Expression 59, the angle is expressed in radian.

[62]

$$\phi_{ndm} = \frac{2\pi}{N_{code}} \text{round}\left(\frac{N_{code}}{N_{DM}}\right)(ndm - 1) \quad \text{(Expression 59)}$$

Variation 2 of Embodiment 1

Embodiment 1 has been described in relation to the case where Doppler shift setter 106 sets Doppler shift amount DOP$_{ndm}$ for applying phase rotation amount $\varphi_{ndm}$ (here, ndm=1, ..., N$_{DM}$) assuming that number N$_{DM}$ of Doppler multiplexing is 2 or more, but the number of Doppler multiplexing is not limited to this case and number N$_{DM}$ of Doppler multiplexing may also be set to 1.

In this case, for example, Doppler shift setter 106 sets Doppler shift amount DOP$_1$ such that 0≤DOP$_1$<1/(Tr×L$_{OC}$) is satisfied. Alternatively, Doppler shift setter 106 may set Doppler shift amount DOP$_1$, for example, such that −1/(2Tr×L$_{OC}$)≤DOP$_1$<1/(2Tr×L$_{OC}$) is satisfied.

Further, phase rotation amount $\varphi_1$ for applying Doppler shift amount DOP$_1$ may also be assigned as in Expression 3.

Furthermore, the operation of encoder 107 in the case where number N$_{DM}$ of Doppler multiplexing is set to 1 is the same as the operation performed in the case where number N$_{DM}$ of Doppler multiplexing is set to 1 and N$_{DOP\_CODE}$(1) is set to Nt in Embodiment 1. For example, encoder 107 uses orthogonal code sequences of number N$_{CM}$=Nt of code multiplexing to set coded Doppler phase rotation amount $\psi_{ndop\_code(1), 1}$(m) given by Expression 10 for phase rotation amount $\varphi_1$ for applying Doppler shift amount DOP$_1$ inputted from Doppler shift setter 106, and outputs the coded Doppler phase rotation amount to phase rotator 108. Here, ndop_code(1)=1, ..., Nt.

Subsequent operations of radar transmitter 100 are the same as those of Embodiment 1, and thus, the description thereof is omitted.

Note that, when number N$_{DM}$ of Doppler multiplexing is set to 1, all transmission antennas 109 transmit radar transmission signals using the same Doppler multiplexing (Doppler shift amount DOP$_1$). Thus, the arrangement of transmission antennas 109 does not have to be associated with the assignment of the coded Doppler phase rotation amount. In addition, when number N$_{DM}$ of Doppler multiplexing is set to 1, one beam transmission antenna (N$_{BF}$=1) can be used. Accordingly, radar apparatus 10 can use (Nt+1)×Na virtual reception antennas with respect to number Nt of transmission antennas for multiplexing transmission.

Moreover, when number N$_{DM}$ of Doppler multiplexing is set to 1, coded Doppler demultiplexer 212 in radar receiver 200 performs code demultiplexing processing.

Hereinafter, a difference in the operation of radar receiver 200 as compared with that in Embodiment 1 will be described.

CFAR section 211 does not apply the Doppler domain compression CFAR processing when number N$_{DM}$ of Doppler multiplexing is set to 1. For example, CFAR section 211 applies Expression 38 to adaptively set a threshold and outputs, to coded Doppler demultiplexer 212, distance index f$_{b\_cfar}$ and Doppler frequency index f$_{s\_cfar}$ that provide a received power greater than the threshold, and received-power information PowerFT(f$_{b\_cfar}$, f$_{s\_cfar}$).

Coded Doppler demultiplexer 212 separates code-multiplexed transmission signals based on distance index f$_{b\_cfar}$ and Doppler frequency index f$_{s\_cfar}$ inputted from CFAR section 211 and the outputs of Doppler analyzers 210.

For example, when Doppler shift amount DOP$_1$ is 0, coded Doppler demultiplexer 212 separates and receives the code multiplexed signals as given by following Expression 60. For example, by performing the demultiplexing processing based on Expression 60, coded Doppler demultiplexer 212 can separate and receive a transmission signal to which Code$_{ncm}$ used for code multiplexing transmission is assigned.

[63]

$$YC_z(f_{b\_cfar}, f_{s\_cfar}, ncm) = \quad \text{(Expression 60)}$$
$$\text{Code}^*_{ncm}\{\alpha(f_{s\_cfar}, 0) \otimes VFTALLC_z(f_{b\_cfar}, f_{s\_cfar})\}$$

Here, YC$_z$(f$_{b\_cfar}$, f$_{s\_cfar}$, ncm) is an output resulting from code separation of the code multiplexed signal using orthogonal code Code$_{ncm}$ with respect to outputs VFTALLC$_z$(f$_{b\_cfar}$, f$_{s\_cfar}$) of Doppler analyzers 210 in z-th antenna system processor 201 for distance index f$_{b\_cfar}$ and Doppler frequency index f$_{s\_comp\_cfar}$. As is understood, coded Doppler demultiplexer 212 can separate and receive the transmission signal to which Code$_{ncm}$ is assigned. Note that, z=1, ..., Na and ncm=1, ..., N$_{CM}$.

For example, in the case of Doppler shift amount $DOP_1 \neq 0$, coded Doppler demultiplexer 212 substitutes, for $f_{s\_cfar}$ of $\alpha(f_{b\_cfar}, 0)$ in Expression 60, the Doppler frequency index obtained by subtracting from $f_{s\_cfar}$ the Doppler frequency index corresponding to Doppler shift amount $DOP_1$ applied by radar transmitter 100. It is thus possible to separate and receive the transmission signal to which $Code_{ncm}$ used for the code multiplexing transmission is assigned, as in the case of Doppler shift amount $DOP_1=0$.

It becomes possible for coded Doppler demultiplexer 212, for example, to perform the demultiplexing processing in a Doppler range of $-1/(2 \times Loc \times Tr)$ or more and less than $1/(2 \times Loc \times Tr)$.

Note that, $VFTALLC_z(f_{b\_cfar}, f_{s\_cfar})$ in Expression 60 is a representation in vector format of an extracted component corresponding to distance index $f_{b\_cfar}$ and Doppler frequency index $f_{s\_cfar}$ extracted in CFAR section 211, the component being from among outputs $VFT_z^{noc}(f_b, f_s)$ of Loc Doppler analyzers 210 in z-th antenna system processor 201, for example, as given by following Expression 61. Here, noc=1, ..., Loc.

[64]

$$VFTALLC_z(f_{b\_cfar}, f_{s\_cfar}) = \quad \text{(Expression 61)}$$
$$\left[ VFT_z^1(f_{b\_cfar}, f_{s\_cfar}) \ldots VFT_z^{Loc}(f_{b\_cfar}, f_{s\_cfar}) \right]^T$$

In addition, the phase correction by Doppler phase correction vector $\alpha(f_{s\_cfar}, 0)$ corresponds to correction of phase changes corresponding to Doppler components of the Doppler component candidates with respect to $f_{s\_cfar}$. Mutual interference between code multiplexed signals can thus be reduced, for example, as low as a noise level. In other words, radar apparatus 10 can reduce inter-code interference to suppress the effect on degradation of the detection performance of radar apparatus 10.

The foregoing description has been given of an example of the operation of code demultiplexing processing of coded Doppler demultiplexer 212.

Peak extractor 213 outputs, to direction estimator 214, at least one of the outputs of Doppler analyzers 210 for distance index $f_{b\_cfar}$ and Doppler frequency index $f_{s\_cfar}$ inputted from CFAR section 211. For example, when the output of first Doppler analyzer 210 (for example, Doppler analyzer 210-1) is used, peak extractor 213 outputs $VFT_z^1(f_{b\_cfar}, f_{s\_cfar})$ to direction estimator 214.

Direction estimator 214 performs the direction estimation processing for estimation of the direction of a target based on separated received signal $YC_z(f_{b\_cfar}, f_{s\_cfar}, ncm)$ of the code multiplexed signal for distance index $f_{b\_cfar}$ and Doppler frequency index $f_{s\_cfar}$ inputted from coded Doppler demultiplexer 212, and the output of a part of Doppler analyzers 210 inputted from peak extractor 213.

Note that, by way of example, a case will be described below in which output $VFT_z^1(f_{b\_cfar}, f_{s\_cfar})$ from first Doppler analyzer 210 is used, but the output from peak extractor 213 is not limited to this example. In addition, $z=1, \ldots, Na$ and $ncm=1, \ldots, N_{CM}$.

For example, direction estimator 214 generates, based on the outputs from coded Doppler demultiplexer 212 and peak extractor 213, virtual reception array correlation vector $h(f_{b\_cfar}, f_{s\_cfar})$ given by following Expression 62 and performs the direction estimation processing.

Virtual reception array correlation vector $h(f_{b\_cfar}, f_{s\_cfar})$ includes $Nt \times Na$ elements, the number of which is the product of number Nt of transmission antennas and number Na of reception antennas, and further includes elements resulting from use of beam transmission antennas. Detailed descriptions will be given below.

Virtual reception array correlation vector $h(f_{b\_cfar}, f_{s\_cfar})$ includes elements of beam transmission antennas. The elements of beam transmission antennas are based on the output (e.g., $VFT_z^1(f_{b\_cfar}, f_{s\_cfar})$) of a part of Doppler analyzers 210 as inputted from peak extractor 213. The elements of beam transmission antennas result from code multiplexing transmission using the same Doppler multiplexing and constitute a sub-array by adjacent transmission antennas 109 for orthogonal beam transmission.

For example, since $N_{BF}=1$ for beam transmission antennas in the case of $N_{DM}=1$, virtual reception array correlation vector $h(f_{b\_cfar}, f_{s\_cfar})$ includes $(Nt+1) \times Na$ elements. By way of example, virtual reception array correlation vector $h(f_{b\_cfar}, f_{s\_cfar})$ is expressed by following Expression 62. Expression 62 expresses an example in which peak extractor 213 outputs output $VFT_z^1(f_{b\_cfar}, f_{s\_cfar})$ from first Doppler analyzer 210 to direction estimator 214, but the present disclosure is not limited to this.

[65]

$$h(f_{b\_cfar}, f_{s\_cfar}) = \begin{bmatrix} YC_1(f_{b\_cfar}, f_{s\_cfar}, 1) \\ YC_2(f_{b\_cfar}, f_{s\_cfar}, 1) \\ \vdots \\ YC_{Na}(f_{b\_cfar}, f_{s\_cfar}, 1) \\ YC_1(f_{b\_cfar}, f_{s\_cfar}, 2) \\ YC_2(f_{b\_cfar}, f_{s\_cfar}, 2) \\ \vdots \\ YC_{Na}(f_{b\_cfar}, f_{s\_cfar}, 2) \\ \vdots \\ YC_1(f_{b\_cfar}, f_{s\_cfar}, N_{CM}) \\ YC_2(f_{b\_cfar}, f_{s\_cfar}, N_{CM}) \\ \vdots \\ YC_{Na}(f_{b\_cfar}, f_{s\_cfar}, N_{CM}) \\ VFT_1^1(f_{b\_cfar}, f_{s\_cfar}) \\ VFT_2^1(f_{b\_cfar}, f_{s\_cfar}) \\ \vdots \\ VFT_{Na}^1(f_{b\_cfar}, f_{s\_cfar}) \end{bmatrix} \quad \text{(Expression 62)}$$

Virtual reception array correlation vector $h(f_{b\_cfar}, f_{s\_cfar})$ is used for processing of performing direction estimation on reflected wave signals from a target based on a phase difference between reception antennas 202.

Note that, since the directivity pattern is different between the beam transmission antennas and transmission antennas 109, it is preferable, for example, that direction estimator 214 perform the direction estimation processing in a range where the difference in directivity gain between the beam transmission antennas and transmission antennas 109 is within a predetermined range.

The direction estimation processing using virtual reception array correlation vector $h(f_{b\_cfar}, f_{s\_cfar})$ and subsequent operations of direction estimator 214 are the same as those in Embodiment 1, and thus will not be described.

Antenna Arrangement Example

For example, a description will be given of a case where number Nt of transmission antennas used for multiplexing transmission is 2, number $N_{DM}$ of Doppler multiplexing is 1, number $N_{CM}$ of code multiplexing is 2, and orthogonal code sequences $Code_1=\{1, 1\}$ and $Code_2=\{1, -1\}$ with code length Loc=2 are set, and number $N_{DOP\_CODE}(1)$ of coded Doppler multiplexing is set to 2. Note that number $N_{BF}$ of beam transmission antennas is set to 1, and $ndm_{\_BF}=1$ is used as an index of a Doppler multiplexed signal used for the beam transmission antenna.

Figure 19:
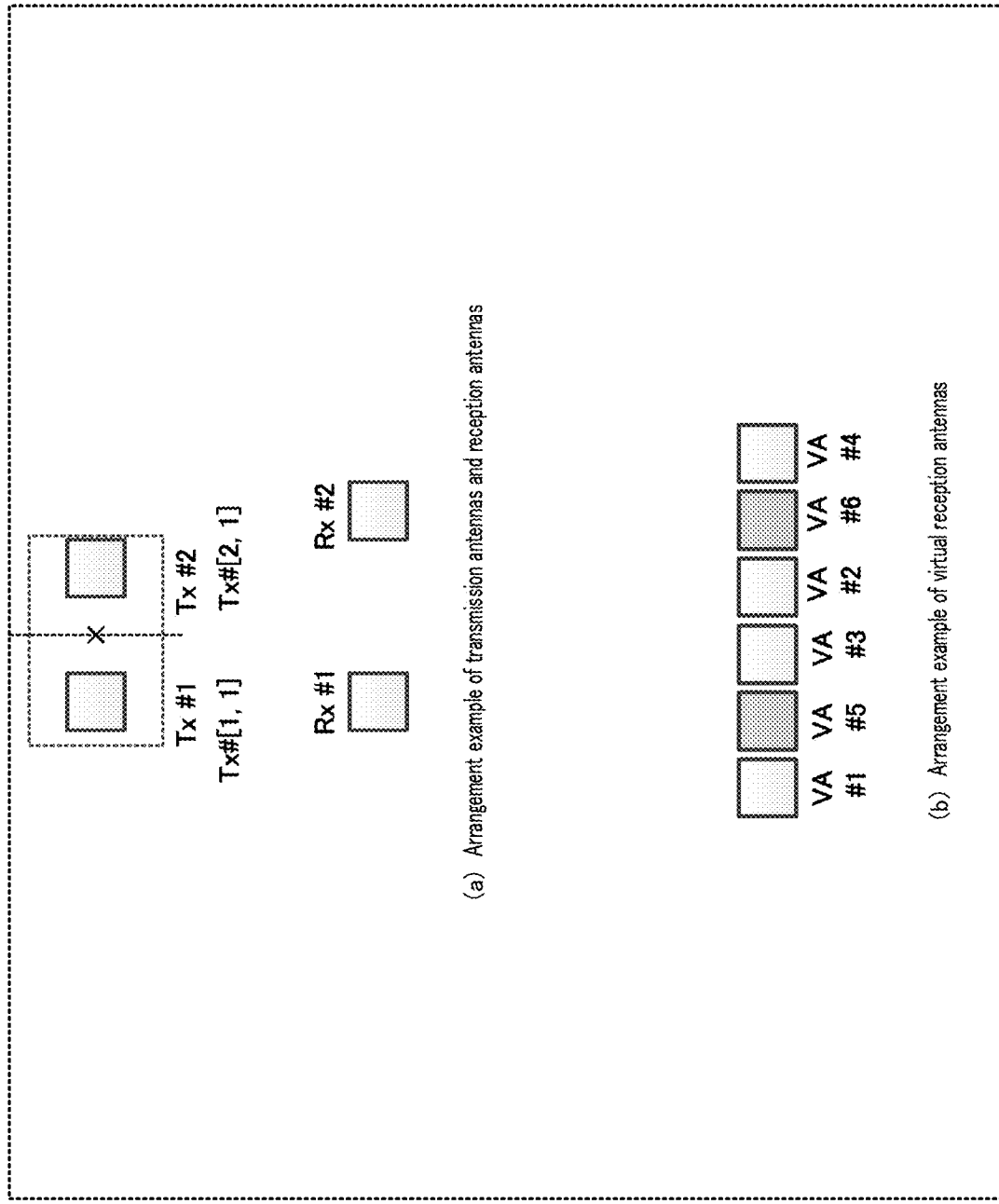
FIG. 19 illustrates an arrangement example of antennas according to Variation 2 of Embodiment 1.

In FIG. 19, for example, in radar apparatus 10, two horizontally-arranged transmission antennas 109 (Tx #1 and Tx #2) are transmission antenna Tx #[1, 1] and transmission antenna Tx #[2, 1] from the left. In FIG. 19, two adjacent transmission antennas Tx #1 (Tx #[1, 1]) and Tx #2 (Tx #[2, 1]) (first sub-array antenna) transmit radar transmission signals using the same Doppler multiplexing (Doppler shift amount=$DOP_1$). Accordingly, in FIG. 19, number $N_{BF}$ of beam transmission antennas is 1. In the following, the beam transmission antenna in FIG. 19 may also be referred to as "Tx #3." Note that at least two transmission antennas included in the sub-array antenna need not be at least two closest transmission antennas.

Further, as illustrated in FIG. 19, number Na of reception antennas is two (e.g., Rx #1 and Rx #2). Note that, number Na of reception antennas is not limited to two, and may be three or more, for example.

For example, when a radar transmission signal is transmitted from adjacent Tx #1 (Tx #[1, 1]) and Tx #2 (Tx #[2, 1]), for example, at an equal power, the midpoint position between Tx #1 and Tx #2 serves as the phase center of beam transmission antenna Tx #3 (the cross mark illustrated at (a) in FIG. 19). Note that, when the radar transmission signal is not transmitted at an equal power from transmission antennas 109 constituting the beam transmission antenna, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

Arrangement of VA #1 to VA #6 of virtual reception antennas (or MIMO virtual antennas) as illustrated at (b) in FIG. 19 is constituted by the arrangement of transmission antennas Tx #1 and Tx #2, beam transmission antennas Tx #3 (e.g., Nt+1 transmission antennas), and reception antennas Rx #1 and Rx #2 (e.g., Na reception antennas) as illustrated at (a) in FIG. 19. At (b) in FIG. 19, the virtual reception antenna arrangement obtained based on beam transmission antenna Tx #3 corresponds to VA #5 and VA #6.

As illustrated at (b) in FIG. 19, since (Nt+1)=3 and Na=2, the virtual reception antenna arrangement using the beam transmission antenna is the equally spaced array arrangement of six elements. On the other hand, when no beam transmission antenna is used in the same antenna arrangement as (a) in FIG. 19 and in a case (not illustrated) where the equally spaced arrangement is formed in the same manner as at (b) in FIG. 19, the virtual reception antenna arrangement is an equally spaced array arrangement of four elements since number Nt of transmission antennas is 2 and number Na of reception antennas is 2.

Thus, the virtual reception antenna arrangement using the beam transmission antenna makes it possible to enlarge the aperture length of the virtual reception antennas (e.g., increase the number of virtual reception antennas), so as to improve the angular resolution. Further, in the virtual reception antenna arrangement using the beam transmission antenna, it is possible to suppress an increase in sidelobes by densely arranging the virtual reception antennas to improve the angular resolution.

Note that, the example illustrated in FIG. 19 illustrates the case where number Nt of transmission antennas is 2, but number Nt of transmission antennas is not limited thereto. For example, an increased number of transmission antennas 109 allows use of a larger number of transmission antennas 109 as beam transmission antennas, thereby increasing the directivity gain. For example, when number Nt of transmission antennas used for multiplexing transmission is 4, it is possible to use 4 (=Nt) transmission antennas 109 as the beam transmission antennas by setting number $N_{DM}$ of Doppler multiplexing to 1 and number $N_{CM}$ of code multiplexing to 4 and by using the orthogonal code sequences with code length Loc=4. Note that, the antennas illustrated in FIG. 19 may be a part of a plurality of antennas that radar apparatus 10 includes.

The antenna arrangement example has been described above.

As described above, radar apparatus 10 applies phase rotation amounts corresponding to orthogonal code sequences to radar transmission signals to perform multiplexing transmission of radar transmission signals (in other words, code multiplexed signals) from a plurality of transmission antennas 109. Further, since reception signals for each transmission period can be regarded as reception signals of orthogonal beam transmission, a beam transmission antenna forming a sub-array is obtained by a plurality of transmission antennas 109. For example, when radar transmission signals are transmitted at equal power from transmission antennas 109 constituting the beam transmission antenna, the beam transmission antenna can be treated as a new antenna (beam transmission antenna) for which a midpoint position between transmission antennas 109 serves as the phase center of the sub-array. Note that, when the radar transmission signals are not transmitted at an equal power from transmission antennas 109 constituting the beam transmission antenna, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

Thus, it is possible for radar apparatus 10 to utilize the transmission antennas such that the number thereof is made greater than the number (Nt) of transmission antennas 109 for multiplexing transmission. Further, for example, radar apparatus 10 (radar receiver 200) performs sensing processing of sensing an target object (target) using virtual reception antennas (for example, (Nt+1)×Na virtual reception antennas) that are constituted by a beam transmission antenna formed by a plurality of transmission antennas 109, a plurality of transmission antennas 109, and a plurality of reception antennas 202. As is understood, it is possible for radar apparatus 10, for example, to increase the virtual reception antennas by using the beam transmission antenna and a plurality of transmission antennas 109 (e.g., it is possible to utilize (Nt+1)×Na virtual reception antennas with respect to number Nt of transmission antennas for multiplexing transmission). It is thus possible to improve the angular resolution in direction estimator 214 of radar apparatus 10 or reduce the sidelobe level. Such improvement of the angular measurement performance makes it possible to improve target-object sensing accuracy of radar apparatus 10.

Variation 3 of Embodiment 1

Variation 3 of Embodiment 1 will be described in relation to processing (for example, reception processing) in which encoder 107 sets the numbers of coded Doppler multiplexing for Doppler multiplexed signals uniformly by using the equal-interval Doppler shift amount setting of intervals narrower than the intervals of the maximum equal-interval Doppler shift amount setting.

For example, the following description will be given of an operation of radar receiver 200 in a case where Doppler shift setter 106 sets the numbers of coded Doppler multiplexing for the Doppler multiplexed signals uniformly by using the equal-interval Doppler shift amount setting of intervals narrower than the intervals of the maximum equal-interval Doppler shift amount setting (e.g., Expression 6). Hereinafter, a difference in the operation of radar receiver 200 between the present embodiment and Embodiment 1 will be described.

For example, when the equal-interval Doppler shift amount setting using phase rotation amount $\varphi_{ndm}$ given by Expression 6 is used, $N_{DM}$ peaks are detected at intervals of $\Delta FD=Ncode/(N_{DM}+N_{int})$. It is thus possible for CFAR section 211 to apply the Doppler domain compression CFAR processing. For example, as given by following Expression 63, CFAR section 211 performs power addition for Doppler multiplexed signals while adjusting peak positions of the Doppler multiplexed signals to perform the Doppler domain compression CFAR processing. Here, $f_{s\_comp}=-\Delta FD/2, \ldots, \Delta FD/2-1=Ncode/\{2(N_{DM}+N_{int})\}, \ldots, Ncode/\{2(N_{DM}+N_{int})\}-1$.

[66]

$$PowerFT_{comp}(f_b, f_{scomp}) = \qquad \text{(Expression 63)}$$
$$\sum_{nfd=1}^{N_{DM}+N_{int}} PowerFT\left(f_d, f_{s\_comp} + \left(nfd - \text{ceil}\left(\frac{N_{DM}+N_{int}}{2}\right) - 1\right) \times \Delta FD\right)$$

Note that, in Expression 63, in a case where

[67]

$$f_{s\_comp} + \left(nfd - \text{ceil}\left(\frac{N_{DM}+N_{int}}{2}\right) - 1\right) \times \Delta FD < -Ncode/2,$$

the Doppler frequency index to which Ncode is added is used.

In addition, in Expression 63), in a case where

[68]

$$f_{s\_comp} + \left(nfd - \text{ceil}\left(\frac{N_{DM}+N_{int}}{2}\right) - 1\right) \times \Delta FD > \frac{Ncode}{2} - 1,$$

the Doppler frequency index from which Ncode is further subtracted is used.

It is thus possible to compress the Doppler frequency range for the CFAR processing to $1/(N_{DM}+N_{int})$ to reduce the amount of CFAR processing and to simplify the circuit configuration. In addition, CFAR section 211 is capable of power addition for $N_{DM}$ Doppler-shift multiplexed signals, to improve SNR by about $(N_{DM})^{1/2}$. As a result, the radar sensing performance of radar apparatus 10 can be improved.

CFAR section 211 using the Doppler domain compression CFAR processing adaptively sets a threshold, for example, and outputs, to coded Doppler demultiplexer 212, distance index $f_{b\_cfar}$ and Doppler frequency index $f_{s\_comp\_cfar}$ that provide a received power greater than the threshold, and received power information PowerFT($f_{b\_cfar}$, $f_{s\_comp\_cfar}$+(nfd−ceil(($N_{DM}+N_{int}$)/2)−1)×$\Delta FD$ (where nfd=1, . . . , $N_{DM}$+$N_{int}$)) for the Doppler frequency indices ($f_{s\_comp\_cfar}$+(nfd−ceil(($N_{DM}+N_{int}$)/2)−1)×$\Delta FD$) of $N_{DM}$ Doppler multiplexed signals.

Next, an example of the operation of coded Doppler demultiplexer 212 illustrated in FIG. 1 will be described. The following describes an example of processing performed by coded Doppler demultiplexer 212 when CFAR section 211 uses the Doppler domain compression CFAR processing.

Based on the outputs of CFAR section 211 (e.g., distance indices $f_{b\_cfar}$, Doppler frequency indices $f_{s\_comp\_cfar}$, and received power information PowerFT($f_{b\_cfar}$, $f_{s\_comp\_cfar}$+(nfs−ceil(($N_{DM}+N_{int}$)/2)−1)×$\Delta FD$ (where nfd=1, . . . , ($N_{DM}+N_{int}$))) for the Doppler frequency indices ($f_{s\_comp\_cfar}$+(nfd−ceil(($N_{DM}+N_{int}$)/2)−1)×$\Delta FD$) of ($N_{DM}+N_{int}$) Doppler multiplexed signals), coded Doppler demultiplexer 212 separates the coded Doppler multiplexed transmission signals using the outputs of Doppler analyzers 210, and distinguishes (in other words, judges or identifies) transmission antennas 109 and the Doppler frequencies (in other words, the Doppler velocities or relative velocities).

As described above, in the case where the numbers of coded Doppler multiplexing for the Doppler multiplexed signals are set uniformly by using the equal-interval Doppler shift amount setting of intervals narrower than the intervals of the maximum equal-interval Doppler shift amount setting (e.g., Expression 6), coded Doppler demultiplexer 212 performs, for example, (1) the aliasing judgement, and (2) the Doppler code separation processing on the coded Doppler multiplexed signals used for multiplexing transmission based on the result of the aliasing judgement.

Processing (1) and processing (2) by coded Doppler demultiplexer 212 described above will be described below.

<(1) Aliasing Judgement Processing (Detection Processing of Detecting Unused Coded Doppler Multiplexed Signal)>

For example, in the aliasing judgement, coded Doppler demultiplexer 212 detects $N_{DM}$ peaks at intervals of $\Delta FD=Ncode/(N_{DM}+N_{int})$ using the outputs of CFAR section 211 (e.g., distance indices $f_{b\_cfar}$, Doppler frequency indices $f_{s\_comp\_cfar}$, and received power information PowerFT ($f_{b\_cfar}$, $f_{s\_comp\_cfar}$+(nfd−ceil($N_{DM}+N_{int}$)/2)−1)×$\Delta FD$ (where nfd=1, . . . , ($N_{DM}+N_{int}$))) for the Doppler frequency indices ($f_{s\_comp\_cfar}$+(nfd−ceil(($N_{DM}+N_{int}$)/2)−1)×$\Delta FD$ of ($N_{DM}+N_{int}$) Doppler multiplexed signals). For example, using received power information PowerFT($f_{b\_cfar}$, $f_{s\_comp\_cfar}$+(nfd−ceil($N_{DM}+N_{int}$)/2)−1)×$\Delta FD$) for Doppler frequency indices ($f_{s\_comp\_cfar}$+(nfd−ceil($N_{DM}+N_{int}$)/2)−1)× $\Delta FD$) of the ($N_{DM}+N_{int}$) Doppler multiplexed signals, coded Doppler demultiplexer 212 detects the Doppler frequency indices of $N_{int}$ coded Doppler multiplexed signals not used for multiplexing transmission. Through this processing, coded Doppler demultiplexer 212 performs the aliasing judgement in the Doppler range of ±1/(2Loc×Tr).

For example, when Expression 6 is used and when $N_{int}=1$ is set in the case of $N_{DM}=3$,

[69]

$$\phi_{ndm} = \frac{2\pi(ndm-1)}{N_{DM} + N_{int}} = \frac{2\pi(ndm-1)}{4}$$

holds true, and $\varphi_1$, $\varphi_2$, and $\varphi_3(=\varphi_{N\_DM})$ are 0°, 90°, and 180°, respectively. Here, ndm=1, . . . , $N_{DM}$.

Further, the Doppler shift amounts corresponding respectively to such phase rotations are $DOP_1=0$, $DOP_2=\Delta FD$, and $DOP_3$ $(=DOP_{N\_DM})=2\Delta FD$, respectively. Thus, $N_{DM}$ Doppler multiplexed signals are assigned at intervals of $\Delta FD$, and there are $N_{int}$ Doppler shift amounts that are not assigned at the intervals of $\Delta FD$. Here, $N_{int}=1$, and no Doppler multiplexed signal is assigned to a Doppler shift amount of $-\Delta FD$. Further, radar apparatus 10 can identify $N_{DM}$ Doppler multiplexed signals ($DOP_1$, $DOP_2$, and $DOP_3$ $(=DOP_{N\_DM})$ assigned at the intervals of $\Delta FD$ when successfully detecting the Doppler shift amounts that are not assigned at the intervals of $\Delta FD$.

Signals holding the relationship of the Doppler shift amounts applied in radar transmitter 100 as described above are received as radar reception signals in radar apparatus 10. As is understood from the above, by using the outputs of CFAR section 211 (e.g., distance indices $f_{b\_cfar}$, Doppler frequency indices $f_{s\_comp\_cfar}$, and received power information PowerFT($f_{b\_cfar}$, $f_{s\_comp\_cfar}$+(nfd−ceil(($N_{DM}$+$N_{int}$)/2)−1)×$\Delta FD$ (where nfd=1, . . . , ($N_{DM}$+$N_{int}$))) for the Doppler frequency indices ($f_{s\_comp\_cfar}$+(nfd−ceil(($N_{DM}$+$N_{int}$)/2)−1)×$\Delta FD$ of ($N_{DM}$+$N_{int}$) Doppler multiplexed signals), coded Doppler demultiplexer 212 detects the Doppler frequency indices of $N_{int}$ coded Doppler multiplexed signals not used for Doppler multiplexing transmission. It is thus possible for coded Doppler demultiplexer 212 to perform the aliasing judgement in the Doppler range of +1/(2Loc×Tr).

Here, the detection of the Doppler frequency indices of $N_{int}$ coded Doppler multiplexed signals not used for Doppler multiplexing transmission may be performed using received power information PowerFT($f_{b\_cfar}$, $f_{s\_comp\_cfar}$+(nfd−ceil(($N_{DM}$+$N_{int}$)/2)−1)×$\Delta FD$) as follows.

For example, when $N_{int}=1$, coded Doppler demultiplexer 212 detects a $D_r$ in which received power PowerFT($f_{b\_cfar}$, $f_{s\_comp\_cfar}$+($D_r$−ceil(($N_{DM}$+$N_{int}$)/2)−1)×$\Delta FD$) is minimized among the $D_r$ ranges, as given by following Expression 64. Such a $D_r$ is expressed as "$D_{r\ min}$." Here, $D_r$ is an integer value in a range of $D_r$=−ceil(($N_{DM}$+$N_{int}$)/2), . . . , ceil(($N_{DM}$+$N_{int}$)/2)−1.

[70]

$$D_{r_{min}} = \left\{\arg D_r \middle| \min_{D_r} PowerFT \right. \tag{Expression 64}$$
$$\left. \left(f_{b\_cfar}, f_{s\_comp\_cfar} + \left(D_r - \text{ceil}\left(\frac{N_{DM} + N_{int}}{2}\right) - 1\right)\Delta FD\right)\right\}$$

For example, when $N_{int}>2$, coded Doppler demultiplexer 212 detects $D_r$ of minimized power by utilizing the beforehand knowledge of relative positional relationship between the Doppler frequency indices of $N_{int}$ coded Doppler multiplexed signals not used for Doppler multiplexing transmission in respective $D_r$. For example, when $N_{int}>2$, coded Doppler demultiplexer 212 detects a $D_r$ in which the received power is minimized among the $D_r$ using following Expression 65. Such a $D_r$ is expressed as "$D_{r\ min}$." Here, $D_r$ is an integer value in a range of $D_r$=−ceil(($N_{DM}$+$N_{int}$)/2), . . . , ceil(($N_{DM}$+$N_{int}$)/2)−1. Here, $F_{nint}(D_r)$ is an index representing the relative positional relationship of the Doppler frequency index of the nint-th coded Doppler multiplexed signal not used for Doppler multiplexing transmission in $D_r$. Note that the index interval between that indices represented by $F_{nint}(D_r)$ is $\Delta FD$. Here, nint=1, . . . , $N_{int}$.

[71]

$$D_{rmin} = \left\{\arg D_r \middle| \min_{D_r} \sum_{nint=1}^{N_{int}} PowerFT\left(f_{b\_cfar}, \right. \right. \tag{Expression 65}$$
$$\left. \left. f_{s\_comp\_cfar} + \left(F_{nint}(D_r) - \text{ceil}\left(\frac{N_{DM} + N_{int}}{2}\right) - 1\right)\Delta FD\right)\right\}$$

Coded Doppler demultiplexer 212 outputs, to peak extractor 213, an aliasing judgement result (e.g., $f_{b\_cfar}$, $f_{s\_comp\_cfar}$, $D_{rmin}$) with respect to a reception signal for $f_{b\_cfar}$ and $f_{s\_comp\_cfar}$.

The operation example of the aliasing processing has been described above.

<(2) Doppler Code Separation Processing on Coded Doppler Multiplexed Signal Used for Multiplexing Transmission>

Coded Doppler demultiplexer 212 performs coded Doppler demultiplexing processing on a coded Doppler multiplexed signal used for multiplexing transmission based on an aliasing judgement result.

For example, based on Expression 51 and based on $D_{rmin}$ which is a result of aliasing judgement in aliasing judgement processing, the coded Doppler demultiplexer separates and receives the coded Doppler multiplexed signal to which DCI (ncm, ndm) used for multiplexing transmission is assigned. For example, coded Doppler demultiplexer 212 can perform the separation processing using Expression 51 to separate and receive the coded Doppler multiplexed signal to which DCI (ncm, ndm) used for the multiplexing transmission is assigned.

Note that, following Expression 66 is used for $VFTALL_z$ ($f_{b\_cfar}$, $f_{s\_comp\_cfar}$, $D_r$, ndm) in Expression 51. Note that, the term "$N_{code}F_R(D_r, ndm)/(N_{DM}+N_{int})$" in Expression 66 can also be expressed as $F_R(D_r, ndm)\Delta FD$ using $\Delta FD=Ncode/(N_{DM}+N_{int})$. Therefore, the expression is applicable in the other cases than the case of $\Delta FD=Ncode/(N_{DM}+N_{int})$. In addition, the term "Ncode/($N_{DM}+N_{int}$)" in the following expressions represents $\Delta FD$. When $\Delta FD=Ncode/(N_{DM}+N_{int})$ is not used, the expression is applicable and the same effect is achievable by replacing Ncode/($N_{DM}+N_{int}$) with $\Delta FD$. Here, ndm=1, . . . , $N_{DM}$.

[72]

$$VFTALL_z(f_{b\_cfar}, f_{s\_comp\_cfar}, D_r, ndm) = \tag{Expression 66}$$
$$\left[VFT_z^1\left(f_{b\_cfar}, f_{s\_comp\_cfar} + \frac{N_{code}F_R(D_r, ndm)}{N_{DM} + N_{int}}\right) \ldots \right.$$
$$\left. VFT_z^{Loc}\left(f_{b\_cfar}, f_{s\_comp\_cfar} + \frac{N_{code}F_R(D_r, ndm)}{N_{DM} + N_{int}}\right)\right]^T$$

In Expression 66, $F_R(D_r, ndm)$ can be set in advance when Doppler aliasing range $D_r$ and phase rotation amounts $\varphi_1$, $\varphi_2$, . . . , and $\varphi_{N\_DM}$ for applying Doppler shift amounts $DOP_1$, $DOP_2$, . . . , and $DOP_{N\_DM}$ are fixed. Therefore, for example, coded Doppler demultiplexer 212 may tabulate the correspondence between, on one hand, Doppler aliasing range $D_r$ and the phase rotation amounts and, on the other hand, $F_R(D_r, ndm)$ and read $F_R(D_r, ndm)$ based on Doppler aliasing range $D_r$ and a phase rotation amount. Further, for example, when phase rotation amounts $\varphi_1, \varphi_2, \ldots,$ and $\varphi_{N\_DM}$ for applying Doppler shift amounts $DOP_1$, $DOP_2, \ldots,$ and $DOP_{N\_DM}$ satisfy $-\pi \leq \varphi_1 < \varphi_2 < \ldots < \varphi_{N\_DM} < \pi$, $F_R(D_r, ndm)$ can be expressed as in following Expression 67:

[73]
(Expression 67)
$$F_R(D_r, ndm) = \mod(ndm - 1 - D_r, N_{DM}) - \text{ceil}\left(\frac{N_{DM} + N_{int}}{2}\right).$$

Since by the aliasing judgement processing it is possible to judge an index ($D_{rtrue}$) that is a true Doppler aliasing range within the Doppler range of from $-1/(2Loc \times Tr)$ to less than $1/(2Loc \times Tr)$ (in other words, it is possible to judge an index such that $D_{rmin} = D_{rtrue}$), it becomes possible for coded Doppler demultiplexer 212 to set, to zero, the correlation value between the orthogonal codes used for code multiplexing in the Doppler range of from $-1/(2Loc \times Tr)$ to less than $1/(2Loc \times Tr)$, so as to perform the separation processing in which the interference between the code multiplexed signals is suppressed.

Through the code separation processing as described above, and, based on the aliasing judgement result assuming the Doppler range of $\pm 1/(2Loc \times Tr)$, radar apparatus 10 can separate and receive the coded Doppler multiplexed signal to which DCI (ncm, ndm) used for the multiplexing transmission is assigned.

Further, since the coded Doppler multiplexed signal to which DCI (ncm, ndm) is assigned is transmitted from transmission antenna Tx #[ncm, ndm], it is also possible to judge transmission antenna 109. In other words, radar apparatus 10 can separate and receive the coded Doppler multiplexed signal which is transmitted from transmission antenna Tx #[ncm, ndm] and to which DCI (ncm, ndm) is assigned.

In addition, for example, during coded Doppler demultiplexing processing, radar apparatus 10 performs, on the outputs of Doppler analyzers 210 for each code element, Doppler phase correction, for example, based on Doppler phase correction vector $\alpha(f_{s\_comp\_cfar}, D_r)$ taking into consideration Doppler aliasing. Such phase correction corresponds to correcting phase changes corresponding to Doppler components among the Doppler component candidates with respect to $f_{s\_comp\_cfar}$. Mutual interference between code multiplexed signals can thus be reduced, for example, as low as a noise level. In other words, radar apparatus 10 can reduce inter-code interference to suppress the effect on degradation of the detection performance of radar apparatus 10.

The foregoing description has been given of an example of the operation of coded Doppler demultiplexer 212.

In FIG. 1, peak extractor 213 outputs, to direction estimator 214, at least one of the outputs of Doppler analyzers 210 for distance index $f_{b\_cfar}$ and Doppler frequency index $f_{s\_comp\_cfar}$ inputted from CFAR section 211. At this time, peak extractor 213 may use, for example, $D_{rmin}$ that is a Doppler aliasing judgement result inputted from coded Doppler demultiplexer 212.

For example, in the example illustrated in FIG. 1, peak extractor 213 outputs output $VFT_z^{-1}(f_{b\_cfar}, f_{s\_comp\_cfar} + (N_{code}F_R(D_{rmin}, ndm_{-BF})/(N_{DM}+N_{int})))$ of first Doppler analyzer 210 (Doppler analyzer 210-1)) to direction estimator 214. Here, $ndm_{-BF}$ is any one of $1, \ldots, N_{DM}$, and a plurality of transmission antennas 109 to which the $ndm_{-BF}$-th Doppler multiplexed signal is assigned are a combination of transmission antennas 109 that satisfies the condition of the adjacent arrangement described above, for example.

In FIG. 1, based on aliasing judgement result $D_{rmin}$ for distance index $f_{b\_cfar}$ and Doppler frequency index $f_{s\_comp\_cfar}$ inputted from coded Doppler demultiplexer 212, direction estimator 214 performs direction estimation processing for estimation of the direction of a target based on separated received signal $Y_z(f_{b\_cfar}, f_{s\_comp\_cfar}, D_{rmin}, ncm, ndm)$ of the coded Doppler multiplexed signal to which DCI (ncm, ndm) is assigned and which is transmitted from transmission antenna Tx #[ncm, ndm], and based on the output from a part of Doppler analyzers 210 (Doppler analyzer 210-1 in FIG. 1) inputted from peak extractor 213.

Note that, by way of example, the case where output $VFT_z^{-1}(f_{b\_cfar}, f_{s\_comp\_cfar} + (N_{code}F_R(D_{rmin}, ndm_{-BF})/(N_{DM}+N_{int})))$ from first Doppler analyzer 210 is used will be described below, but the output from peak extractor 213 is not limited to this. In addition, $z = 1, \ldots, Na$.

For example, direction estimator 214 generates, based on the outputs of coded Doppler demultiplexer 212 and peak extractor 213, virtual reception array correlation vector $h(f_{b\_cfar}, f_{s\_comp\_cfar})$ given by following Expression 68 and performs the direction estimation processing. Virtual reception array correlation vector $h(f_{b\_cfar}, f_{s\_comp\_cfar})$ includes Nt×Na elements, the number of which is the product of number Nt of transmission antennas and number Na of reception antennas, and further includes elements resulting from use of beam transmission antennas. Detailed descriptions will be given below.

Virtual reception array correlation vector $h(f_{b\_cfar}, f_{s\_comp\_cfar})$ includes elements of beam transmission antennas. The elements of beam transmission antennas are based on the output (e.g., $VFT_z^{-1}(f_{b\_cfar}, f_{s\_comp\_cfar} + (N_{code}F_R(D_{rmin}, ndm_{-BF})/(N_{DM}+N_{int})))$) of a part of Doppler analyzers 210 that is inputted from peak extractor 213. The elements of beam transmission antennas result from code multiplexing transmission using the same Doppler multiplexing and constitute a sub-array by adjacent transmission antennas 109 for orthogonal beam transmission.

For example, when there are $N_{BF}$ beam transmission antennas, virtual reception array correlation vector $h(f_{b\_cfar}, f_{s\_comp\_cfar})$ includes (Nt+$N_{BF}$)×Na elements. By way of example, when number $N_{BF}$ of beam transmission antennas is 1, virtual reception array correlation vector $h(f_{b\_cfar}, f_{s\_comp\_cfar})$ is expressed by following Expression 68. In Expression 68, an example is expressed in which peak extractor 213 outputs output $VFT_z^{-1}(f_{b\_cfar}, f_{s\_comp\_cfar} + (N_{code}F_R(D_{rmin}, ndm_{-BF})/(N_{DM}+N_{int})))$ from first Doppler analyzer 210 to direction estimator 214, but the present invention is not limited to this.

Further, since the output of coded Doppler demultiplexer 212 and the output of peak extractor 213 have different noise levels, values obtained by multiplication by a normalizing factor may be used as virtual reception array correlation vector $h(f_{b\_cfar}, f_{s\_comp\_cfar})$.

[74]

$$h(f_{b\_cfar}, f_{s\_comp\_cfar}) = \begin{bmatrix} Y_1(f_{b\_cfar}, f_{s\_comp\_cfar}, D_{rmin}, 1, 1) \\ Y_2(f_{b\_cfar}, f_{s\_comp\_cfar}, D_{rmin}, 1, 1) \\ \vdots \\ Y_{Na}(f_{b\_cfar}, f_{s\_comp\_cfar}, D_{rmin}, 1, 1) \\ \vdots \\ Y_1(f_{b\_cfar}, f_{s\_comp\_cfar}, D_{rmin}, N_{DOP\_CODE(1)}, 1) \\ Y_2(f_{b\_cfar}, f_{s\_comp\_cfar}, D_{rmin}, N_{DOP\_CODE(1)}, 1) \\ \vdots \\ Y_{Na}(f_{b\_cfar}, f_{s\_comp\_cfar}, D_{rmin}, N_{DOP\_CODE(1)}, 1) \\ \vdots \\ Y_1(f_{b\_cfar}, f_{s\_comp\_cfar}, D_{rmin}, 1, N_{DM}) \\ Y_2(f_{b\_cfar}, f_{s\_comp\_cfar}, D_{rmin}, 1, N_{DM}) \\ \vdots \\ Y_{Na}(f_{b\_cfar}, f_{s\_comp\_cfar}, D_{rmin}, 1, N_{DM}) \\ \vdots \\ Y_1(f_{b\_cfar}, f_{s\_comp\_cfar}, D_{rmin}, N_{DOP\_CODE(N_{DM})}, N_{DM}) \\ Y_2(f_{b\_cfar}, f_{s\_comp\_cfar}, D_{rmin}, N_{DOP\_CODE(N_{DM})}, N_{DM}) \\ \vdots \\ Y_{Na}(f_{b\_cfar}, f_{s\_comp\_cfar}, D_{rmin}, N_{DOP\_CODE(N_{DM})}, N_{DM}) \\ VFT_1^1\left(f_{b\_cfar}, f_{s\_comp\_cfar} + \frac{N_{code}F_R(D_{rmin}, ndm\_BF)}{N_{DM} + N_{int}}\right) \\ VFT_2^1\left(f_{b\_cfar}, f_{s\_comp\_cfar} + \frac{N_{code}F_R(D_{rmin}, ndm\_BF)}{N_{DM} + N_{int}}\right) \\ \vdots \\ VFT_{Na}^1\left(f_{b\_cfar}, f_{s\_comp\_cfar} + \frac{N_{code}F_R(D_{rmin}, ndm\_BF)}{N_{DM} + N_{int}}\right) \end{bmatrix}$$

(Expression 68)

Virtual reception array correlation vector $h(f_{b\_cfar}, f_{s\_comp\_cfar})$ is used in processing for performing, on reflected wave signals from a target, direction estimation based on a phase difference between reception antennas 202.

Since subsequent operations of direction estimator 214 are the same as those in Embodiment 1, the description thereof is omitted.

The foregoing description has been given above of the operation example of radar receiver 200 in the case where encoder 107 sets the numbers of coded Doppler multiplexing for Doppler multiplexed signals uniformly by using the equal-interval Doppler shift amount setting of intervals narrower than the intervals of the maximum equal-interval Doppler shift amount setting.

Antenna Arrangement Example

Hereinafter, an example of arrangement of antennas in the case of uniformly setting the numbers of coded Doppler multiplexing. Further, for example, an example of an antenna arrangement in the case where the numbers of coded Doppler multiplexing for Doppler multiplexed signals are uniformly set and a plurality of numbers of beam transmission antennas are set.

For example, with reference to FIG. 20, a description will be given of a case where number Nt of transmission antennas used for multiplexing transmission is 4, number $N_{DM}$ of Doppler multiplexing is 2, $N_{CM}$ is 2, orthogonal code sequences $Code_1$ {1, 1} and $Code_2$ {1, −1} with code length Loc=2 are set, and numbers $N_{DOP\_CODE}(1)$ and $N_{DOP\_CODE}(2)$ of coded Doppler multiplexing are 2 and 2, respectively, in radar apparatus 10. Note that number $N_{BF}$ of beam transmission antennas is set to 2, and $ndm\__{BF1}=1$ and $ndm\__{BF2}=2$ are used as indices of Doppler multiplexed signals used for the beam transmission antennas.

Figure 20:
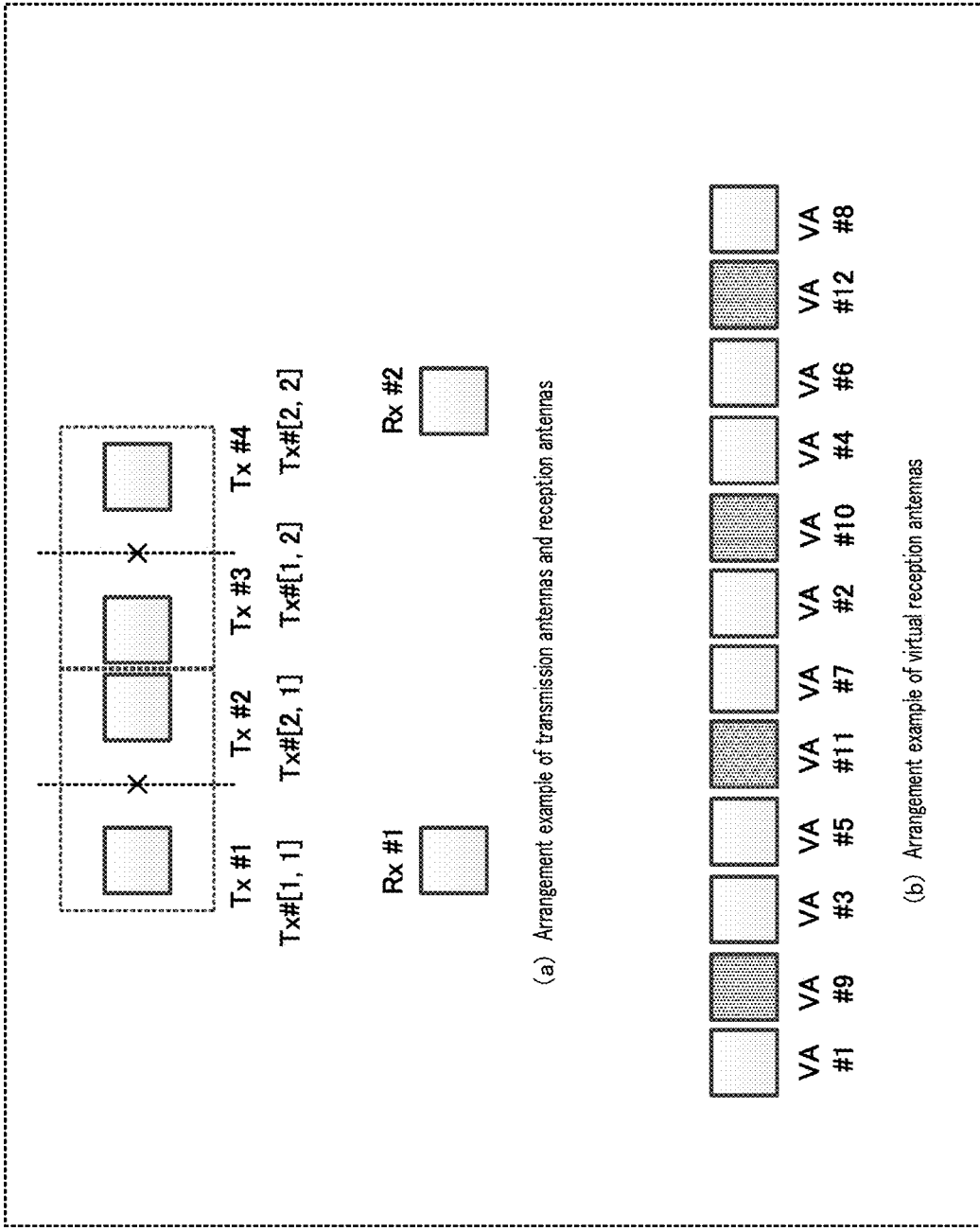
FIG. 20 illustrates an arrangement example of antennas according to Variation 3 of Embodiment 1.

In FIG. 20, for example, horizontally arranged four transmission antennas 109 (Tx #1, Tx #2, Tx #3, and Tx #4) are transmission antenna Tx #[1, 1], transmission antenna Tx #[2, 1], transmission antenna Tx #[1, 2], and transmission antenna Tx #[2, 2] from the left. In FIG. 20, two transmission antennas Tx #1 (Tx #[1, 1]) and Tx #2 (Tx #[2, 1]) (first sub-array antenna) transmit radar transmission signals using the same Doppler multiplexing (Doppler shift amount=$DOP_1$). Further, two adjacent transmission antennas Tx #3 (Tx #[1, 2]) and Tx #4 (Tx #[2, 2]) (second sub-array antenna) transmit radar transmission signals using the same Doppler multiplexing (Doppler shift amount=$DOP_2$). Thus, in FIG. 20, one beam transmission antenna is formed by Tx #1 and Tx #2, and one beam transmission antenna is formed by Tx #3 and Tx #4. In FIG. 20, number $N_{BF}$ of beam transmission antennas is 2. In the following, the beam transmission antenna corresponding to Tx #1 and Tx #2 may also be referred to as "Tx #5," and the beam transmission antenna corresponding to Tx #3 and Tx #4 may also be referred to as "Tx #6" in FIG. 20.

Further, in FIG. 20, number Na of reception antennas is two (e.g., Rx #1 and Rx #2). Note that, number Na of reception antennas is not limited to two, and may be three or more, for example.

For example, when radar transmission signals are transmitted from adjacent Tx #1 (Tx #[1, 1]) and Tx #2 (Tx #[2, 1]) and from adjacent Tx #3 (Tx #[1, 2]) and Tx #4 (Tx #[2, 2]), for example, at an equal power, the midpoint position between Tx #1 and Tx #2 serves as the phase center of beam transmission antenna Tx #5, and the midpoint position between Tx #3 and Tx #4 serve as the phase center of beam transmission antenna Tx #6 (the cross marks illustrated at (a) in FIG. 20). Note that, when the radar transmission signals are not transmitted at an equal power from transmission antennas 109 constituting the beam transmission antennas, transmission at each position that is dependent on the ratio of transmission powers of respective transmission antennas 109 constituting the beam transmission antenna (the position of the center of gravity of the transmission powers from the respective transmission antennas) and serves as the phase center of the sub-array can be treated as transmission by the beam transmission antenna.

Arrangement of VA #1 to VA #12 of virtual reception antennas (or MIMO virtual antennas) as illustrated at (b) in FIG. 20 is constituted by the arrangement of transmission antennas Tx #1 to Tx #4, beam transmission antennas Tx #5 and Tx #6, and reception antennas Rx #1 and Rx #2 as illustrated at (a) in FIG. 20. At (b) in FIG. 20, the virtual antenna arrangement obtained based on beam transmission antennas Tx #5 and Tx #6 corresponds to VA #9, VA #11, VA #10, and VA #12.

Here, the arrangement of the virtual reception array may be expressed by following Expression 53, for example, based on the positions of transmission antennas 109 constituting the transmission array antenna (e.g., the positions of the feeding points) and the position of reception antenna 202 constituting the reception array antenna (e.g., the position of the feeding point).

As illustrated at (b) in FIG. 20, since $(Nt+N_{BF})=6$ and $Na=2$, the virtual reception antenna arrangement using the beam transmission antennas is the equally spaced array arrangement of 12 elements. On the other hand, when no beam transmission antenna is used in the same antenna arrangement as (a) in FIG. 20 and in a case (not illustrated) where the equally spaced arrangement is formed in the same manner as at (b) in FIG. 19, the virtual reception antenna arrangement is an equally spaced array arrangement of eight elements since number Nt of transmission antennas is 4 and number Na of reception antennas is 2.

As described above, it is possible to increase the number of beam transmission antennas by increasing number $N_{DM}$ of Doppler multiplexing. It is thus possible to further increase the number of virtual reception antennas. Further, since encoder 107 uniformly sets the numbers of coded Doppler multiplexing for the Doppler multiplexed signals, all transmission antennas 109 are used for respective beam transmission antennas in radar apparatus 10. Accordingly, the number of beam transmission antennas is easy to be increased in comparison with the case where the numbers of coded Doppler multiplexing for the Doppler multiplexed signal are set non-uniformly. In other words, the number of transmission antennas 109 required to increase the number of beam transmission antennas can be reduced.

For example, in order to set number $N_{CM}$ of code multiplexing to 2 and number $N_{BF}$ of beam transmission antennas to 1, number Nt of transmission antennas >2 is requisite for the non-uniform setting of the numbers of coded Doppler multiplexing for Doppler multiplexed signals. Meanwhile, number Nt of transmission antennas=2 is also applicable when the numbers of coded Doppler multiplexing for the Doppler multiplexed signals are set uniformly.

An increase in the number of beam transmission antennas accompanying such an increase in number $N_{DM}$ of Doppler multiplexing allows for further enlargement of the aperture length of the virtual reception antennas, and further improvement of the angular resolution in the virtual reception antenna arrangement using the beam transmission antenna. Further, by the virtual reception antennas densely arranged, it is possible to suppress the increase of the sidelobe, and to improve the angular resolution.

Note that, the example illustrated in FIG. 20 illustrates the case where number $N_{BF}$ of beam transmission antennas is 2, but number $N_{BF}$ of beam transmission antennas is not limited thereto. For example, an increase in the number of transmission antennas 109 allows for setting of a larger number of beam transmission antennas, thus improving the angular resolution of radar apparatus 10 or suppressing the sidelobe level.

In addition, although FIG. 20 illustrates the case where a plurality of transmission antennas 109 and reception antennas 202 are arranged horizontally, the arrangement of transmission antennas 109 and reception antennas 202 is not limited thereto. For example, at least one transmission antennas 109 or reception antennas 202 may be arranged vertically, or may be arranged in a horizontal and vertical plane. Also in these cases, it is possible to achieve the same effect. Note that, the antennas illustrated in FIG. 20 may be a part of a plurality of antennas that radar apparatus 10 includes.

Embodiment 2

The present embodiment will be described in relation to a method of applying a directivity weight to form the directivity of a beam transmission antenna in a predetermined direction (a method of controlling the directivity of the beam transmission antenna) in addition to the operation of Embodiment 1.

[Configuration of Radar Apparatus]

Figure 21:
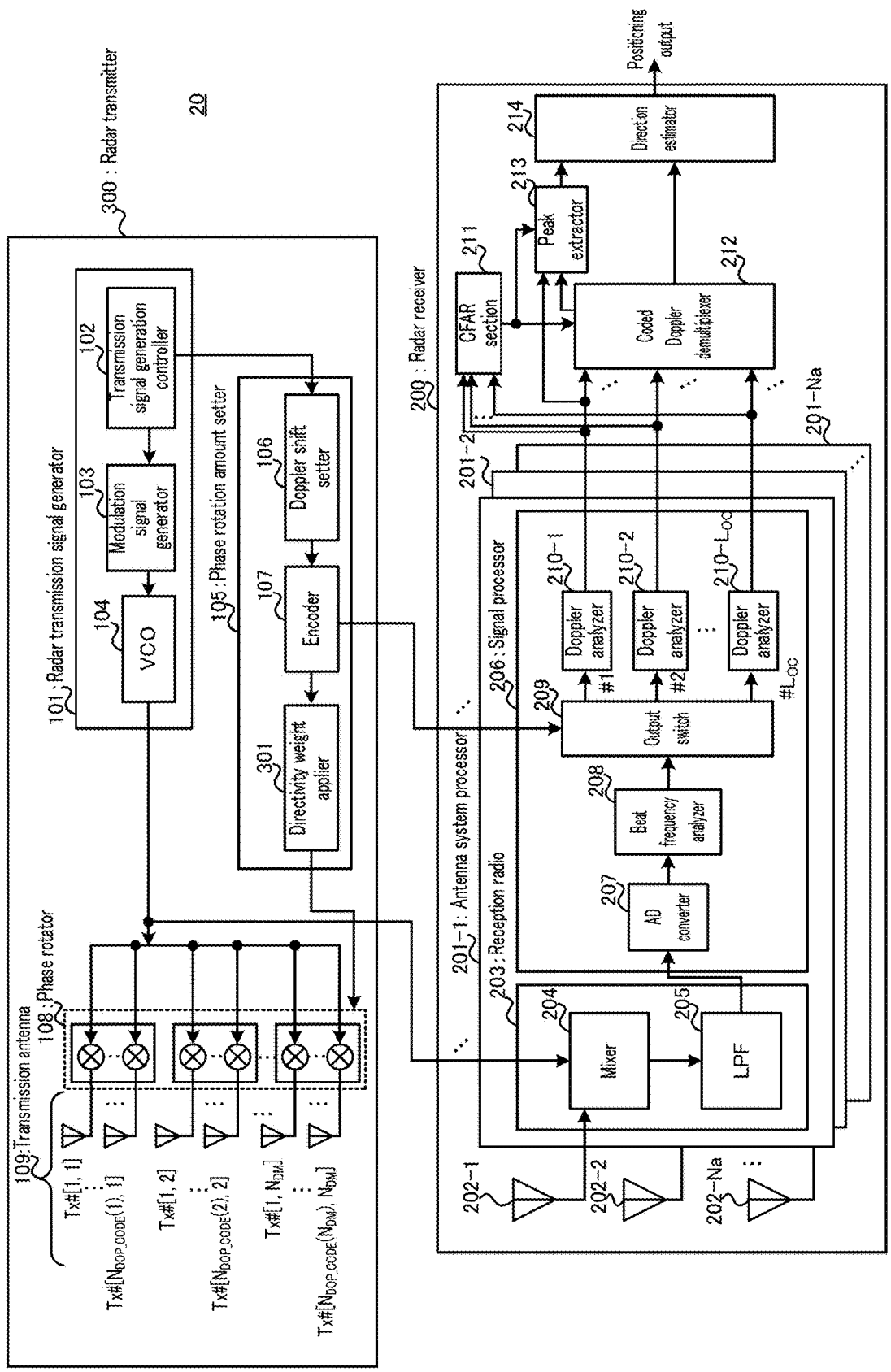
FIG. 21 is a block diagram illustrating an example configuration of a radar apparatus according to Embodiment 2.

In FIG. 21, components similar to those in Embodiment 1 (FIG. 1) are identified with the same numerals, and a description thereof is omitted.

In radar transmitter 300 of radar apparatus 20, phase rotation amount setter 105 may include directivity weight applier 301.

Directivity weight applier 301 outputs phase rotation amounts $DW_{ndop\_code(ndm\_BF),\ ndm\_BF}(m)$ to phase rotators 108. As given by following Expression 69, each of phase rotation amounts $DW_{ndop\_code(ndm\_BF),\ ndm\_BF}(m)$ is obtained by further applying phase rotation $DIR_{ndop\_code(ndm\_BF),\ ndm\_BF}(\theta)$ and $TxCAL_{ndop\_code(ndm\_BF),\ ndm\_BF}$ to $ndm\_BF$-th coded Doppler phase rotation amount $\psi_{ndop\_code(ndm\_BF),\ ndm\_BF}(m)$ used for a beam transmission antenna among coded Doppler phase rotation amounts $\psi_{ndop\_code(ndm),\ ndm}(m)$ for m-th transmission period Tr that are inputted from encoder 107 and given by Expression 10.

[75]

$$DW_{ndop\_code(ndm\_BF),ndm\_BF}(m) = \qquad \text{(Expression 69)}$$
$$\psi_{ndop\_code(ndm\_BF),ndm\_BF}(m) +$$
$$TxCal_{ndop\_code(ndm\_BF),ndm\_BF} +$$
$$DIR_{ndop\_code(ndm\_BF),ndm\_BF}(\theta) -$$
$$\text{angle}[OC_{ndop\_code(ndm\_BF),ndm\_BF}(noc_{-BF})]$$

Here, the outputs of $noc_{-BF}$-th Doppler analyzer 210 are inputted to peak extractor 213, with transmission period Tr in which OC_INDEX is $noc_{-BF}$ being regarded as the transmission timing of the beam transmission antenna. The character "noc_BF" represents an index of a code element corresponding to a timing (transmission period) at which transmission is performed by the beam transmission antenna. Here, noc_BF is any value of noc=1, ... , Loc, which are indices of $N_{CM}$ (number of code multiplexing) code elements of orthogonal code sequences with code length Loc used in encoder 107.

In Expression 69, $TxCAL_{ndop\_code(ndm\_BF),\ ndm\_BF}$ is a phase correction factor for correcting a phase deviation (e.g., a phase difference caused by a difference between the line lengths or path lengths of antennas or power supply lines) between $N_{DOP\_CODE}(ndm_{-BF})$ transmission antennas of transmission antenna Tx #[1, ndm$_{\_BF}$], transmission antenna Tx #[2, ndm$_{\_BF}$], . . . , and transmission antenna Tx #[N$_{DOP\_CODE}$(ndm$_{\_BF}$), ndm$_{\_BF}$] for applying ndm$_{\_BF}$-th Doppler shift DOP$_{ndm\_BF}$.

Further, in Expression 69, the term "angle [OC$_{ndop\_code(ndm\_BF)}$(noc_BF)]" is a phase correction factor for forming a directivity weight by eliminating an influence of a phase rotation by code OC$_{ndop\_code(ndm\_BF)}$(noc_BF) applied by encoder 107 in transmission period Tr in which OC_INDEX is noc$_{\_BF}$ (in other words, the phase rotation by code OC$_{ndop\_code(ndm\_BF)}$(noc_BF) is used as the reference phase).

Further, in Expression 69, DIR$_{ndop\_code(ndm\_BF), ndm\_BF}(\theta)$ is a directivity weight factor for directing the directivity in a predetermined direction with respect to N$_{DOP\_CODE}$(ndm$_{\_BF}$) transmission antennas of transmission antenna Tx #[1, ndm$_{\_BF}$], transmission antenna Tx #[2, ndm$_{\_BF}$], . . . , and transmission antenna Tx #[N$_{DOP\_CODE}$(ndm$_{\_BF}$), ndm$_{\_BF}$] for applying ndm$_{\_BF}$-th Doppler shift DOP$_{ndm\_BF}$. In Expression 69, the directivity weight factor for directing the directivity in the azimuth direction of azimuth θ is given as an example, but the present disclosure is not limited thereto. A directivity weight factor for directing the directivity direction in elevation angle direction φ or for directing the directivity direction in the two dimensions including azimuth θ and elevation angle direction φ may also be used.

Directivity weight factor DIR$_{ndop\_code(ndm\_BF), ndm\_BF}(\theta)$ depends on the arrangement of N$_{DOP\_CODE}$(ndm$_{\_BF}$) transmission antennas of transmission antenna Tx #[1, ndm$_{\_BF}$], transmission antenna Tx #[2, ndm$_{\_BF}$], . . . , transmission antenna Tx #[N$_{DOP\_CODE}$(ndm$_{\_BF}$), ndm$_{\_BF}$] used as beam transmission antennas. For example, when N$_{DOP\_CODE}$(ndm$_{\_BF}$) transmission antennas 109 are linearly arranged at element intervals d$_{SA}$ and the transmission beam direction is directed in the direction of θ$_{TxBF}$, directivity weight applier 301 generates directivity weight factor DIR$_{ndop\_code(ndm\_BF), ndm\_BF}(\theta_{TxBF})$ as given by following Expression 70. Here, $_{ndop\_code(ndm\_BF)}$=1, . . . , N$_{DOP\_CODE}$(ndm$_{\_BF}$).

[76]

(Expression 70)

$$DIR_{1,ndm\_BF}(\theta_{TxBF}) = 0,$$

$$DIR_{2,ndm\_BF}(\theta_{TxBF}) = \frac{2\pi d_{SA}\sin\theta_{TxBF}}{\lambda},$$

$$DIR_{3,ndm\_BF}(\theta_{TxBF}) = \frac{4\pi d_{SA}\sin\theta_{TxBF}}{\lambda}, \ldots,$$

$$DIR_{N_{DOP\_CODE}(ndm\_BF),ndm\_BF}(\theta_{TxBF}) = \frac{2\pi d(N_{DOP\_CODE}(ndm\_BF)-1)d_{SA}\sin\theta_{TxBF}}{\lambda}$$

Here, λ denotes the wavelength of a radar transmission signal.

Note that, as given by following Expression 71, directivity weight applier 301 may output, without any operation, ndm-th coded Doppler phase rotation amount ψ$_{ndop\_code(ndm), ndm}$(m) for m-th transmission period Tr as given by Expression 10 that is inputted from encoder 107 and that is not used for a beam transmission antenna, for example.

[77]

$$DW_{ndop\_code(ndm),ndm}(m) = \psi_{ndop\_code(ndm),ndm}(m) \quad \text{(Expression 71)}$$

In each transmission period Tr, each of Nt phase rotators 108 applies, to a chirp signal inputted from radar transmission signal generator 101, DW$_{ndop\_code(ndm), ndm}$(m) inputted from directivity weight applier 301. The Nt outputs (e.g., referred to as coded Doppler multiplexed signals) of phase rotators 108 are radiated into space from Nt transmission antennas 109 (also referred to as "transmission array antenna section") after amplified to a defined transmission power.

Radar receiver 200 of radar apparatus 20 illustrated in FIG. 21 performs, for example, the same operation as that of Embodiment 1. Here, peak extractor 213 regards, as the transmission timing of the beam transmission antenna, transmission period Tr in which OC_INDEX is noc$_{\_BF}$, and thus outputs, to direction estimator 214, the outputs of noc$_{\_BF}$-th Doppler analyzer 210 for distance index f$_{b\_cfar}$ and Doppler frequency index f$_{s\_comp\_cfar}$ inputted from CFAR section 211. At this time, peak extractor 213 may use, for example, D$_{rmin}$ that is a Doppler aliasing judgement result inputted from coded Doppler demultiplexer 212.

As described above, directivity weight applier 301 included in phase rotation amount setter 105 allows radar apparatus 20 to form the directivity of the beam transmission antenna in a predetermined direction, so as to improve the directivity gain in the predetermined direction. Thus, for example, when the viewing angle of radar apparatus 20 is within about a 3-dB beam width of the beam transmission antenna, it is possible to extend the sensing range of radar apparatus 20.

Figure 22:
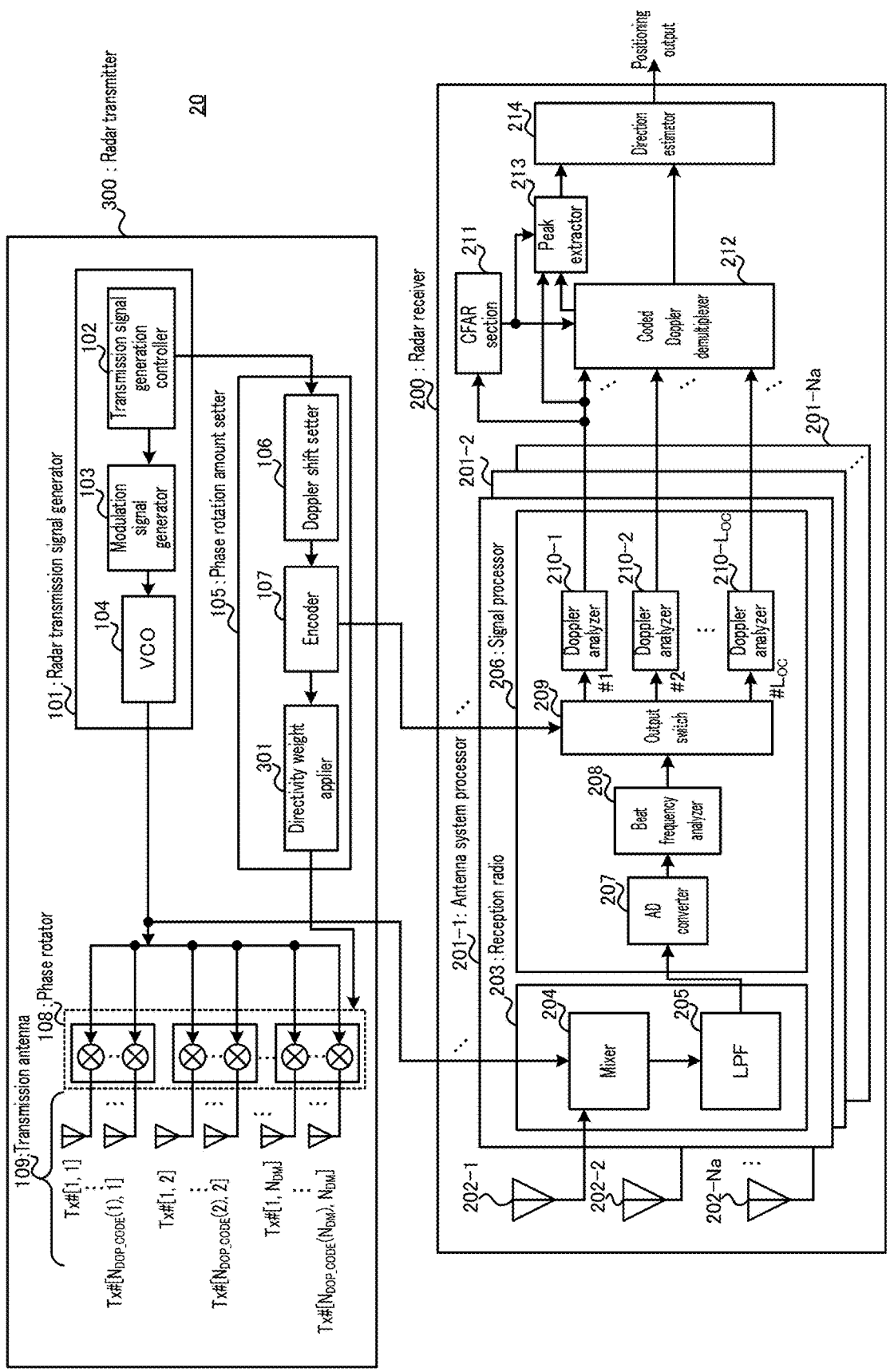
FIG. 22 is a block diagram illustrating another example configuration of the radar apparatus according to Embodiment 2.

Note that, when the viewing angle of radar apparatus 20 is within about a 3-dB beam width of the beam transmission antenna, it is possible to extend the sensing range of radar apparatus 20. Thus, the output of noc$_{\_BF}$ Doppler analyzer 210 may be used as the input to CFAR section 211. For example, FIG. 22 illustrates an example in which, when noc$_{\_BF}$=1 is used, the output of Doppler analyzer 210-1 is the input to CFAR section 211. Note that noc$_{\_BF}$ is not limited to 1.

In FIG. 22, CFAR section 211 calculates PowerFT(f$_b$, f$_s$) obtained by performing power addition of outputs VFT$_z^{noc\_BF}$(f$_b$, f$_s$) of noc$_{\_BF}$-th Doppler analyzer 210 as given by following Expression 72. Subsequently, processing the same as that in the reception processing of Embodiment 1 is performed.

[78]

$$PowerFT(f_b, f_s) = \sum_{z=1}^{Na}|VFT_z^{noc\_BF}(f_b, f_s)|^2 \quad \text{(Expression 72)}$$

As illustrated in FIG. 22, when the viewing angle of radar apparatus 20 is within about a 3-dB beam width of the beam transmission antenna, CFAR section 211 can perform CFAR processing using PowerFT(f$_b$, f$_s$) obtained by performing power addition of outputs VFT$_z^{noc\_BF}$(f$_b$, f$_s$) of noc$_{\_BF}$ Doppler analyzer 210. It is thus possible to improve the peak detection performance of CFAR section 211. For example, it is possible to improve the peak detection rate and to reduce the peak non-detection rate.

Further, for example, CFAR section 211 may perform power addition of outputs VFT$_z^{noc\_BF}$(f$_b$, f$_s$) of noc$_{\_BF}$-th Doppler analyzer 210, and it is thus possible to reduce the arithmetic processing amount of the power addition.

Note that, when a plurality of beam transmission antennas are present, the transmission timings (transmission periods) of a plurality of (e.g., all) beam transmission antennas may be the same timing. For example, the transmission timings of radar transmission signals may be the same between a plurality of beam transmission antennas (e.g., a first beam transmission antenna and a second beam transmission antenna) each constituted by adjacent transmission antennas 109. It is thus possible, for example, to perform CFAR detection based on the outputs of one Doppler analyzer 210 as illustrated in FIG. 22, to improve CFAR processing performance and to reduce the arithmetic processing amount of the power addition in CFAR section 211.

For example, when there are a plurality of (e.g., two) beam transmission antennas, directivity weight applier 301 further outputs phase rotation amounts $DW_{ndop\_code(ndm\_BF1), ndm\_BF1}(m)$ and $DW_{ndop\_code(ndm\_BF2), ndm\_BF2}(m)$ as given by following Expression 73 to phase rotators 108 with respect to $ndm_{BF1}$-th and $ndm_{BF2}$-th coded Doppler phase rotation amounts $\psi_{ndop\_code(ndm\_BF1), ndm\_BF1}(m)$ and $\psi_{ndop\_code(ndm\_BF2), ndm\_BF2}(m)$ among coded Doppler phase rotation amounts $\psi_{ndop\_code(ndm), ndm}(m)$ for m-th transmission period Tr inputted from encoder 107 and given by Expression 10. Here, a case where the outputs of $noc_{BF}$-th Doppler analyzer 210 are inputted to peak extractor 213, with transmission period Tr in which OC_INDEX is $noc_{BF}$ being regarded as the transmission timing of the two beam transmission antennas is illustrated.

[79]

$$DW_{ndop\_code(ndm\_BF1),ndm\_BF1}(m) = \quad \text{(Expression 73)}$$
$$\psi_{ndop\_code(ndm\_BF1),ndm\_BF1}(m) +$$
$$TxCAL_{ndop\_code(ndm\_BF1),ndm\_BF1} +$$
$$DIR_{ndop\_code(ndm\_BF1),ndm\_BF1}(\theta) -$$
$$\text{angle}[OC_{ndop\_code(ndm\_BF1),ndm\_BF1}(noc_{BF})]$$

$$DW_{ndop\_code(ndm\_BF2),ndm\_BF2}(m) =$$
$$\psi_{ndop\_code(ndm\_BF2),ndm\_BF2}(m) + TxCAL_{ndop\_code(ndm\_BF2),ndm\_BF2} +$$
$$DIR_{ndop\_code(ndm\_BF2),ndm\_BF2}(\theta) - \text{angle}[OC_{ndop\_code(ndm\_BF2),ndm\_BF2}(noc_{BF})]$$

Alternatively, when a plurality of beam transmission antennas are present, the transmission timings (transmission periods) of the plurality of (e.g., all) beam transmission antennas do not have to be the same. For example, the transmission timings may be different between a plurality of beam transmission antennas (e.g., a first beam transmission antenna and a second beam transmission antenna) each constituted by adjacent transmission antennas 109. In this case, the CFAR detection based on the outputs of one Doppler analyzer 210 (e.g., the configuration of FIG. 22) cannot be applied. However, since received power variations according to transmission periods are leveled, the dynamic range of A/D can be narrowed. It is thus possible to obtain an effect of reducibility of the number of AD quantization bits.

For example, when there are a plurality of (e.g., two) beam transmission antennas, directivity weight applier 301 further outputs phase rotation amounts $DW_{ndop\_code(ndm\_BF1), ndm\_BF1}(m)$ and $DW_{ndop\_code(ndm\_BF2), ndm\_BF2}(m)$ as given by following Expression 74 to phase rotators 108 with respect to $ndm_{BF1}$-th and $ndm_{BF2}$-th coded Doppler phase rotation amounts $\psi_{ndop\_code(ndm\_BF1), ndm\_BF1}(m)$ and $\psi_{ndop\_code(ndm\_BF2), ndm\_BF2}(m)$ among coded Doppler phase rotation amounts $\psi_{ndop\_code(ndm), ndm}(m)$ for m-th transmission period Tr inputted from encoder 107 and given by Expression 10. Here, a case is illustrated in which the outputs of $noc_{BF1}$-th Doppler analyzer 210 and $noc_{BF2}$-th Doppler analyzer 210 are inputted to peak extractor 213, with transmission period Tr in which OC_INDEX is $noc_{BF1}$ and transmission period Tr in which OC_INDEX is $noc_{BF2}$ being regarded as the transmission timings of the two beam transmission antennas. Here, each of $noc_{BF1}$ and $noc_{BF2}$ is any value of noc=1, ..., Loc, which are indices of $N_{CM}$ (number of code multiplexing) code elements of orthogonal code sequences with code length Loc used in encoder 107, and $noc_{BF1} \neq noc_{BF2}$ holds true.

[80]

$$DW_{ndop\_code(ndm\_BF2),ndm\_BF2}(m) = \quad \text{(Expression 74)}$$
$$\psi_{ndop\_code(ndm\_BF2),ndm\_BF2}(m) +$$
$$TxCAL_{ndop\_code(ndm\_BF2),ndm\_BF2} +$$
$$DIR_{ndop\_code(ndm\_BF2),ndm\_BF2}(\theta) -$$
$$\text{angle}\left[OC_{ndop\_code(ndm\_BF1),ndm\_BF1}(noc_{-BF1})\right]$$

$$DW_{ndop\_code(ndm\_BF2),ndm\_BF2}(m) = \psi_{ndop\_code(ndm\_BF2),ndm\_BF2}(m) +$$
$$TxCAL_{ndop\_code(ndm\_BF2),ndm\_BF2} + DIR_{ndop\_code(ndm\_BF2),ndm\_BF2}(\theta) -$$
$$\text{angle}[OC_{ndop\_code(ndm\_BF2),ndm\_BF2}(noc_{-BF1})]$$

In addition, when a plurality of beam transmission antennas are present, peak extractor 213 outputs, to direction estimator 214, at least one of the outputs of Doppler analyzers 210 for distance index $f_{b\_cfar}$ and Doppler frequency index $f_{s\_comp\_cfar}$ inputted from CFAR section 211. At this time, peak extractor 213 may use $D_{rmin}$ that is a Doppler aliasing judgement result inputted from coded Doppler demultiplexer 212.

Here, when a plurality of beam transmission antennas are present, and when the transmission periods serving as the plurality of (e.g., all) beam transmission antennas are to be the same, the outputs of $noc_{BF}$-th Doppler analyzer 210 are inputted to peak extractor 213, with transmission period Tr in which OC_INDEX is $noc_{BF}$ being regarded as the transmission timing of the beam transmission antennas, for example.

For example, when first ($noc_{BF}=1$) Doppler analyzer 210 is used, peak extractor 213 outputs

[81]

$$VFT_z^1\left(f_{b\_cfar}, f_{s\_comp\_cfar} + \frac{N_{code}F_R(D_{rmin}, ndm\_BF)}{N_{DM}}\right).$$

Here, $ndm_{BF}$ is any value of $1, \ldots, N_{DM}$, and a plurality of transmission antennas to which the $ndm_{BF}$-th Doppler multiplexed signal is assigned satisfy the condition of the adjacent arrangement.

On the other hand, when a plurality of beam transmission antennas are present and the transmission periods serving as the beam transmission antennas are not to be the same, the outputs from $noc_{BF1}$-th Doppler analyzer 210 and $noc_{BF2}$-th Doppler analyzer 210 are inputted to peak extractor 213, for example, with transmission periods Tr in which OC_INDEX is $noc_{BF1}$ and in which OC_INDEX is $noc_{BF2}$ being regarded as the transmission timings of the beam transmission antennas.

Note that the operation performed when a plurality of beam transmission antennas are present and the transmission timings of the beam transmission antennas are to be the same or not to be the same is not limited to the configuration according to the present embodiment (e.g., the configuration for controlling the directivity of the beam transmission antennas), but may also be applied, for example, to the configuration according to Embodiment 1 (e.g., the configuration in which the directivity control described above is not performed).

Figure 23:
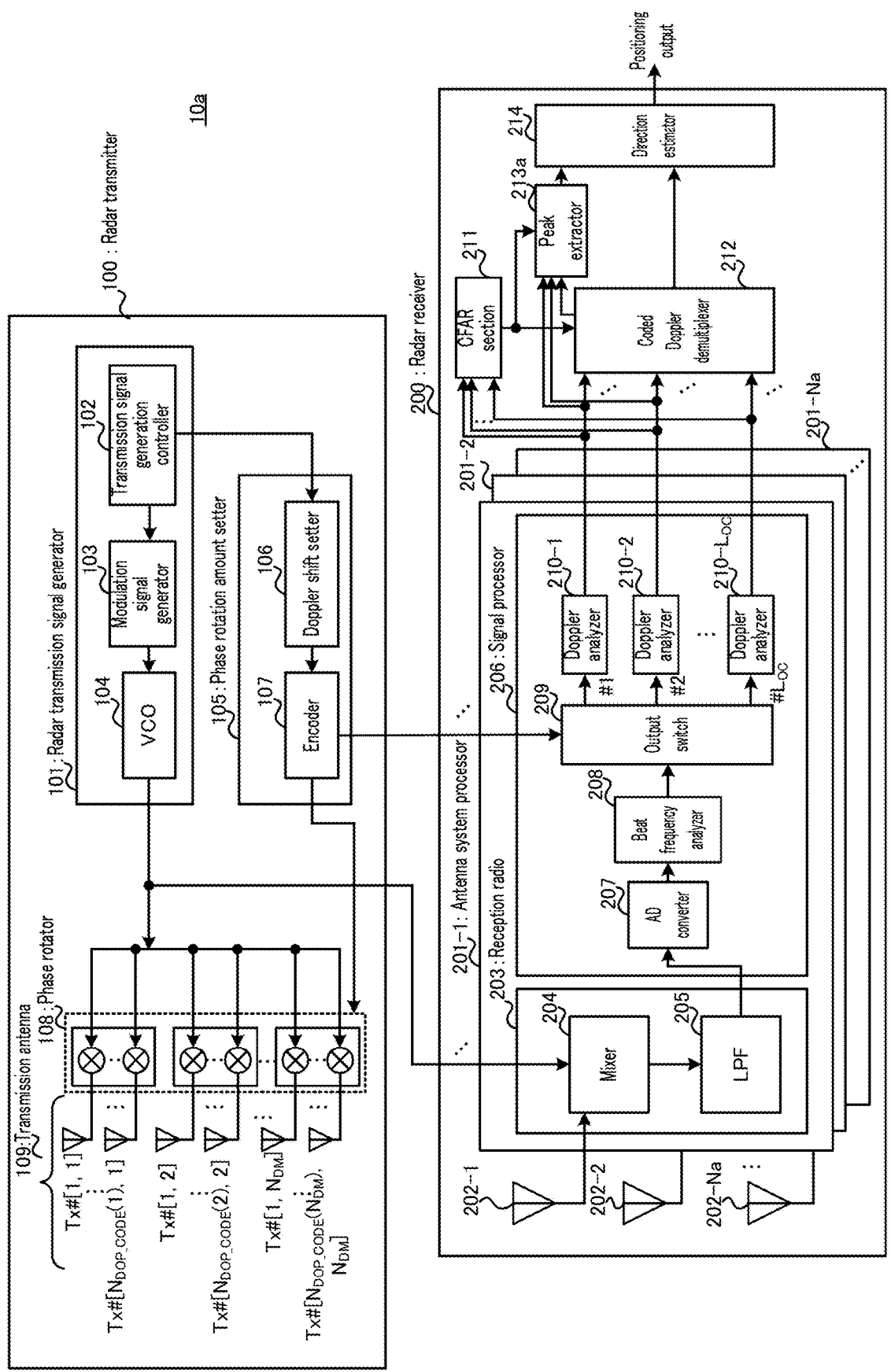
FIG. 23 is a block diagram illustrating another example configuration of the radar apparatus according to Embodiment 1.

For example, FIG. 23 is a block diagram illustrating a configuration example of radar apparatus 10a in which an operation performed in the case where the transmission periods serving as beam transmission antennas are not to be the same when a plurality of beam transmission antennas are present is adopted in Embodiment 1. In addition, FIG. 24 is a block diagram illustrating a configuration example of radar apparatus 20a in which an operation performed in the case where the transmission periods serving as beam transmission antennas are not to be the same when a plurality of beam transmission antennas are present is adopted in Embodiment 2.

Figure 24:
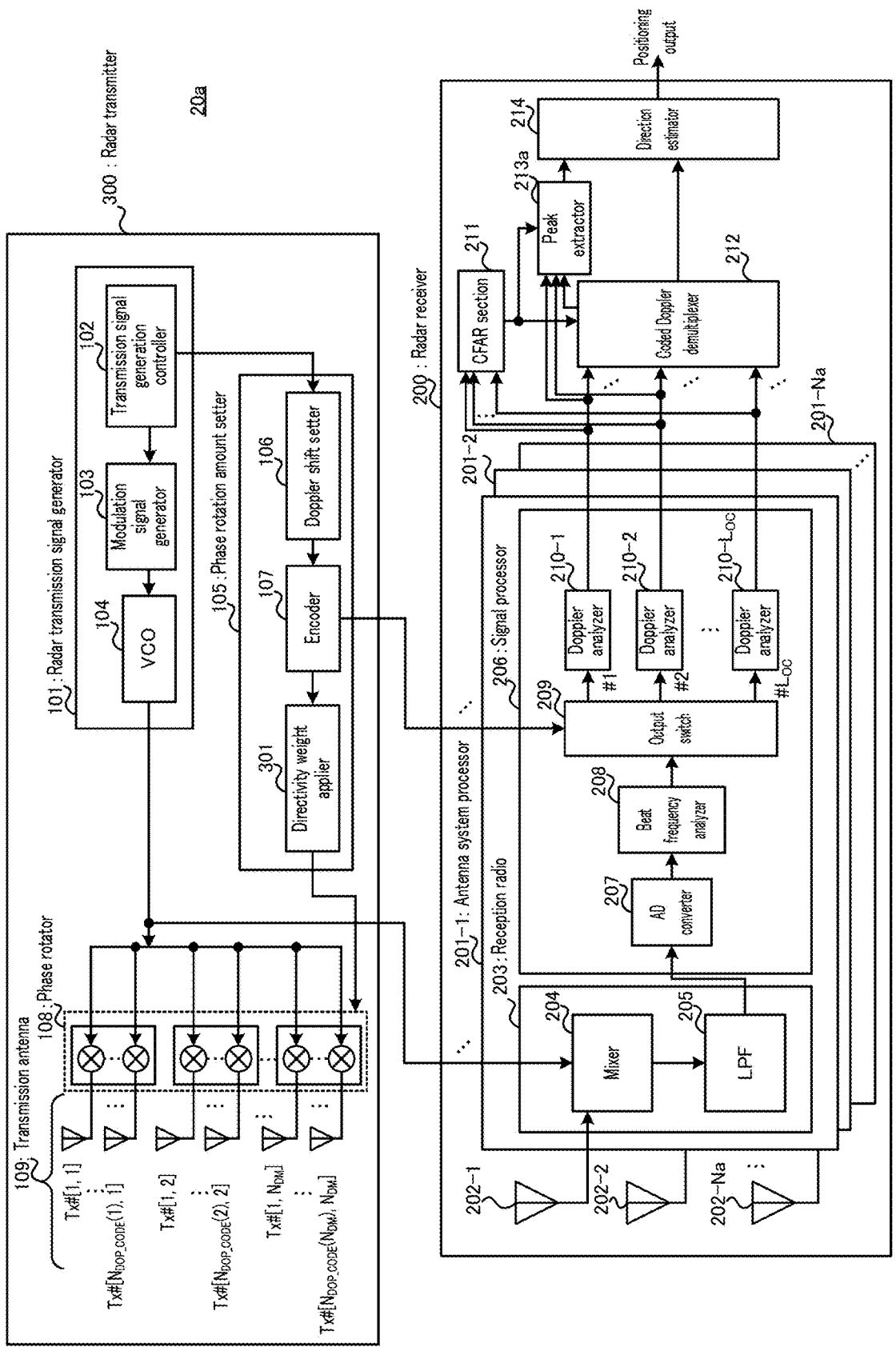
FIG. 24 is a block diagram illustrating still another example configuration of the radar apparatus according to Embodiment 2.

In FIGS. 23 and 24, for example, a case where $\text{ndm}_{\_BF1}$-th and $\text{ndm}_{\_BF2}$-th coded Doppler multiplexed signals among coded Doppler multiplexed signals are used as beam transmission antennas will be described. For example, when $\text{noc}_{\_BF1}$ corresponds to the transmission timing of $\text{ndm}_{\_BF1}$-th beam transmission antenna using first Doppler analyzer 210 and $\text{noc}_{\_BF2}$ corresponds to the transmission timing of $\text{ndm}_{\_BF2}$-th beam transmission antenna using second Doppler analyzer 210, peak extractor 213a outputs

[82]
$$VFT_z^1\left(f_{b\_cfar}, f_{s\_comp\_cfar} + \frac{N_{code}F_R(D_{rmin}, \text{ndm\_BF1})}{N_{DM}}\right), \text{ and}$$
$$VFT_z^2\left(f_{b\_cfar}, f_{s\_comp\_cfar} + \frac{N_{code}F_R(D_{rmin}, \text{ndm\_BF1})}{N_{DM}}\right)$$

to direction estimator 214.

Here, $\text{ndm}_{\_BF}$ is any value of $1, \ldots, N_{DM}$, and a plurality of transmission antennas to which the $\text{ndm}_{\_BF}$-th Doppler multiplexed signal is assigned satisfy the condition of the adjacent arrangement.

In the present embodiment, directivity weight applier 301 may fix the directivity of a beam transmission antenna in a defined direction for each of a plurality of measurements when forming the directivity in a predetermined direction, or may vary the directivity for each measurement. When the directivity is variably set for each measurement, the directivity can be varied for each measurement by using directivity weight factor $\text{DIR}_{ndop\_code(ndm\_BF),\ ndm\_BF}(\theta)$ in directivity weight applier 301 that provides a θ direction different for each measurement.

Antenna Arrangement Example 2-1

Hereinafter, an example of antenna arrangement in the case of non-uniformly setting the numbers of coded Doppler multiplexing. Further, an example of antenna arrangement in the case where a plurality of beam transmission antennas are used will be described.

For example, with reference to FIG. 25, a description will be given of a case where number Nt of transmission antennas used for multiplexing transmission is 5, number $N_{DM}$ of Doppler multiplexing is 3, $N_{CM}$ is 2, orthogonal code sequences $\text{Code}_1$ {1, 1} and $\text{Code}_2$ {1, −1} with code length Loc=2 are set, and numbers $N_{DOP\_CODE}(1)$, $N_{DOP\_CODE}(2)$, and $N_{DOP\_CODE}(3)$ of coded Doppler multiplexing are 2, 2, and 1, respectively, in radar apparatus 20. Note that number $N_{BF}$ of beam transmission antennas is set to 2, and $\text{ndm}_{\_BF1}=1$ and $\text{ndm}_{\_BF2}=2$ are used as indices of Doppler multiplexed signals used for the beam transmission antennas.

Figure 25:
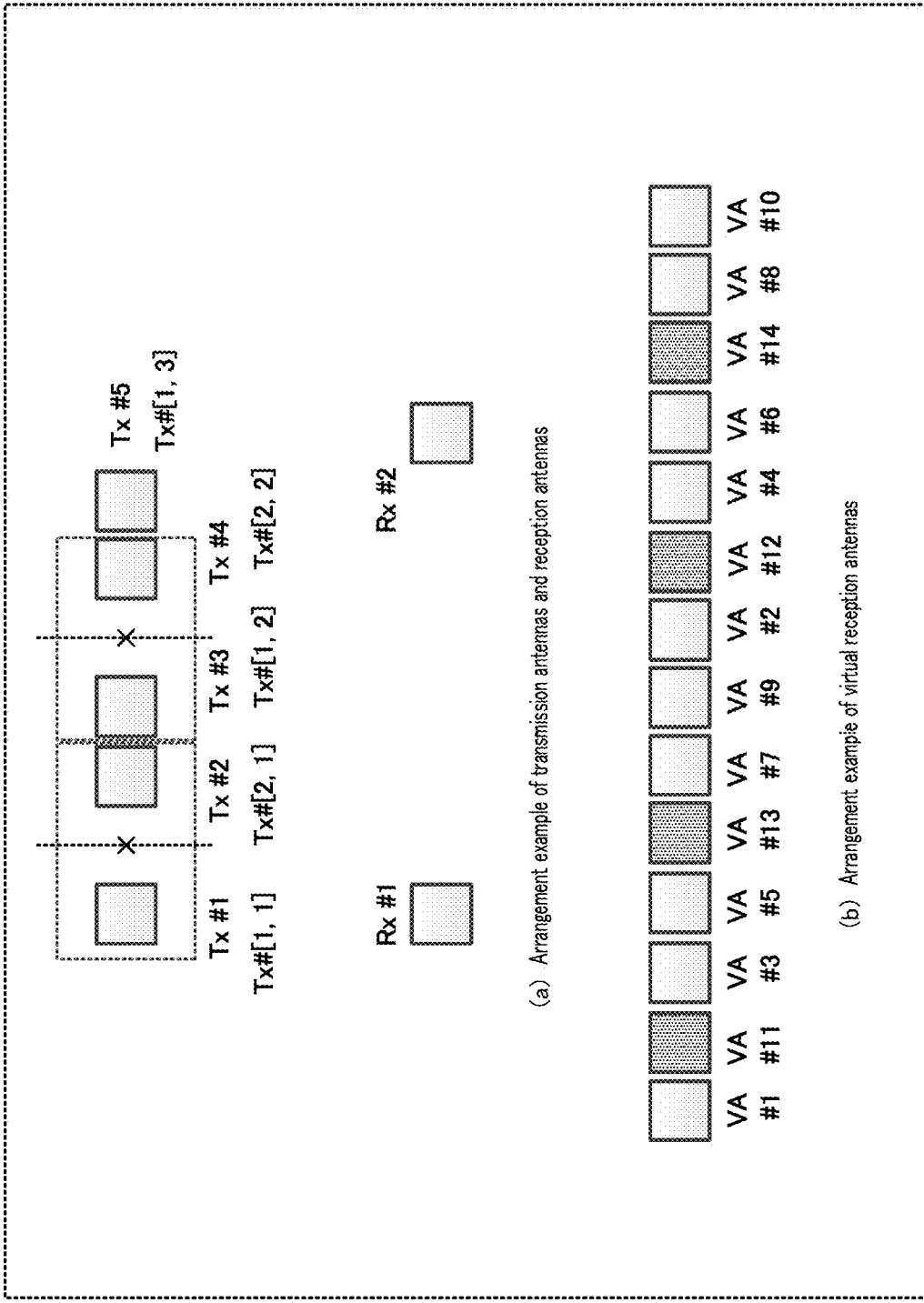
FIG. 25 illustrates an arrangement example of transmission antennas according to Embodiment 2.

In FIG. 25, for example, horizontally arranged five transmission antennas 109 (Tx #1 to Tx #5) are transmission antenna Tx #[1, 1], transmission antenna Tx #[2, 1], transmission antenna Tx #[1, 2], transmission antenna Tx #[2, 2], and transmission antenna Tx #[1, 3] from the left. In FIG. 25, two transmission antennas Tx #1 (Tx #[1, 1]) and Tx #2 (Tx #[2, 1]) (first sub-array antenna) transmit radar transmission signals using the same Doppler multiplexing (Doppler shift amount=$\text{DOP}_1$). Further, two adjacent transmission antennas Tx #3 (Tx #[1, 2]) and Tx #4 (Tx #[2, 2]) (second sub-array antenna) transmit radar transmission signals using the same Doppler multiplexing (Doppler shift amount=$\text{DOP}_2$). Thus, in FIG. 25, one beam transmission antenna is formed by Tx #1 and Tx #2, and one beam transmission antenna is formed by Tx #3 and Tx #4. In FIG. 25, number $N_{BF}$ of beam transmission antennas is 2. In the following, the beam transmission antenna based on Tx #1 and Tx #2 may also be referred to as "Tx #6," and the beam transmission antenna based on Tx #3 and Tx #4 may also be referred to as "Tx #7."

Further, in FIG. 25, number Na of reception antennas is two (e.g., Rx #1 and Rx #2). Note that, number Na of reception antennas is not limited to two, and may be three or more, for example.

For example, when a radar transmission signal is transmitted from adjacent Tx #1 (Tx #[1, 1]) and Tx #2 (Tx #[2, 1]), for example, at an equal power, the midpoint position between Tx #1 and Tx #2 serves as the phase center of beam transmission antenna Tx #6 (the cross mark illustrated at (a) in FIG. 25). In addition, when a radar transmission signal is transmitted from adjacent Tx #3 (Tx #[1, 2]) and Tx #4 (Tx #[2, 2]), for example, at an equal power, the midpoint position between Tx #3 and Tx #4 serves as the phase center of beam transmission antenna Tx #7 (the cross mark illustrated at (a) in FIG. 25). Note that, when the radar transmission signal is not transmitted at an equal power from transmission antennas 109 constituting the beam transmission antennas, transmission at each position that is dependent on the ratio of transmission powers of respective transmission antennas 109 constituting the beam transmission antenna (the position of the center of gravity of the transmission powers from the respective transmission antennas) and serves as the phase center of the sub-array can be treated as transmission by the beam transmission antenna.

Arrangement of VA #1 to VA #14 of virtual reception antennas (or MIMO virtual antennas) as illustrated at (b) in FIG. 25 is constituted by the arrangement of transmission antennas Tx #1 to Tx #5, beam transmission antennas Tx #6 and Tx #7, and reception antennas Rx #1 and Rx #2 as illustrated at (a) in FIG. 25. At (b) in FIG. 25, the virtual reception antenna arrangement obtained based on beam transmission antenna Tx #6 corresponds to VA #11 and VA #12, and the virtual reception antenna arrangement obtained based on beam transmission antenna Tx #7 corresponds to VA #13 and VA #14.

Here, the arrangement of the virtual reception antennas (the virtual reception array) may be expressed by Expression 53, for example, based on the positions of transmission antennas 109 constituting the transmission array antenna (e.g., the positions of feeding points) and the positions of reception antennas 202 constituting the reception array antenna (e.g., the positions of feeding points).

As illustrated at (b) in FIG. 25, since $(Nt+N_{BF})=7$ and Na=2, the virtual reception antenna arrangement using the beam transmission antennas is the equally spaced array arrangement of 14 elements. On the other hand, when no beam transmission antenna is used in the same antenna arrangement as (a) in FIG. 25 and in a case (not illustrated) where the equally spaced arrangement is formed in the same manner as at (b) in FIG. 25, the virtual reception antenna arrangement is an equally spaced array arrangement of 10 elements since number Nt of transmission antennas is 5 and number Na of reception antennas is 2.

As is understood, an increase in number $N_{DM}$ of Doppler multiplexing increases the number of beam transmission antennas to allow for a further increase in the number of virtual reception antennas. It is thus possible for the virtual reception antenna arrangement using the beam transmission antennas to further enlarge the aperture length and to improve the angular resolution. Further, by the virtual reception antennas densely arranged, it is possible to suppress the increase of the sidelobe, and to improve the angular resolution.

Note that, the example illustrated in FIG. 25 illustrates the case where number $N_{BF}$ of beam transmission antennas is two, but number $N_{BF}$ of beam transmission antennas is not limited two. For example, an increase in the number of transmission antennas 109 allows for setting of a larger number of beam transmission antennas, thus improving the angular resolution of radar apparatus 10 or suppressing the sidelobe level.

In addition, although FIG. 25 illustrates the case where a plurality of transmission antennas 109 and reception antennas 202 are arranged horizontally, the arrangement of transmission antennas 109 and reception antennas 202 is not limited thereto. For example, at least one transmission antennas 109 or reception antennas 202 may be arranged vertically, or may be arranged in a horizontal and vertical plane. Also in these cases, it is possible to achieve the same effect. Note that, the antennas illustrated in FIG. 25 may be a part of a plurality of antennas that radar apparatus 20 includes.

Antenna Arrangement Example 2-2

A two-dimensional antenna arrangement example using a sub-array will be described. In addition, an example of antenna arrangement in the case of uniformly setting the number of coded Doppler multiplexing will be described.

For example, with reference to FIG. 26, a description will be given of a case where number Nt of transmission antennas used for multiplexing transmission is 4, number $N_{DM}$ of Doppler multiplexing is 2, $N_{CM}$ is 2, orthogonal code sequences Code$_1$ {1, 1} and Code$_2$ {1, −1} with code length Loc=2 are set, and numbers $N_{DOP\_CODE}(1)$ and $N_{DOP\_CODE}(2)$ of coded Doppler multiplexing are 2 and 2 in radar apparatus 20. Note that number $N_{BF}$ of beam transmission antennas is set to 2, and ndm$_{\_BF1}$=1 and ndm$_{\_BF2}$=2 are used as indices of Doppler multiplexed signals used for the beam transmission antennas.

Figure 26:
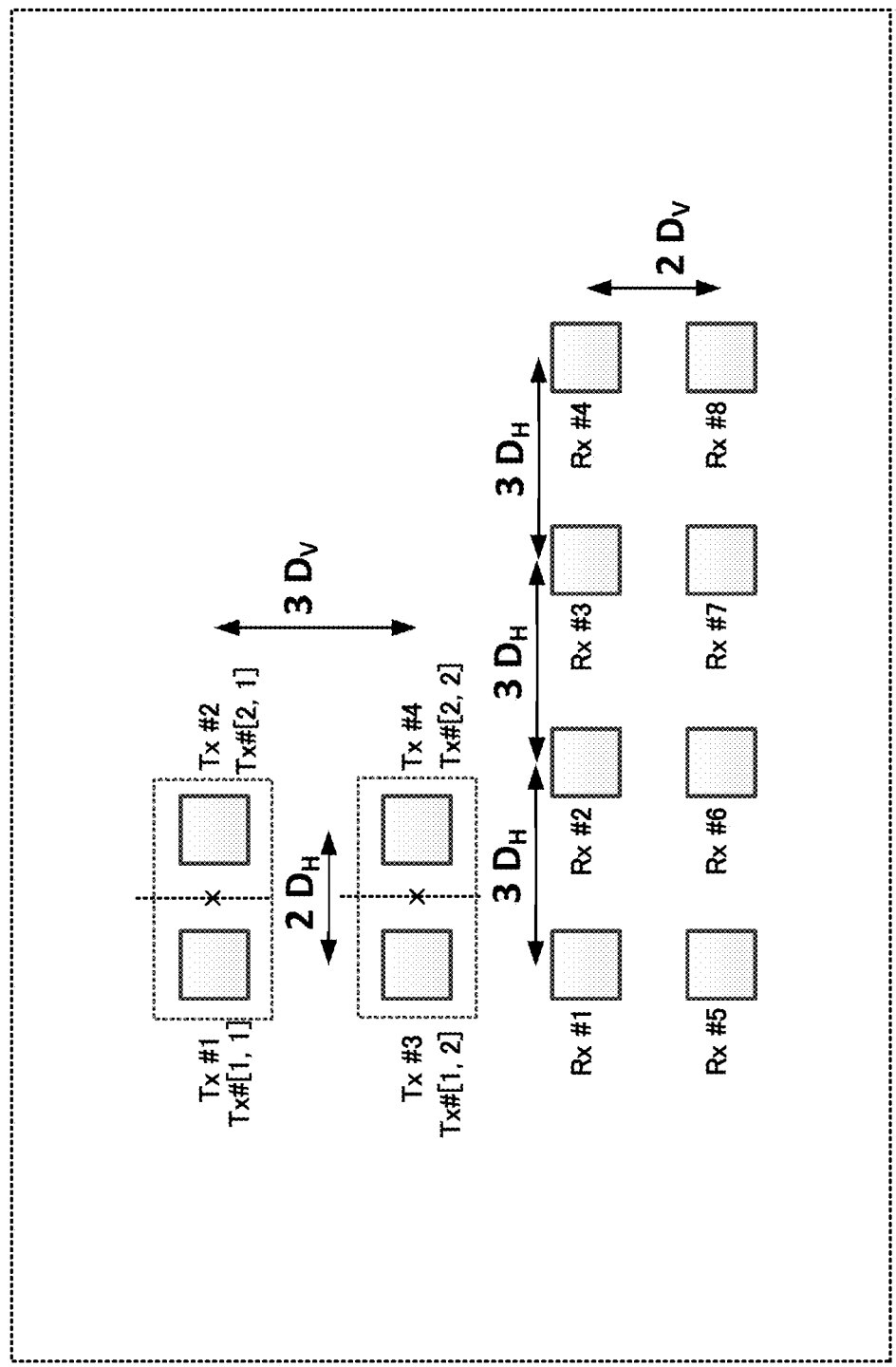
FIG. 26 illustrates an arrangement example of the transmission antennas according to Embodiment 2.

As illustrated in FIG. 26, a plurality of transmission antennas 109 and reception antennas 202 are arranged horizontally and vertically.

In FIG. 26, for example, transmission antennas 109 (Tx #1 and Tx #2) disposed in the vertically upper row are transmission antenna Tx #[1, 1] and transmission antenna Tx #[2, 1] from the left, and transmission antennas 109 (Tx #3 and Tx #4) disposed in the vertically lower row are transmission antenna Tx #[1, 2] and transmission antenna Tx #[2, 2] from the left.

In FIG. 26, two transmission antennas Tx #1 (Tx #[1, 1]) and Tx #2 (Tx #[2, 1]) (first sub-array antenna) transmit radar transmission signals using the same Doppler multiplexing (Doppler shift amount=DOP$_1$). Further, in FIG. 26, two adjacent transmission antennas Tx #3 (Tx #[1, 2]) and Tx #4 (Tx #[2, 2]) (second sub-array antenna) transmit radar transmission signals using the same Doppler multiplexing (Doppler shift amount=DOP$_2$). Thus, in FIG. 26, one beam transmission antenna is formed by Tx #1 and Tx #2, and one beam transmission antenna is formed by Tx #3 and Tx #4. In FIG. 26, number $N_{BF}$ of beam transmission antennas is 2. In the following, the beam transmission antenna based on Tx #1 and Tx #2 may also be referred to as "Tx #5," and the beam transmission antenna based on Tx #3 and Tx #4 may also be referred to as "Tx #6."

Further, in FIG. 26, number Na of reception antennas is eight (e.g., Rx #1 to #8). Note that, number Na of reception antennas is not limited to eight, and any number of reception antennas may be present.

For example, when a radar transmission signal is transmitted from horizontally adjacent Tx #1 (Tx #[1, 1]) and Tx #2 (Tx #[2, 1]), for example, at an equal power, the midpoint position between Tx #1 and Tx #2 serves as the phase center of beam transmission antenna Tx #5 (the cross mark illustrated at (a) in FIG. 26). In addition, when a radar transmission signal is transmitted from horizontally adjacent Tx #3 (Tx #[1, 2]) and Tx #4 (Tx #[2, 2]), for example, at an equal power, the midpoint position between Tx #3 and Tx #4 serves as the phase center of beam transmission antenna Tx #6 (the cross mark illustrated at (a) in FIG. 26). Note that, when the radar transmission signal is not transmitted at an equal power from transmission antennas 109 constituting the beam transmission antennas, transmission at a position dependent on the ratio of transmission powers of respective transmission antennas 109 constituting the beam transmission antenna (the position of the center of gravity of the transmission powers from the respective transmission antennas) that serves as the phase center of the sub-array can be treated as transmission by the beam transmission antenna.

Figure 27:
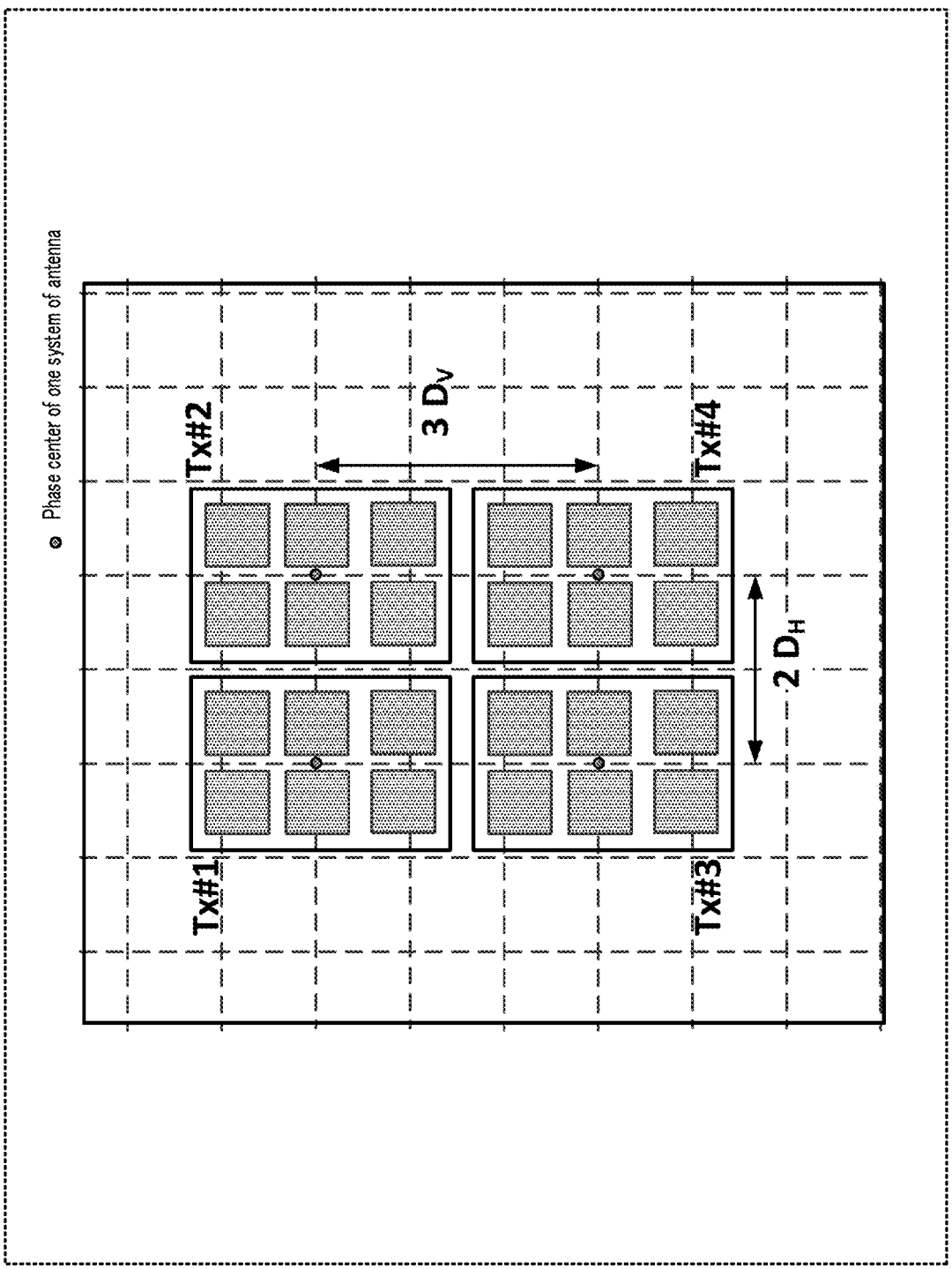
FIG. 27 illustrates an example of transmission antennas of a sub-array configuration.

Further, an antenna having a sub-array configuration as illustrated, for example, in FIG. 27 may be used for transmission antenna 109. By using the antenna having the sub-array configuration, it is possible to improve the directivity gain of the antenna to improve the sensing performance (e.g., sensing range) of radar apparatus 20. For example, in the example illustrated in FIG. 27, each of four transmission antennas 109 (Tx #1 to Tx #4) has the sub-array configuration with six elements of three vertically-arranged planar patch antennas and two horizontally-arranged planar patch antennas. Note that the sub-array configuration is not limited to the configuration illustrated in FIG. 27.

Figure 28:
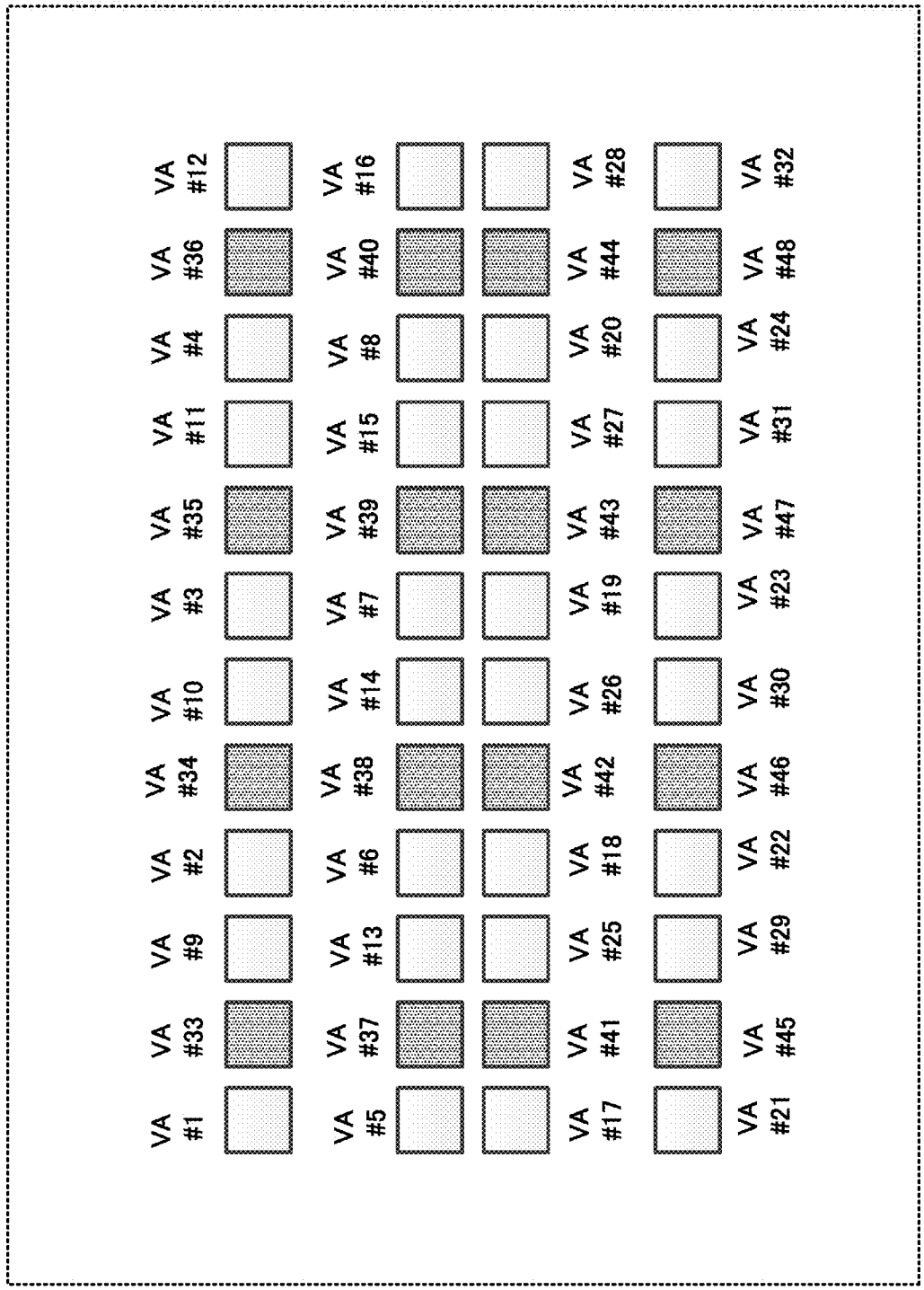
FIG. 28 illustrates an arrangement example of virtual reception antennas according to Embodiment 2.

Arrangement of VA #1 to VA #48 of virtual reception antennas (or MIMO virtual antennas) as illustrated in FIG. 28 is constituted by the arrangement of transmission antennas Tx #1 to Tx #4, beam transmission antennas Tx #5 and Tx #6, and reception antennas Rx #1 to Rx #8 as illustrated in FIG. 26. In FIG. 28, the virtual reception antenna arrangement obtained based on beam transmission antenna Tx #5 corresponds to VA #33 to VA #40, and the virtual reception antenna arrangement obtained based on beam transmission antenna Tx #6 corresponds to VA #41 to VA #48.

Here, the arrangement of the virtual reception antennas (the virtual reception array) may be expressed by Expression 53, for example, based on the positions of transmission antennas 109 constituting the transmission array antenna (e.g., the positions of feeding points) and the positions of reception antennas 202 constituting the reception array antenna (e.g., the positions of feeding points).

Figure 29:
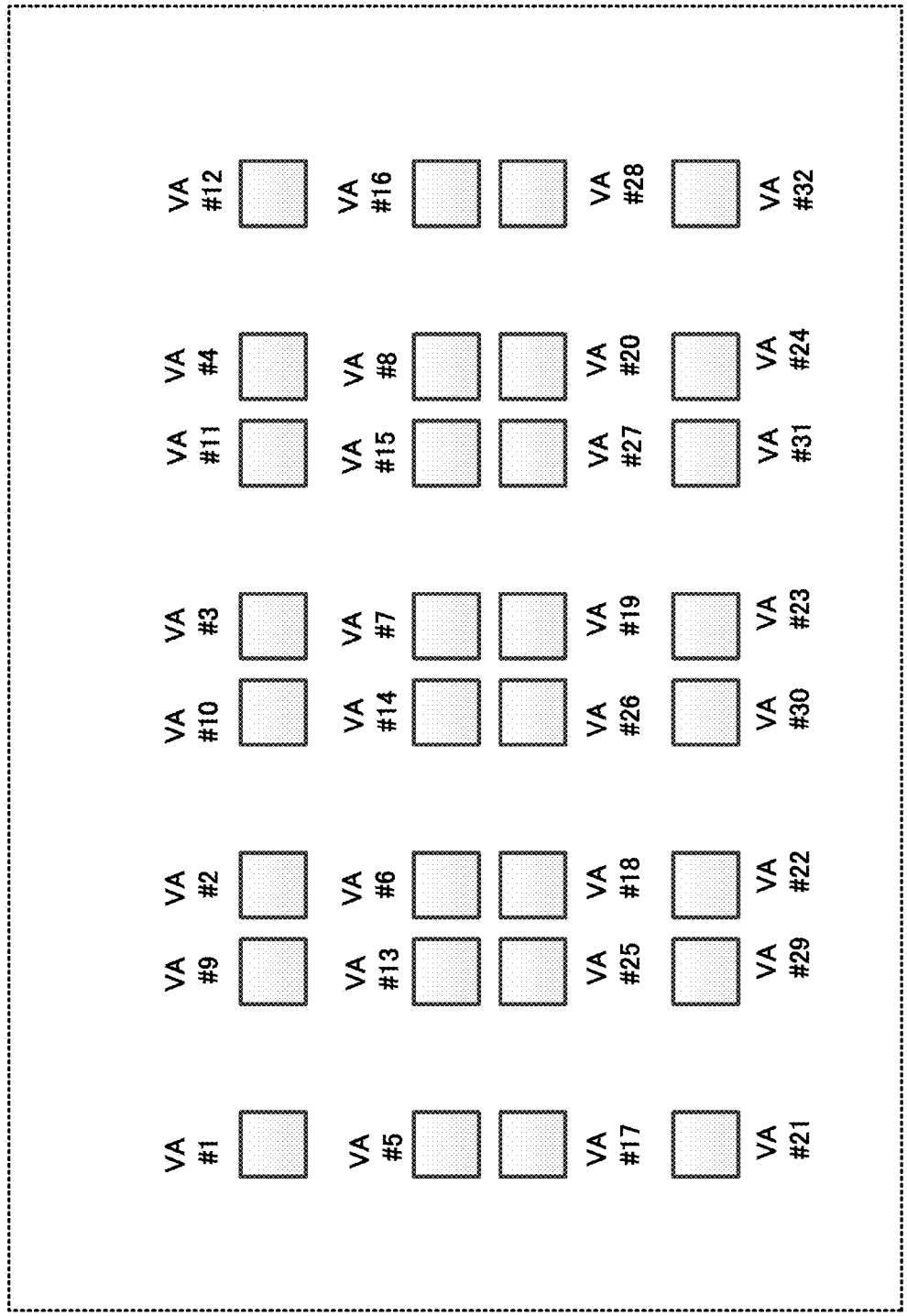
FIG. 29 illustrates an arrangement example of the virtual reception antennas.

As illustrated FIG. 28, since $(Nt+N_{BF})=6$ and Na=8, the virtual reception antenna arrangement using the beam transmission antennas is the equally spaced array arrangement of 48 elements. On the other hand, the virtual reception antenna arrangement in a case where no beam transmission antenna is used in the same antenna arrangement as FIG. 26 is the array arrangement of 32 elements since number Nt of transmission antennas is 4 and number Na of reception antennas is 8, for example, as illustrated in FIG. 29.

As is understood, an increase in number $N_{DM}$ of Doppler multiplexing increases the number of beam transmission antennas to allow for a further increase in the number of virtual reception antennas. It is thus possible for the virtual reception antenna arrangement using the beam transmission antennas to further enlarge the aperture length and to improve the angular resolution. Further, by the virtual reception antennas densely arranged, it is possible to suppress the increase of the sidelobe, and to improve the angular resolution.

Note that, the example illustrated in FIG. 26 illustrates the case where number $N_{BF}$ of beam transmission antennas is two, but number $N_{BF}$ of beam transmission antennas is not limited two. For example, an increase in the number of transmission antennas 109 allows for setting of a larger number of beam transmission antennas, thus improving the angular resolution of radar apparatus 10 or suppressing the sidelobe level.

The antenna arrangement example has been described above.

Figure 30:
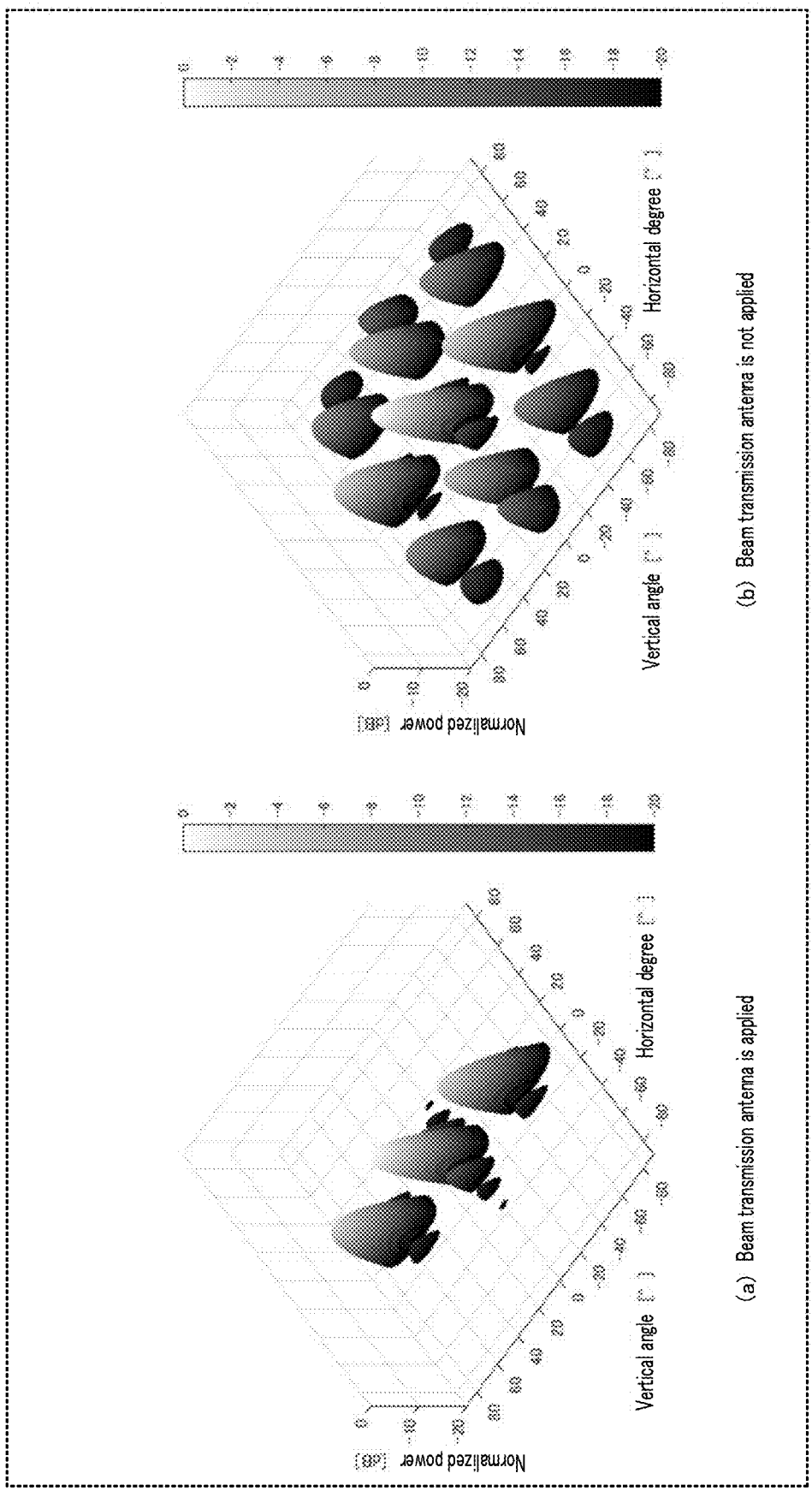
FIG. 30 illustrates one example of a direction estimation result

Parts (a) and (b) in FIG. 30 illustrate examples of direction estimation results (computer simulation results) obtained using the beamformer method for the direction-of-arrival estimation algorithm of direction estimator 214.

Parts (a) and (b) in FIG. 30 illustrate plotted outputs of a direction-of-arrival estimation evaluation function value. The outputs were obtained within the range of ±90 degrees in the horizontal direction and within the range of ±90 degrees in the vertical direction on the assumption that the target true value is horizontal 0 degrees and vertical 0 degrees. Note that, calculation was performed assuming the directivity of each antenna is omni-directivity.

For example, part (a) in FIG. 30 illustrates an example of the direction estimation result obtained by using the 48-element virtual reception antenna arrangement (where $D_H=0.5\lambda$ and $D_V=0.5\lambda$) using the beam transmission antennas illustrated in FIG. 28. In addition, for comparison with (a) in FIG. 30, (b) in FIG. 30 illustrates an example of the direction estimation result obtained by using the 32-element virtual reception antenna arrangement (where $D_H=0.5\lambda$ and $D_V$ is 0.5λ) constituted by number Nt=4 of transmission antennas and number Na=8 of reception antennas illustrated in FIG. 29.

Part (b) in FIG. 30 illustrates that sidelobes were generated horizontally and vertically in other directions than the direction of the horizontal 0 degrees and vertical 0 degrees of the target true value. For example, (b) in FIG. 30 illustrates that more sidelobes were generated horizontally. In contrast, with reference to (a) in FIG. 30 as compared with (b) in FIG. 30, it can be confirmed that the peak levels of the sidelobes (e.g., horizontal sidelobes) in the other directions than the direction of the horizontal 0 degrees and vertical 0 degrees of the target true value were reduced. For example, the ratio (peak to sidelobe ratio (PSLR)) of the peak power value of the highest horizontal sidelobe to the peak power value of the main lobe in the direction of the horizontal 0 degrees and vertical 0 degrees was about −13 dB in the case of (a) in FIG. 30, whereas the PSLR of the horizontal sidelobe was about −5 dB in the case of (b) in FIG. 30. The highest horizontal sidelobe is the highest except for the main lobe among the sidelobes in the other directions than the direction of the horizontal 0 degrees and vertical 0 degrees. Therefore, it can be confirmed that a PSLR reduction effect is higher in the case of (a) in FIG. 30 than in the case of (b) in FIG. 30.

As is understood, even when an element size in a MIMO array arrangement illustrated in FIG. 26 (or FIG. 27) is about 1λ, the use of the beam transmission antenna makes it possible to obtain a reduction effect of reducing a horizontal grating lobe or sidelobe in the virtual reception antenna. Note that, the antennas illustrated in FIGS. 26 and 27 may be part of a plurality of antennas that radar apparatus 20 includes.

The embodiments of the present disclosure have been described above.

Other Embodiments (1) The above-described embodiments have been described in relation to the operation in which Doppler shift setter 106 sets phase rotation amount $\varphi_{ndm}$ for applying Doppler shift amount $DOP_{ndm}$ for each of transmission periods (e.g., Loc×Tr transmission periods) corresponding to code length Loc of orthogonal code sequences, for example, and outputs phase rotation amount $\varphi_{ndm}$ to encoder 107. For example, Doppler shift setter 106 may set Doppler shift amounts $DOP_1, DOP_2, \ldots,$ and $DOP_{N\_DM}$ variably for respective code elements of the orthogonal code sequences with code length Loc used for code multiplexing. In other words, the phase rotation amounts for applying Doppler shift amounts $DOP_1, DOP_2, \ldots,$ and $DOP_{N\_DM}$ may be set variably for respective code elements of the orthogonal code sequences with code length Loc used for code multiplexing.

For example, Doppler shift setter 106 may assign different phase rotation amount $\varphi_{ndm}(noc)$ for each of transmission periods (Loc×Tr transmission periods) for the code element. Here, noc denotes the index of a code element, and noc=1, . . . , Loc. In other words, in the m-th transmission period, phase rotation amount $\varphi_{ndm}(OC\_INDEX)$ may be applied variably depending on OC_INDEX=mod(m−1, Loc)+1. Here OC_INDEX=1, . . . , Loc. For example, phase rotation amount $\varphi_{ndm}(noc)$ corresponding to the same Doppler shift amount $DOP_{ndm}$ differs for each transmission period corresponding to the code element of the orthogonal code sequences. Here, ndm=1, . . . , $N_{DM}$. In other words, for example, Doppler shift amounts $DOP_1, DOP_2, \ldots,$ and $DOP_{N\_DM}$ differ between Tx #[1, 1] and Tx #[2, 1] illustrated in FIG. 12 for respective code elements of the orthogonal code sequences.

For example, Doppler shift setter 106 may set Doppler shift amounts $DOP_1, DOP_2, \ldots,$ and $DOP_{N\_DM}$ differently for respective code elements of the orthogonal code sequences even when the pair of adjacent transmission antennas as illustrated in FIG. 12 is not associated with combinations of the same Doppler shift amount.

When phase rotators 108 set, as the same phase rotation amount (the same Doppler shift amount) for a pair of adjacent transmission antennas 109, the Doppler shift amount set by Doppler shift setter 106, encoder 107 may set the same number of coded Doppler multiplexing or may set different numbers of coded Doppler multiplexing.

Examples of a method of variably setting the phase rotation amounts for applying Doppler shift amounts $DOP_1$, $DOP_2, \ldots,$ and $DOP_{N\_DM}$ for respective code elements of the orthogonal codes with code length Loc used for code multiplexing include the following three methods.

<Phase Rotation Amount Varying Method 1>

Doppler shift setter 106 may set phase rotation amounts variably for the phase rotation amounts for applying Doppler shift amounts $DOP_1, DOP_2, \ldots,$ and $DOP_{N\_DM}$, for example, based on the equal-interval Doppler shift amount setting of intervals narrower than the intervals of the maximum equal-interval Doppler shift amount setting and based on the maximum equal-interval Doppler shift amount setting. In other words, Doppler shift amounts $DOP_1, DOP_2, \ldots,$ and $DOP_{N\_DM}$ may be variably set for respective code elements of the orthogonal code sequences.

For example, when number $N_{CM}=2$ of code multiplexing is used (in the case of code length Loc=2), Doppler shift setter 106 may variably set the phase rotation amounts for applying Doppler shift amounts $DOP_1, DOP_2, \ldots,$ and $DOP_{N\_DM}$ based on the equal-interval Doppler shift amount setting (e.g., Expression 6) of intervals narrower than the intervals of the maximum equal-interval Doppler shift amount setting in the case of noc=1 (or in a transmission period in which OC_INDEX=1), or based on the maximum equal-interval Doppler shift amount setting (e.g., Expression 5) in the case of noc=2 (or in a transmission period in which OC_INDEX=2). In other words, Doppler shift amounts $DOP_1, DOP_2, \ldots,$ and $DOP_{N\_DM}$ may be set variably for respective code elements of the orthogonal code sequences. In this instance, phase rotation amount $\varphi_{ndm}(noc)$ of the code element for each of the transmission periods (Loc×Tr transmission periods) is expressed by, for example, following Expressions 75 and 76:

[83]
$$\phi_{ndm}(1) = \frac{2\pi(ndm - 1)}{N_{DM} + N_{int}}; \quad \text{(Expression 75)}$$

[84]
$$\phi_{ndm}(2) = \frac{2\pi(ndm - 1)}{N_{DM}}. \quad \text{(Expression 76)}$$

<Phase Rotation Amount Varying Method 2>

Doppler shift setter 106 may use phase rotation amounts with variably set $N_{int}$ for the phase rotation amounts for applying Doppler shift amounts $DOP_1, DOP_2, \ldots,$ and $DOP_{N\_DM}$, for example, when being based on the equal-interval Doppler shift amount setting of intervals narrower than the intervals of the maximum equal-interval Doppler shift amount setting. In other words, Doppler shift amounts $DOP_1, DOP_2, \ldots,$ and $DOP_{N\_DM}$ may be variably set for respective code elements of the orthogonal code sequences.

For example, when number $N_{CM}=2$ of code multiplexing is used (in the case of code length Loc=2), Doppler shift setter 106 may variably set the phase rotation amounts for applying Doppler shift amounts $DOP_1, DOP_2, \ldots,$ and $DOP_{N\_DM}$ based on $N_{int}=1$ in the equal-interval Doppler shift amount setting (e.g., Expression 6) in the case of noc=1 (or in a transmission period in which OC_INDEX=1), or based on $N_{int}=2$ in the equal-interval Doppler shift amount setting (e.g., Expression 6) in the case of noc=2 (or in a transmission period in which OC_INDEX=2). In other words, Doppler shift amounts $DOP_1, DOP_2, \ldots,$ and $DOP_{N\_DM}$ may be variably set for respective code elements of the orthogonal code sequences. In this instance, phase rotation amount $\varphi_{ndm}(noc)$ of the code element for each of the transmission periods (Loc×Tr transmission periods) is expressed by, for example, following Expressions 77 and 78:

[85]
$$\phi_{ndm}(1) = \frac{2\pi(ndm - 1)}{N_{DM} + 1}; \quad \text{(Expression 77)}$$

[86]
$$\phi_{ndm}(2) = \frac{2\pi(ndm - 1)}{N_{DM} + 2}. \quad \text{(Expression 78)}$$

<Phase Rotation Amount Varying Method 3>

Doppler shift setter 106 may variably set indices of the phase rotation amounts for applying Doppler shift amounts $DOP_1, DOP_2, \ldots,$ and $DOP_{N\_DM}$, for example, when being based on the equal-interval Doppler shift amount setting of intervals narrower than the intervals of the maximum equal-interval Doppler shift amount setting. In other words, Doppler shift amounts $DOP_1, DOP_2, \ldots,$ and $DOP_{N\_DM}$ may be variably set for respective code elements of the orthogonal code sequences.

For example, when number $N_{CM}=2$ of code multiplexing is used (in the case of code length Loc=2), phase rotation amount $\varphi_{ndm}(noc)$ for the code element for each of the transmission periods (Loc×Tr transmission periods) is expressed by following Expressions 79 and 80. Here, noc=1, ..., Loc.

[87]
$$\phi_{ndm}(1) = \frac{2\pi(ndm - 1)}{N_{DM} + N_{int}} \quad \text{(Expression 79)}$$

[88]
$$\phi_{ndm}(2) = \frac{2\pi(ndm)}{N_{DM} + N_{int}} \quad \text{(Expression 80)}$$

In the case of using Expressions 79 and 80, an index setting for the Doppler shift amount for the transmission period in which a first code element is transmitted is an index setting with an index (ndm) shifted by one index as compared with an index setting for the Doppler shift amount for the transmission period in which a second code element is transmitted.

Note that, a method of index shifting is not limited to the above, and other methods for shifting may also be used. For example, when the method of index shifting is known in advance, separation processing can be performed by coded Doppler demultiplexer 212 of radar receiver 200.

The example of the method of variably setting the phase rotation amounts (in other words, the method of variably setting the Doppler shift amounts) has been described above.

Hereinbelow, by way of example, a description will be given of a different part of the operation different between the present embodiment and Embodiment 1 regarding the operation performed in the case where the phase rotation amounts for applying Doppler shift amounts $DOP_1, DOP_2, \ldots,$ and $DOP_{N\_DM}$ are set variably for respective code elements of the orthogonal code sequences with code length Loc used for code multiplexing (in other words, in the case where Doppler shift amounts $DOP_1, DOP_2, \ldots,$ and $DOP_{N\_DM}$ are set variably for respective code elements of the orthogonal code sequences), e.g., in the case where phase rotation amounts $\varphi_{ndm}(noc)$ corresponding respectively to the code elements and being different from one another for each of the transmission periods (Loc×Tr transmission periods) are applied.

Note that, in the following, application of phase rotation amounts $\varphi_{ndm}(noc)$ is denoted by $N_{int}(noc)$. For example, Expressions 75 and 76 in phase rotation amount varying method 1 are expressed as following Expressions 81 and 82:

[89]

$$\phi_{ndm}(1) = \frac{2\pi(ndm-1)}{N_{DM} + N_{int}(1)}, N_{int}(1) = 1; \quad \text{(Expression 81)}$$

[90]

$$\phi_{ndm}(2) = \frac{2\pi(ndm-1)}{N_{DM} + N_{int}(2)}, N_{int}(2) = 0. \quad \text{(Expression 82)}$$

For example, with respect to the phase rotation amounts for applying $N_{DM}$ Doppler shift amounts inputted from Doppler shift setter 106, encoder 107 sets the phase rotation amounts based on the orthogonal code sequences. For example, with respect to phase rotation amount $\varphi_{ndm}$ (OC_INDEX) for applying ndm-th Doppler shift amount DOP$_{ndm}$, encoder 107 may set coded Doppler phase rotation amount $\psi_{ndop\_code(ndm), ndm}(m)$ for m-th transmission period Tr that is given not by Expression 10 but by following Expression 83, and may output coded Doppler phase rotation amount $\psi_{ndop\_code(ndm), ndm}(m)$ to phase rotator 108. Here, ndop_code(ndm)=1, . . . , $N_{DOP\_CODE}$(ndm) and ndm=1, . . . , $N_{DM}$.

$$\Psi_{ndop\_code(ndm),ndm}(m) = \text{floor}\left[\frac{m-1}{Loc}\right] \times \phi_{ndm}(\text{OC\_INDEX}) + \\ \text{angle}[OC_{ndop\_code(ndm)}(\text{OC\_INDEX})] \quad \text{(Expression 83)}$$

Subsequent operations of radar transmitter 100 are the same as those of Embodiment 1.

Next, a difference in the operation of radar receiver 200 between the present embodiment and Embodiment 1 will be described.

Since the equal-interval Doppler shift amount setting of intervals narrower than the intervals of the maximum equal-interval Doppler shift amount setting is applied in all of phase rotation amount varying methods 1 to 3, CFAR section 211 may perform the following processing.

For example, when phase rotation amount varying method 1 is used, CFAR section 211 performs power addition of some of outputs $\text{VFT}_z^{noc}(f_b, f_s)$ of Doppler analyzers 210 of first to Na-th signal processors 206 based on noc (or transmission period in which OC_INDEX=noc) corresponding to the setting of the phase rotation amount based on the equal-interval Doppler shift amount setting of intervals narrower than the intervals of the maximum equal-interval Doppler shift amount setting. For example, CFAR section 211 may perform power addition using outputs $\text{VFT}_z^{noc}(f_b, f_s)$ of Doppler analyzer 210 equal to noc (or the transmission period in which OC_INDEX=noc) corresponding to the setting of the phase rotation amount based on the equal-interval Doppler shift amount setting of intervals narrower than the intervals of the maximum equal-interval Doppler shift amount setting.

For example, in the case of number $N_{CM}$ of code multiplexing is 2, CFAR section 211 may perform power addition of outputs $\text{VFT}_z^1(f_b, f_s)$ of Doppler analyzers 210 of first to Na-th signal processors 206 as given by following Expression 84 instead of by Expression 38 when Expression 6 is used as the equal-interval Doppler shift amount setting of intervals narrower than the intervals of the maximum equal-interval Doppler shift amount setting in the case of noc=1 (or the transmission period in which OC_INDEX=1), or when Expression 5 is used as the maximum equal-interval Doppler shift amount setting in the case of noc=2 (or the transmission period in which OC_INDEX=2):

[92]

$$PowerFT(f_b, f_s) = \sum_{z=1}^{N_a} \left|VFT_z^1(f_b, f_s)\right|^2. \quad \text{(Expression 84)}$$

In addition, CFAR section 211 may perform two-dimensional CFAR processing in two dimensions formed by a distance axis and a Doppler frequency axis (corresponding to relative velocity), or CFAR processing using one-dimensional CFAR processing in combination, for example, based on a power addition value.

Further, for example, when phase rotation amount varying method 2 is used, CFAR section 211 performs the power addition of some of outputs $\text{VFT}_z^{noc}(f_b, f_s)$ of Doppler analyzers 210 of first to Na-th signal processors 206 using one noc (or the transmission period in which OC_INDEX=noc). For example, when Expression 6 is used, CFAR section 211 may perform the power addition using noc (or the transmission period in which OC_INDEX=noc) corresponding to the phase rotation amount setting with minimum $N_{int}$. For example, when Expression 6 is used, CFAR section 211 may perform the power addition using outputs $\text{VFT}_z^{noc}(f_b, f_s)$ of Doppler analyzer 210 with noc that is equal to noc corresponding to the phase rotation amount setting with minimum $N_{int}$ (or the transmission period in which OC_INDEX=noc).

For example, when noc=1 (or the transmission period in which OC_INDEX=1) corresponds to the phase rotation amount setting with minimum $N_{int}$ in Expression 6 (hereinafter, $N_{int}$ in this case is referred to as $N_{intMIN}$), CFAR section 211 may perform the power addition of outputs $\text{VFT}_z^1(f_b, f_s)$ of Doppler analyzers 210 of first to Na-th signal processors 206 as given by following Expression 85 instead of Expression 38:

[93]

$$PowerFT(f_b, f_s) = \sum_{z=1}^{N_a} \left|VFT_z^1(f_b, f_s)\right|^2. \quad \text{(Expression 85)}$$

In addition, CFAR section 211 may perform two-dimensional CFAR processing in two dimensions formed by a distance axis and a Doppler frequency axis (corresponding to relative velocity), or CFAR processing using one-dimensional CFAR processing in combination, for example, based on a power addition value.

For power addition value PowerFT($f_b$, $f_s$) used in the CFAR processing in any of above-mentioned phase rotation amount varying methods 1 to 3, the equal-interval Doppler shift amount setting using phase rotation amount $\varphi_{ndm}$ given by Expression 6 is used as the equal-interval Doppler shift amount setting of intervals narrower than the intervals of the maximum equal-interval Doppler shift amount setting. Accordingly, $N_{DM}$ peaks are detected at intervals of $\Delta FD=Ncode/(N_{DM}+N_{int})$, and it is thus possible for CFAR section 211 to apply the Doppler domain compression CFAR processing.

For example, as given by following Expression 86, CFAR section 211 may perform the power addition while adjusting the peak positions of Doppler shift multiplexed signals to perform the Doppler domain compression CFAR processing. Here, $f_{s\_comp}=-\Delta FD/2, \ldots, \Delta FD/2-1=Ncode/\{2(N_{DM}+N_{int})\}, \ldots, Ncode/\{2(N_{DM}+N_{int})\}-1$.

Phase rotation amount varying method 1 or 3:

$$PowerFT_{comp(f_b, f_{s\_comp})} = \qquad \text{(Expression 86)}$$

$$\sum_{nfd=1}^{N_{DM}+N_{int}} PowerFT\left(f_b, f_{s\_comp} + \left(nfd - \text{ceil}\left(\frac{N_{DM}+N_{int}}{2}\right) - 1\right) \times \Delta FD\right)$$

Note that, in the following, "$N_{intMIN}$" is used instead of $N_{int}$ in the expressions and descriptions when phase rotation amount varying method 2 is used.

However, in Expression 86, in the case of

[95]

$$f_{s\_comp} + \left(nfd - \text{ceil}\left(\frac{N_{DM}+N_{int}}{2}\right) - 1\right) \times \Delta FD < -Ncode/2,$$

the Doppler frequency index to which Ncode is added is used.

Likewise, in Expression 86, in the case of

[96]

$$f_{s\_comp} + \left(nfd - \text{ceil}\left(\frac{N_{DM}+N_{int}}{2}\right) - 1\right) \times \Delta FD > \frac{Ncode}{2} - 1,$$

the Doppler frequency index from which Ncode is further subtracted is used.

It is thus possible to compress the Doppler frequency range for the CFAR processing to $1/(N_{DM}+N_{int})$ to reduce the amount of CFAR processing and to simplify the circuit configuration. In addition, CFAR section 211 is capable of power addition for $N_{DM}$ Doppler-shift multiplexed signals, to improve SNR by about $(N_{DM})^{1/2}$. As a result, the radar sensing performance of radar apparatus 10 can be improved.

CFAR section 211 using the Doppler domain compression CFAR processing adaptively sets the threshold, for example, and outputs, to coded Doppler demultiplexer 212, distance index $f_{b\_cfar}$ and Doppler frequency index $f_{s\_comp\_cfar}$ that provide a received power greater than the threshold, and received power information $PowerFT(f_{b\_cfar}, f_{s\_comp\_cfar}+(nfd-\text{ceil}(N_{DM}+N_{int})/2)-1)\times\Delta FD$ (where nfd=1, ..., $N_{DM}+N_{int}$)) for the Doppler frequency indices ($f_{s\_comp\_cfar}+(nfd-\text{ceil}((N_{DM}+N_{int})/2)-1)\times\Delta FD$ of $N_{DM}$ Doppler multiplexed signals.

The exemplary operation of CFAR section 211 has been described above.

Next, an example of the operation of coded Doppler demultiplexer 212 illustrated in FIG. 1 will be described. The following describes an example of processing performed by coded Doppler demultiplexer 212 when CFAR section 211 uses the Doppler domain compression CFAR processing.

Based on the outputs of CFAR section 211 (e.g., distance indices $f_{b\_cfar}$, Doppler frequency indices $f_{s\_comp\_cfar}$, and received power information $PowerFT(f_{b\_cfar}, f_{s\_comp\_cfar}+(nfd-\text{ceil}((N_{DM}+N_{int})/2)-1)\times\Delta FD$ (where nfd=1, ..., $N_{DM}+N_{int}$)) for the Doppler frequency indices ($f_{s\_comp\_cfar}+(nfd-\text{ceil}((N_{DM}+N_{int})/2)-1)\times\Delta FD$) of ($N_{DM}+N_{int}$) Doppler multiplexed signals), coded Doppler demultiplexer 212 separates the coded Doppler multiplexed transmission signals using the outputs of Doppler analyzers 210, and distinguishes (in other words, judges or identifies) transmission antennas 109 and the Doppler frequencies (in other words, the Doppler velocities or relative velocities).

As described above, in the case where the numbers of coded Doppler multiplexing for the Doppler multiplexed signals are set by using the equal-interval Doppler shift amount setting of intervals narrower than the intervals of the maximum equal-interval Doppler shift amount setting (e.g., Expression 6), coded Doppler demultiplexer 212 performs, for example, (1) the aliasing judgement, and (2) the Doppler code separation processing on the coded Doppler multiplexed signals used for multiplexing transmission based on the result of the aliasing judgement.

Processing (1) and processing (2) by coded Doppler demultiplexer 212 described above will be described below.

<(1) Aliasing Judgement Processing (Detection Processing of Detecting Unused Coded Doppler Multiplexed Signal)>

For example, in the aliasing judgement, coded Doppler demultiplexer 212 detects $N_{DM}$ peaks at intervals of $\Delta FD=Ncode/(N_{DM}+N_{int})$. For example, coded Doppler demultiplexer 212 detects $N_{DM}$ peaks at intervals of $\Delta FD$ using the outputs of CFAR section 211 (e.g., distance indices $f_{b\_cfar}$, Doppler frequency indices $f_{s\_comp\_cfar}$, and received power information $PowerFT(f_{b\_cfar}, f_{s\_comp\_cfar}+(nfd-\text{ceil}((N_{DM}+N_{int})/2)-1)\times\Delta FD$ (where nfd=1, ..., $N_{DM}+N_{int}$)) for the Doppler frequency indices ($f_{s\_comp\_cfar}+(nfd-\text{ceil}((N_{DM}+N_{int})/2)-1)\times\Delta FD$) of ($N_{DM}+N_{int}$) Doppler multiplexed signals). For example, using received power information $PowerFT(f_{b\_cfar}, f_{s\_comp\_cfar}+(nfd-\text{ceil}((N_{DM}+N_{int})/2)-1)\times\Delta FD$) for Doppler frequency indices ($f_{s\_comp\_cfar}+(nfd-\text{ceil}(N_{DM}+N_{int})/2)-1)\times\Delta FD$) of the ($N_{DM}+N_{int}$) Doppler multiplexed signals, coded Doppler demultiplexer 212 detects the Doppler frequency indices of $N_{int}$ coded Doppler multiplexed signals not used for multiplexing transmission. Through this processing, coded Doppler demultiplexer 212 performs the aliasing judgement in the Doppler range of $\pm 1/(2Loc\times Tr)$.

Here, the detection of the Doppler frequency indices of $N_{int}$ coded Doppler multiplexed signals not used for Doppler multiplexing transmission may be performed using received power information $PowerFT(f_{b\_cfar}, f_{s\_comp\_cfar}+(nfd-\text{ceil}((N_{DM}+N_{int})/2)-1)\times\Delta FD$) as follows.

For example, when $N_{int}=1$, coded Doppler demultiplexer 212 detects a $D_r$ in which received power $PowerFT(f_{b\_cfar}, f_{s\_comp\_cfar}+(D_r-\text{ceil}((N_{DM}+N_{int})/2)-1)\times\Delta FD$) is minimized among the $D_r$ ranges, as given by following Expression 87. Such a $D_r$ is expressed as "$D_{r\_min}$." Here, $D_r$ is an integer value in a range of $D_r=\text{ceil}((N_{DM}+N_{int})/2), \ldots, \text{ceil}((N_{DM}+N_{int})/2)-1$.

[97]

$$D_{r_{min}} = \left\{\arg D_r \,\middle|\, \min_{D_r} PowerFT(f_{b\_cfar}, f_{s\_comp\_cfar} + \right. \qquad \text{(Expression 87)}$$

$$\left. \left(D_r - \text{ceil}\left(\frac{N_{DM}+N_{int}}{2}\right) - 1\right)\Delta FD\right)\right\}$$

For example, when $N_{int}>2$, coded Doppler demultiplexer 212 detects the $D_r$ of minimized power by utilizing the beforehand knowledge of relative positional relationship between the Doppler frequency indices of $N_{int}$ coded Doppler multiplexed signals not used for Doppler multiplexing transmission in respective $D_r$. For example, when $N_{int}>2$, coded Doppler demultiplexer 212 detects a $D_r$ in which the received power is minimized among the $D_r$ using following Expression 88. Such a $D_r$ is expressed as "$D_{r\_min}$." Here, $D_r$ is an integer value in a range of $D_r$=ceil(($N_{DM}$+$N_{int}$)/2), . . . , ceil(($N_{DM}$+$N_{int}$)/2)−1. Here, $F_{nint}(D_r)$ is an index representing the relative positional relation of the Doppler frequency index of the nint-th coded Doppler multiplexed signal not used for Doppler multiplexing transmission in $D_r$. Note that the index interval between that indices represented by $F_{nint}(D_r)$ is $\Delta FD$. Here, nint=1, . . . , $N_{int}$.

[98]

$$D_{rmin} = \left\{ \arg D_r \left| \min_{D_r} \sum_{nint=1}^{N_{int}} PowerFT(f_{b\_cfar}, f_{s\_comp\_cfar} + \left( F_{nint}(D_r) - \text{ceil}\left(\frac{N_{DM}+N_{int}}{2}\right) - 1 \right) \Delta FD \right) \right\}$$ (Expression 88)

Coded Doppler demultiplexer 212 outputs, to peak extractor 213, an aliasing judgement result (e.g., $f_{b\_cfar}$, $f_{s\_comp\_cfar}$, $D_{rmin}$), for example, with respect to a reception signal for $f_{b\_cfar}$ and $f_{s\_comp\_cfar}$.

The operation example of the aliasing processing has been described above.

<(2) Doppler Code Separation Processing on Coded Doppler Multiplexed Signal Used for Multiplexing Transmission>

Coded Doppler demultiplexer 212 performs coded Doppler demultiplexing processing on a coded Doppler multiplexed signal used for multiplexing transmission based on an aliasing judgement result.

For example, coded Doppler demultiplexer 212 applies Expression 51 based on $D_{rmin}$ which is a result of aliasing judgement in aliasing judgement processing, so as to separate and receive the coded Doppler multiplexed signal to which DCI (ncm, ndm) used for multiplexing transmission is assigned. For example, coded Doppler demultiplexer 212 can perform the separation processing using Expression 51 to separate and receive the coded Doppler multiplexed signal to which DCI (ncm, ndm) used for the multiplexing transmission is assigned. Note that, following Expression 89 may also be used for VFTALL$_z$($f_{b\_cfar}$, $f_{s\_comp\_cfar}$, $D_r$, ndm) in Expression 51.

[99]

$$VFTALL_z(f_{b\_cfar}, f_{s\_comp\_cfar}, D_r, ndm) = \left[ VFT_z^1(f_{b\_cfar}, f_{s\_comp\_cfar} + \frac{N_{code}F_R(D_r, ndm, 1)}{N_{DM}+N_{int}(1)}\right) \ldots VFT_z^{Loc}(f_{b\_cfar}, f_{s\_comp\_cfar} + \frac{N_{code}F_R(D_r, ndm, L_{oc})}{N_{DM}+N_{int}(L_{oc})}) \right]^T$$ (Expression 89)

In Expression 89, $F_R(D_r, ndm, noc)$ can be set in advance when Doppler aliasing range $D_r$, noc, and phase rotation amounts $\varphi_{ndm}(noc)$ for applying Doppler shift amounts DOP$_1$, DOP$_2$, . . . , and DOP$_{N\_DM}$ are fixed. Therefore, for example, coded Doppler demultiplexer 212 may tabulate the correspondence between, on one hand, Doppler aliasing range $D_r$, noc and the phase rotation amounts and, on the other hand, $F_R(D_r, ndm, noc)$ and read $F_R(D_r, ndm, noc)$ based on Doppler aliasing range $D_r$ and a phase rotation amount.

Since by the aliasing judgement processing it is possible to judge an index ($D_{rtrue}$) that is a true Doppler aliasing range within the Doppler range of from −1/(2Loc×Tr) to less than 1/(2Loc×Tr) (in other words, it is possible to judge an index such that $D_{rmin}$=$D_{rtrue}$), it becomes possible for coded Doppler demultiplexer 212 to set, to zero, the correlation value between the orthogonal codes used for code multiplexing in the Doppler range of from −1/(2Loc×Tr) to less than 1/(2Loc×Tr), so as to perform the separation processing in which the interference between the code multiplexed signals is suppressed.

Through the code separation processing as described above, and, based on the aliasing judgement result assuming the Doppler range of ±1/(2Loc×Tr), radar apparatus 10 can separate and receive the coded Doppler multiplexed signal to which DCI (ncm, ndm) used for the multiplexing transmission is assigned.

Further, since the coded Doppler multiplexed signal to which DCI (ncm, ndm) is assigned is transmitted from transmission antenna Tx #[ncm, ndm], it is also possible to judge transmission antenna 109. In other words, radar apparatus 10 can separate and receive the coded Doppler multiplexed signal which is transmitted from transmission antenna Tx #[ncm, ndm] and to which DCI (ncm, ndm) is assigned.

In addition, for example, during coded Doppler demultiplexing processing, radar apparatus 10 performs, on the outputs of Doppler analyzers 210 for each code element, Doppler phase correction, for example, based on Doppler phase correction vector $\alpha(f_{s\_comp\_cfar}, D_r)$ taking into consideration Doppler aliasing. Such phase correction corresponds to correcting phase changes corresponding to Doppler components among the Doppler component candidates with respect to $f_{s\_comp\_cfar}$. Mutual interference between code multiplexed signals can thus be reduced, for example, as low as a noise level. In other words, radar apparatus 10 can reduce inter-code interference to suppress the effect on degradation of the detection performance of radar apparatus 10.

The foregoing description has been given of an example of the operation of coded Doppler demultiplexer 212.

In FIG. 1, peak extractor 213 outputs, to direction estimator 214, at least one of the outputs of Doppler analyzers 210 for distance index $f_{b\_cfar}$ and Doppler frequency index $f_{s\_comp\_cfar}$ inputted from CFAR section 211. At this time, peak extractor 213 may use, for example, $D_{rmin}$ that is a Doppler aliasing judgement result inputted from coded Doppler demultiplexer 212.

For example, in the example illustrated in FIG. 1, peak extractor 213 outputs output VFT$_z^1$($f_{b\_cfar}$, $f_{s\_comp\_cfar}$+($N_{code}F_R(D_{rmin}, ndm_{\_BF}, 1)/(N_{DM}+N_{int}(1))$)) of first Doppler analyzer 210 (Doppler analyzer 210-1)) to direction estimator 214. Here, ndm$_{\_BF}$ is any one of 1, . . . , $N_{DM}$, and a plurality of transmission antennas 109 to which the ndm$_{\_BF}$-th Doppler multiplexed signal is assigned are a combination of transmission antennas 109 that satisfies the condition of the adjacent arrangement described above, for example.

In FIG. 1, based on aliasing judgement result $D_{rmin}$ for distance index $f_{b\_cfar}$ and Doppler frequency index $f_{s\_comp\_cfar}$ inputted from coded Doppler demultiplexer 212, direction estimator 214 performs direction estimation processing for estimation of the direction of a target based on separated received signal $Y_z(f_{b\_cfar}, f_{s\_comp\_cfar}, D_{rmin}, ncm, ndm)$ of the coded Doppler multiplexed signal to which DCI (ncm, ndm) is assigned and which is transmitted from transmission antenna Tx #[ncm, ndm], and based on the output from a part of Doppler analyzers 210 (Doppler analyzer 210-1 in FIG. 1) inputted from peak extractor 213.

Note that, by way of example, the case where output VFT$_z^1$($f_{b\_cfar}$, $f_{s\_comp\_cfar}$+($N_{code}F_R(D_{rmin}, ndm_{\_BF}, 1)/(N_{DM}+N_{int}(1))$)) from first Doppler analyzer 210 is used will be described below, but the output from peak extractor 213 is not limited to this. In addition, z=1, . . . , Na.

For example, direction estimator 214 generates, based on the outputs of coded Doppler demultiplexer 212 and peak extractor 213, virtual reception array correlation vector $h(f_{b\_cfar}, f_{s\_comp\_cfar})$ given by following Expression 90 and performs the direction estimation processing.

Virtual reception array correlation vector $h(f_{b\_cfar}, f_{s\_comp\_cfar})$ includes Nt×Na elements, the number of which is the product of number Nt of transmission antennas and number Na of reception antennas, and further includes elements resulting from use of beam transmission antennas. Detailed descriptions will be given below.

Virtual reception array correlation vector $h(f_{b\_cfar}, f_{s\_comp\_cfar})$ includes elements of beam transmission antennas. The elements of beam transmission antennas are based on the output (e.g., $VFT_z^1(f_{b\_cfar}, f_{s\_comp\_cfar} + (N_{code}F_R(D_{rmin}, ndm_{\_BF}, 1)/(N_{DM} + N_{int}(1))))$ of a part of Doppler analyzers 210 that is inputted from peak extractor 213. The elements of beam transmission antennas result from code multiplexing transmission is performed using the same Doppler multiplexing and constitute a sub-array by adjacent transmission antennas 109 for orthogonal beam transmission.

For example, when there are $N_{BF}$ beam transmission antennas, virtual reception array correlation vector $h(f_{b\_cfar}, f_{s\_comp\_cfar})$ includes $(Nt + N_{BF}) \times Na$ elements. By way of example, when number $N_{BF}$ of beam transmission antennas is 1, virtual reception array correlation vector $h(f_{b\_cfar}, f_{s\_comp\_cfar})$ is expressed by following Expression 90. In Expression 90, an example is expressed in which peak extractor 213 outputs output $VFT_z^1(f_{b\_cfar}, f_{s\_comp\_cfar} + (N_{code}F_R(D_{rmin}, ndm_{\_BF})/N_{DM} + N_{int})))$ from first Doppler analyzer 210 to direction estimator 214, but the present invention is not limited to this.

Further, since the output of coded Doppler demultiplexer 212 and the output of peak extractor 213 have different noise levels, values obtained by multiplication by a normalizing factor may be used as virtual reception array correlation vector $h(f_{b\_cfar}, f_{s\_comp\_cfar})$.

[100]

$$h(f_{b\_cfar}, f_{s\_comp\_cfar}) = \begin{bmatrix} Y_1(f_{b\_cfar}, f_{s\_comp\_cfar}, D_{rmin}, 1, 1) \\ Y_2(f_{b\_cfar}, f_{s\_comp\_cfar}, D_{rmin}, 1, 1) \\ \vdots \\ Y_{Na}(f_{b\_cfar}, f_{s\_comp\_cfar}, D_{rmin}, 1, 1) \\ \vdots \\ Y_1(f_{b\_cfar}, f_{s\_comp\_cfar}, D_{rmin}, N_{DOP\_CODE(1)}, 1) \\ Y_2(f_{b\_cfar}, f_{s\_comp\_cfar}, D_{rmin}, N_{DOP\_CODE(1)}, 1) \\ \vdots \\ Y_{Na}(f_{b\_cfar}, f_{s\_comp\_cfar}, D_{rmin}, N_{DOP\_CODE(1)}, 1) \\ \vdots \\ Y_1(f_{b\_cfar}, f_{s\_comp\_cfar}, D_{rmin}, 1, N_{DM}) \\ Y_2(f_{b\_cfar}, f_{s\_comp\_cfar}, D_{rmin}, 1, N_{DM}) \\ \vdots \\ Y_{Na}(f_{b\_cfar}, f_{s\_comp\_cfar}, D_{rmin}, 1, N_{DM}) \\ \vdots \\ Y_1(f_{b\_cfar}, f_{s\_comp\_cfar}, D_{rmin}, N_{DOP\_CODE(N_{DM})}, N_{DM}) \\ Y_2(f_{b\_cfar}, f_{s\_comp\_cfar}, D_{rmin}, N_{DOP\_CODE(N_{DM})}, N_{DM}) \\ \vdots \\ Y_{Na}(f_{b\_cfar}, f_{s\_comp\_cfar}, D_{rmin}, N_{DOP\_CODE(N_{DM})}, N_{DM}) \\ VFT_1^1\left(f_{b\_cfar}, f_{s\_comp\_cfar} + \frac{N_{code}F_R(D_{rmin}, ndm_{BF}, 1)}{N_{DM} + N_{int}(1)}\right) \\ VFT_2^1\left(f_{b\_cfar}, f_{s\_comp\_cfar} + \frac{N_{code}F_R(D_{rmin}, ndm_{BF}, 1)}{N_{DM} + N_{int}(1)}\right) \\ \vdots \\ VFT_{Na}^1\left(f_{b\_cfar}, f_{s\_comp\_cfar} + \frac{N_{code}F_R(D_{rmin}, ndm_{BF}, 1)}{N_{DM} + N_{int}(1)}\right) \end{bmatrix}$$

(Expression 90)

Virtual reception array correlation vector $h(f_{b\_cfar}, f_{s\_comp\_cfar})$ is used in processing for performing, on reflected wave signals from a target, direction estimation based on a phase difference between reception antennas 202.

Since subsequent operations are the same as those in Embodiment 1, the description thereof is omitted.

Through the above-described operations, Doppler shift setter 106 may set the phase rotation amounts for applying Doppler shift amounts $DOP_1, DOP_2, \ldots,$ and $DOP_{N\_DM}$ variably for respective code elements of the orthogonal code sequences with code length Loc used for code multiplexing. In other words, Doppler shift amounts $DOP_1, DOP_2, \ldots,$ and $DOP_{N\_DM}$ may be set variably for respective code elements of the orthogonal code sequences. Even in this case, by the aliasing judgement processing of coded Doppler demultiplexer 212, it is possible to judge an index $(D_{rtrue})$ that is a true Doppler aliasing range within the Doppler range of from $-1/(2Loc \times Tr)$ to less than $1/(2Loc \times Tr)$. Further, it becomes possible for coded Doppler demultiplexer 212 to set, to zero, the correlation value between the orthogonal codes used for code multiplexing in the Doppler range of from $-1/(2Loc \times Tr)$ to less than $1/(2Loc \times Tr)$, so as to perform the separation processing in which the interference between the code multiplexed signals is suppressed.

In addition, as in Embodiment 1, when having $N_{BF}$ beam transmission antennas that perform orthogonal beam transmission by performing code multiplexing transmission using the same Doppler multiplexing (e.g., Doppler shift amount) and by forming a sub-array between adjacent transmission antennas, radar apparatus 10 is capable of utilizing the transmission antennas such that the number thereof is made greater than the number of transmission antennas used for multiplexing transmission. In this case, it is possible to include $(Nt + N_{BF}) \times Na$ elements in virtual reception array correlation vector $h(f_{b\_cfar}, f_{s\_comp\_cfar})$. Accordingly, it is possible to improve the angular resolution or suppress the sidelobe level in radar apparatus 10.

The example of the operation in which the phase rotation amounts for applying the Doppler shift amounts are variably set for respective code elements of the orthogonal code sequences with code length Loc used for code multiplexing has been described above.

Note that, here, the case of using the beam transmission antenna (e.g., the case where Doppler shift amounts are the same between combinations associated respectively with adjacent transmission antennas of a plurality of transmission antennas 109 among a plurality of combinations of Doppler shift amounts $DOP_{ndm}$ and the orthogonal code sequences) has been described as an example, but the present disclosure is not limited to this example. For example, when the Doppler shift amounts in the combinations associated respectively with the adjacent transmission antennas of a plurality of transmission antennas 109 differ from each other, Doppler shift amounts $DOP_1, DOP_2, \ldots,$ and $DOP_{N\_DM}$ may be set variably for respective code elements of the orthogonal code sequences. Further, in the setting, among a plurality of combinations of Doppler shift amounts $DOP_{ndm}$ and the orthogonal code sequences, the number of multiplexing (number of coded Doppler multiplexing) by an orthogonal code sequence associated with at least one Doppler shift amount $DOP_{ndm}$ may differ from the numbers of coded Doppler multiplexing associated with the other Doppler shift amounts (in other words, may be set non-uniformly). Alternatively, in the setting, among a plurality of combinations of Doppler shift amounts $DOP_{ndm}$ and the orthogonal code sequences, the numbers of multiplexing by the orthogonal code sequences (numbers of coded Doppler multiplexing) associated with Doppler shift amounts $DOP_{ndm}$ may be the same (in other words, may be set uniformly).

(2) In a radar apparatus according to an exemplary embodiment of the present disclosure, a radar transmitter and a radar receiver may be individually arranged in physically separate locations. In a radar receiver according to an exemplary embodiment of the present disclosure, a direction estimator and any other component may be individually arranged in physically separate locations.

(3) The numeric values of parameters used in the exemplary embodiment of the present disclosure, such as number Nt of transmission antennas, number Na of reception antennas, number $N_{DM}$ of Doppler multiplexing, number $N_{CM}$ of codes, and number $N_{BF}$ of beam transmission antennas are illustrative and are not limited to those values.

A radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expression "section" used in the above-described embodiments may be replaced with another expression such as "circuit (circuitry)," "device," "unit," or "module."

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

<Summary of Present Disclosure>

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which each of the plurality of transmission antennas is associated with a combination of the Doppler shift amount and the code sequence such that at least one of the Doppler shift amount and the code sequence is different between a plurality of the combinations, and the Doppler shift amounts of those of the plurality of combinations which are associated respectively with at least two adjacent transmission antennas of the plurality of transmission antennas are the same Doppler shift amount, the at least two adjacent transmission antennas being a first sub-array antenna.

In an exemplary embodiment of the present disclosure, a number of multiplexing by the code sequence associated with each of the Doppler shift amounts is the same among the plurality of combinations.

In an exemplary embodiment of the present disclosure, a number of multiplexing by the code sequence associated with at least one of the Doppler shift amounts is different from another number of multiplexing by the code sequence associated with another of the Doppler shift amounts among the plurality of combinations.

In an exemplary embodiment of the present disclosure, the radar apparatus further includes: a plurality of reception antennas that receive a reflected wave signal that is the transmission signal reflected from a target; and a reception circuit that performs sensing processing for sensing the target using a virtual reception antenna constituted by the plurality of transmission antennas, the plurality of reception antennas, and the first sub-array antenna.

In an exemplary embodiment of the present disclosure, the transmission circuit controls directivity of the first sub-array antenna.

In an exemplary embodiment of the present disclosure, a transmission timing of the transmission signal is the same between the first sub-array antenna and a second sub-array antenna constituted by at least two adjacent transmission antennas of the plurality of transmission antennas.

In an exemplary embodiment of the present disclosure, a transmission timing of the transmission signal is different between the first sub-array antenna and a second sub-array antenna constituted by at least two other adjacent transmission antennas of the plurality of transmission antennas.

In an exemplary embodiment of the present disclosure, the same Doppler shift amount associated with a pair of the adjacent transmission antennas differs for each transmission period in which a code element of the code sequence is transmitted.

In an exemplary embodiment of the present disclosure, the transmission antenna has a sub-array configuration.

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which each of the plurality of transmission antennas is associated with a combination of the Doppler shift amount and the code sequence such that at least one of the Doppler shift amount and the code sequence is different between a plurality of the combinations, and a number of multiplexing by the code sequence associated with each of the Doppler shift amounts is the same among the plurality of combinations.

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which each of the plurality of transmission antennas is associated with a combination of the Doppler shift amount and the code sequence such that at least one of the Doppler shift amount and the code sequence is different between a plurality of the combinations, and those of the Doppler shift amounts the same as each other differ for each transmission period in which a code element of the code sequence is transmitted.

In an exemplary embodiment of the present disclosure, a number of multiplexing by the code sequence associated with each of the Doppler shift amounts is the same among the plurality of combinations.

In an exemplary embodiment of the present disclosure, a number of multiplexing by the code sequence associated with at least one of the Doppler shift amounts is different from another number of multiplexing by the code sequence associated with another of the Doppler shift amounts among the plurality of combinations.

While various embodiments have been described herein above, it is to be appreciated that various changes in form and detail may be made without departing from the sprit and scope of the invention(s) presently or hereafter claimed.

This application is entitled to and claims the benefit of Japanese Patent Application No. 2020-204938, filed on Dec. 10, 2020, the disclosure of which including the specification, drawings and abstract is incorporated herein by reference in its entirety.

INDUSTRIAL APPLICABILITY

The present disclosure is suitable as a radar apparatus for wide-angle range sensing.

REFERENCE SIGNS LIST 10, 10a, 20 Radar apparatus
100, 300 Radar transmitter
101 Radar transmission signal generator
102 Transmission signal generation controller
103 Modulation signal generator
104 VCO
105 Phase rotation amount setter
106 Doppler shift setter
107 Encoder
108 Phase rotator
109 Transmission antenna
200 Radar receiver
201 Antenna system processor
202 Reception antenna
203 Reception radio
204 Mixer
205 LPF
206 Signal processor
207 AD converter
208 Beat frequency analyzer
209 Output switch
210 Doppler analyzer
211 CFAR section
212 Coded Doppler demultiplexer
213, 213a Peak extractor
214 Direction estimator
301 Directivity weight applier

The invention claimed is:

1. A radar signal processing circuit, comprising:
a processor; and
a memory having instructions that, when executed by the processor, cause the processor to:
apply a phase rotation amount corresponding to a Doppler shift amount and a code sequence to a transmission signal; and
perform multiplexing transmission of the transmission signal from a plurality of transmission antennas, wherein
each of the plurality of transmission antennas is associated with each of a plurality of combinations of the Doppler shift amount and the code sequence,
each of the plurality of combinations is different at least one of the Doppler shift amount and the code sequence, and
Doppler shift amounts of those of the plurality of combinations which are associated respectively with at least two transmission antennas of the plurality of transmission antennas are a same Doppler shift amount.

2. The radar signal processing circuit according to claim 1, wherein
the at least two transmission antennas are a first sub-array antenna.

3. The radar signal processing circuit according to claim 1, wherein
a number of multiplexing by the code sequence associated with each of the Doppler shift amounts is same among the plurality of combinations.

4. The radar signal processing circuit according to claim 1, wherein
a number of multiplexing by the code sequence associated with at least one of the Doppler shift amounts is different from another number of multiplexing by the code sequence associated with another of the Doppler shift amounts among the plurality of combinations.

5. The radar signal processing circuit according to claim 2, the instructions, when executed by the processor, cause the processor to:
receive a reflected wave signal that is the transmission signal reflected from a target with a plurality of reception antennas; and
perform sensing processing for sensing the target using a virtual reception antenna constituted by the plurality of transmission antennas and the plurality of reception antennas.

6. The radar signal processing circuit according to claim 2, the instructions, when executed by the processor, cause the processor to:
control directivity of the first sub-array antenna.

7. The radar signal processing circuit according to claim 2, wherein
a transmission timing of the transmission signal is same between the first sub-array antenna and a second sub-array antenna constituted by at least two transmission antennas of the plurality of transmission antennas.

8. The radar signal processing circuit according to claim 2, wherein
a transmission timing of the transmission signal is different between the first sub-array antenna and a second sub-array antenna constituted by at least two other transmission antennas of the plurality of transmission antennas.

9. The radar signal processing circuit according to claim 1, wherein
the same Doppler shift amount differs for each transmission period in which a code element of the code sequence is transmitted.

10. A radar signal processing method, comprising:
applying a phase rotation amount corresponding to a Doppler shift amount and a code sequence to a transmission signal; and
performing multiplexing transmission of the transmission signal from a plurality of transmission antennas, wherein
each of the plurality of transmission antennas is associated with each of a plurality of combinations of the Doppler shift amount and the code sequence,
each of the plurality of combinations is different at least one of the Doppler shift amount and the code sequence, and
Doppler shift amounts of those of the plurality of combinations which are associated respectively with at least two transmission antennas of the plurality of transmission antennas are a same Doppler shift amount.

11. The radar signal processing method according to claim 10, wherein
the at least two transmission antennas are a first sub-array antenna.

12. The radar signal processing method according to claim 10, wherein
a number of multiplexing by the code sequence associated with each of the Doppler shift amounts is same among the plurality of combinations.

13. The radar signal processing method according to claim 10, wherein
a number of multiplexing by the code sequence associated with at least one of the Doppler shift amounts is different from another number of multiplexing by the code sequence associated with another of the Doppler shift amounts among the plurality of combinations.

14. The radar signal processing method according to claim 11, the method further comprising:
receiving a reflected wave signal that is the transmission signal reflected from a target with a plurality of reception antennas; and
performing sensing processing for sensing the target using a virtual reception antenna constituted by the plurality of transmission antennas and the plurality of reception antennas.

15. The radar signal processing method according to claim 11, the method further comprising:
controlling directivity of the first sub-array antenna.

16. The radar signal processing method according to claim 11, wherein
a transmission timing of the transmission signal is same between the first sub-array antenna and a second sub-array antenna constituted by at least two transmission antennas of the plurality of transmission antennas.

17. The radar signal processing method according to claim 11, wherein
a transmission timing of the transmission signal is different between the first sub-array antenna and a second sub-array antenna constituted by at least two other transmission antennas of the plurality of transmission antennas.

18. The radar signal processing method according to claim 10, wherein
the same Doppler shift amount differs for each transmission period in which a code element of the code sequence is transmitted.

* * * * *